US012625553B2

(12) United States Patent
Suzuki

(10) Patent No.: US 12,625,553 B2
(45) Date of Patent: May 12, 2026

(54) SHAPE CHANGEABLE APPARATUS, SHAPE CONTROL METHOD, AND TACTILE SENSE PROVIDING APPARATUS

(71) Applicant: Sony Group Corporation, Tokyo (JP)

(72) Inventor: Hiroshi Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 137 days.

(21) Appl. No.: 18/688,668

(22) PCT Filed: Mar. 10, 2022

(86) PCT No.: PCT/JP2022/010547
§ 371 (c)(1),
(2) Date: Aug. 1, 2024

(87) PCT Pub. No.: WO2023/032285
PCT Pub. Date: Mar. 9, 2023

(65) Prior Publication Data
US 2025/0348144 A1     Nov. 13, 2025

(30) Foreign Application Priority Data

Sep. 2, 2021     (JP) ................................. 2021-143468

(51) Int. Cl.
*G06F 3/041* (2006.01)
*G06F 3/01* (2006.01)
(52) U.S. Cl.
CPC .............. *G06F 3/014* (2013.01); *G06F 3/016* (2013.01); *G06F 2203/04105* (2013.01)
(58) Field of Classification Search
None
See application file for complete search history.

(56) References Cited

U.S. PATENT DOCUMENTS 10,948,989 B1     3/2021 Blumenschein et al.
2010/0171719 A1* 7/2010 Craig ..................... H01H 13/84
                                                                345/173
(Continued)

FOREIGN PATENT DOCUMENTS

JP          H0966476 A     3/1997
JP        2000259333 A     9/2000
(Continued)

OTHER PUBLICATIONS

International Search Report from corresponding PCT application PCT/JP2022/010547, dated May 31, 2022.

*Primary Examiner* — Carl Adams
(74) *Attorney, Agent, or Firm* — K&L Gates LLP

(57) ABSTRACT

A shape changeable apparatus according to an embodiment of the present technology includes a base, a first deformable member, a second deformable member, an inflow control opening, a first opening, a second opening, and a flow path. The first deformable member forms a first space between the first deformable member and the base. The second deformable member forms a second space between the second deformable member and the base. The inflow control opening controls flow of fluid into each of the first space and the second space. The first opening communicates with the first space, the first opening being formed to be closed when a specified pressing operation is input to the first deformable member and the second deformable member. The second opening communicates with the second space, the second opening being formed not to be closed when the specified pressing operation is input. The first opening and the second opening each communicate with the inflow control opening through the flow path.

25 Claims, 28 Drawing Sheets

(56) References Cited

U.S. PATENT DOCUMENTS

| 2012/0098789 | A1 | 4/2012 | Ciesla et al. |
| 2021/0010495 | A1* | 1/2021 | Stanley .................. G06F 3/016 |
| 2021/0069583 | A1 | 3/2021 | Kawaguchi et al. |

FOREIGN PATENT DOCUMENTS

| JP | 2013543184 | A | 11/2013 |
| WO | 2019/044111 | A1 | 3/2019 |

* cited by examiner

Fluid control
mechanism
OFF

Fluid control
mechanism
ON

A

B

A

B

A

B

A

B

A

B

SHAPE CHANGEABLE APPARATUS, SHAPE CONTROL METHOD, AND TACTILE SENSE PROVIDING APPARATUS

TECHNICAL FIELD

The present technology relates to a shape changeable apparatus that is applicable to, for example, a tactile sense providing apparatus or an input apparatus, a shape control method, and the tactile sense providing apparatus.

BACKGROUND ART

Patent Literature 1 discloses a tactile sense providing apparatus that includes a large number of small bags arranged in a grid, where a liquid having a low boiling point is encapsulated in each small bag. Further, a heating element is connected to each small bag. Heat is generated by the heating element situated at a desired position to cause the liquid encapsulated in the small bag to evaporate, and the small bag expands. This makes it possible to provide an operator with a sense of touch to an object (for example, paragraphs [0006] and [0007] of the specification, and FIG. 3 in Patent Literature 1).

CITATION LIST

Patent Literature

Patent Literature 1: Japanese Patent Application Laid-open No. 2000-112329

DISCLOSURE OF INVENTION

Technical Problem

With respect to the tactile sense providing apparatus described above, there is a need for a technology that makes it possible to make an apparatus smaller in size.

In view of the circumstances described above, it is an object of the present technology to provide a shape changeable apparatus, a shape control method, and a tactile sense providing apparatus that make it possible to make an apparatus smaller in size.

Solution to Problem

In order to achieve the object described above, a shape changeable apparatus according to an embodiment of the present technology includes a base, a first deformable member, a second deformable member, an inflow control opening, a first opening, a second opening, and a flow path.

The first deformable member is capable of being deformed, the first deformable member being connected to the base such that a first space is formed between the first deformable member and the base.

The second deformable member is capable of being deformed, the second deformable member being connected to the base such that a second space is formed between the second deformable member and the base.

The inflow control opening is formed in the base, the inflow control opening being used to control flow of fluid into each of the first space and the second space.

The first opening is formed in the base to communicate with the first space, the first opening being formed to be closed when a specified pressing operation is input to the first deformable member and the second deformable member using an operative body.

The second opening is formed in the base to communicate with the second space, the second opening being formed not to be closed when the specified pressing operation is input.

The first opening and the second opening each communicate with the inflow control opening through the flow path.

In the shape changeable apparatus, the first deformable member and the second deformable member are connected to the base. Further, the first opening and the second opening are formed in the base and each communicate with the inflow control opening through the flow path. When a specified pressing operation is input to the two deformable members, the first opening is closed, and the second opening is not closed. Thus, when the specified pressing operation is input, the first space is not expanded, and the second space is expanded. This results in there being no need for, for example, a mechanism that controls deformations of the deformable members separately, and this makes it possible to make the apparatus smaller in size.

The first opening may be closed through the first deformable member when the specified pressing operation is input.

The first deformable member and the second deformable member may each be connected to the base such that the second deformable member is arranged inside of a space that is formed by the first deformable member and the base. In this case, the first space may be a space obtained by excluding the second space from the space formed by the first deformable member and the base, and the second space may be a space that that is formed by the second deformable member and the base.

The first deformable member and the second deformable member may each be connected to the base such that the second deformable member is arranged outside of a space that is formed by the first deformable member and the base. In this case, the first space may be the space formed by the first deformable member and the base, and the second space may be a space that is formed by the second deformable member and the base.

The shape changeable apparatus may further include a fluid controller that is configured to communicate with the inflow control opening, the fluid controller controlling flow of the fluid into the inflow control opening.

The fluid controller may control the flow of the fluid into the inflow control opening according to whether the first opening is closed.

The fluid controller may stop the flow of the fluid into the inflow control opening during shrinkage of the first space, and the fluid controller may start the flow of the fluid into the inflow control opening when the first opening is closed.

The shape changeable apparatus may further include a detector that detects that the first opening is closed. In this case, the fluid controller may control the flow of the fluid into the inflow control opening on the basis of a result of the detection performed by the detector.

The detector may include a pressure sensor that is capable of detecting pressure of the fluid, the detector being arranged at a position at which the pressure of the fluid flowing into the first space is detectable.

The shape changeable apparatus may further include a drive section that moves the base relative to the operative body to cause the specified pressing operation to be input using the operative body.

The drive section may stop the movement of the base relative to the operative body when the first opening is closed.

The operative body may be a finger of a user. In this case, the fluid controller may provide a tactile sense to the finger of the user by changing shapes of the first deformable member and the second deformable member.

The operative body may be a finger of a user. In this case, the shape changeable apparatus may be configured to be worn on the finger of the user.

The specified pressing operation may be input using the finger of the user when an object is held with the finger of the user, the shape changeable apparatus being worn on the finger of the user.

The operative body may be a finger of a user. In this case, the shape changeable apparatus may be installed at a specified location, and the drive section may move the base toward the finger of the user.

An outer peripheral portion of the second deformable member may be in contact with at least a portion of an outer peripheral portion of the first deformable member.

The entirety of the outer peripheral portion of the second deformable member may be in contact with the outer peripheral portion of the first deformable member.

The shape changeable apparatus may further include a plurality of the second deformable members; and a plurality of the second openings respectively communicating with the second spaces of a plurality of the second spaces respectively formed by the second deformable members of the plurality of the second deformable members.

A shape control method according to an embodiment of the present technology includes causing fluid to flow into a flow path controlling opening to expand a first space and a second space, the first space being formed between a base and a first deformable member that is capable of being deformed, the second space being formed between the base and a second deformable member that is capable of being deformed, the flow path controlling opening communicating with each of a first opening and a second opening, the first opening being formed to communicate with the first space, the second opening being formed to communicate with the second space.

When a specified pressing operation is input to the first deformable member and the second deformable member using an operative body, the flow of the fluid into the inflow control opening is stopped during shrinkage of the first space.

When the first opening formed to be closed upon the input of the specified pressing operation is closed, the flow of the fluid into the inflow control opening is started to expand the second space through the second opening formed not to be closed upon the input of the specified pressing operation.

A tactile sense providing apparatus according to an embodiment of the present technology includes the base, the first deformable member, the second deformable member, the inflow control opening, the first opening, the second opening, the flow path, and a tactile sense providing section.

The tactile sense providing section provides a tactile sense to the operative body by changing shapes of the first deformable member and the second deformable member.

MODE(S) FOR CARRYING OUT THE INVENTION

Embodiments according to the present technology will now be described below with reference to the drawings.

[Configuration of Tactile Sense Providing Apparatus]

An example of a configuration of a tactile sense providing apparatus according to an embodiment of the present technology is described with reference to FIGS. 1 to 3.

Figure 1:
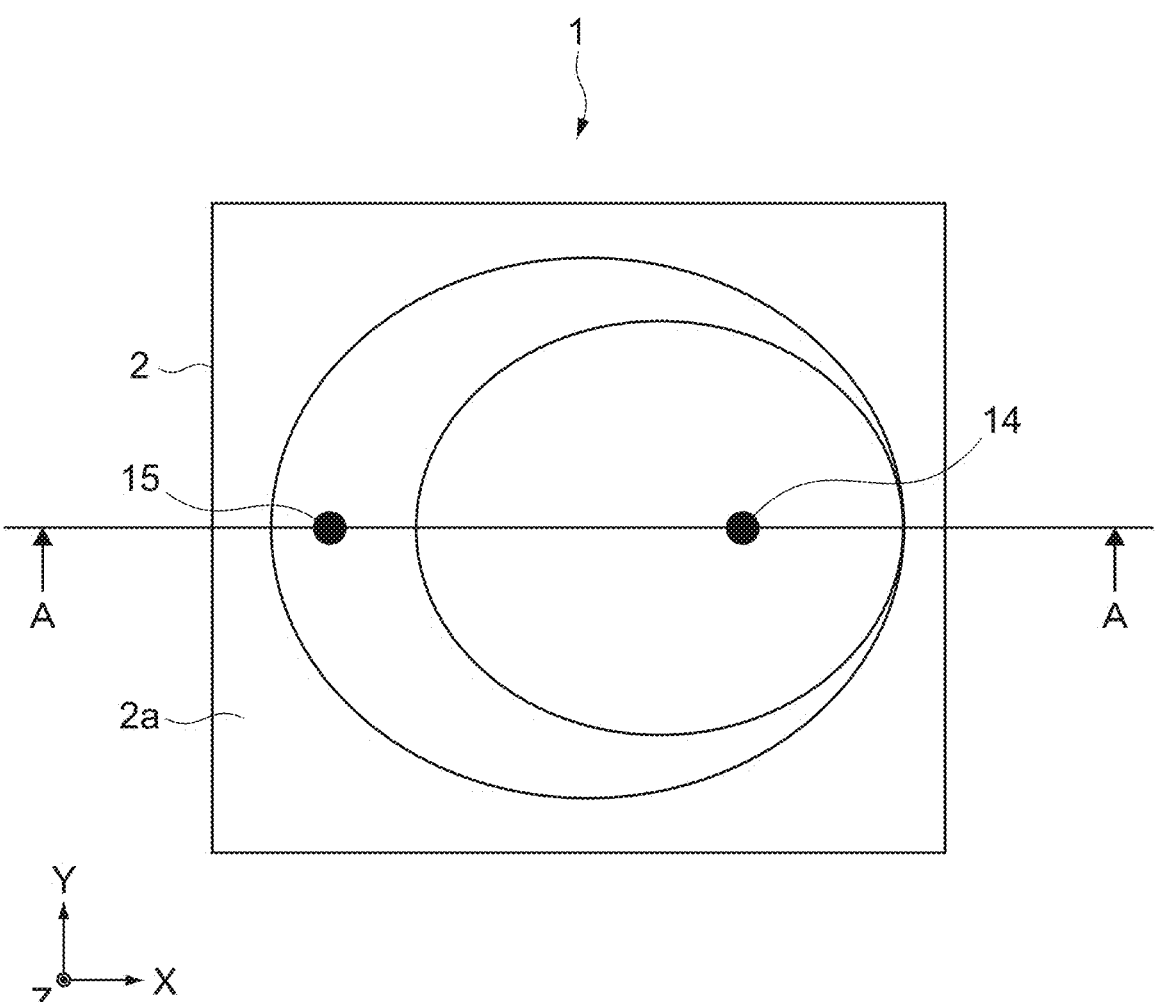
FIG. 1 is a top view of a tactile sense providing apparatus as viewed from above.

FIG. 1 is a top view of the tactile sense providing apparatus as viewed from above.

Figure 2:
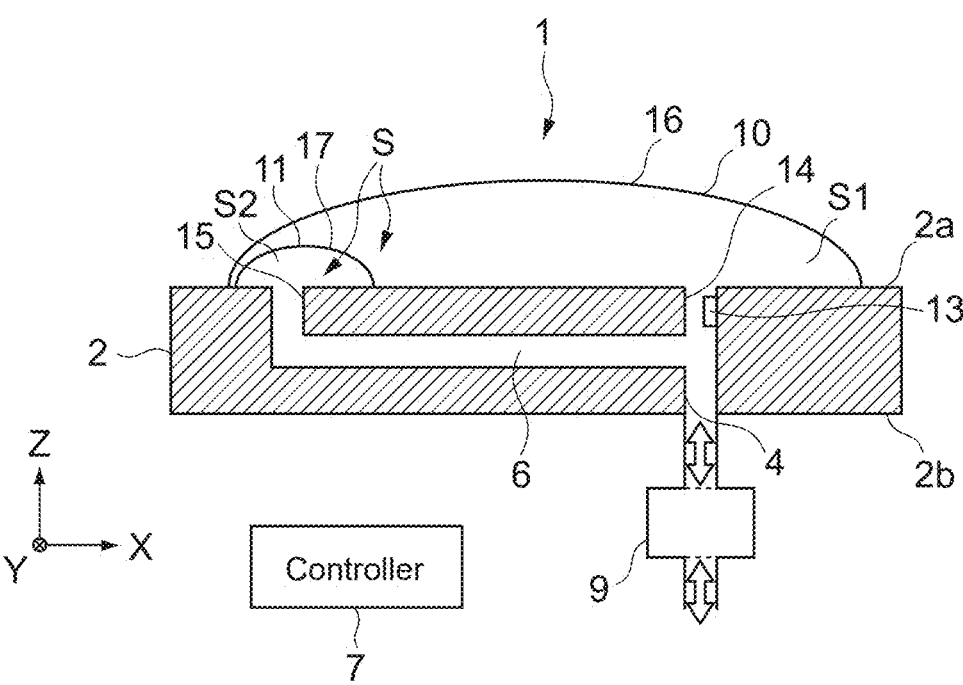
FIG. 2 is a cross-sectional view along the line A-A of FIG. 1.

FIG. 2 is a cross-sectional view along the line A-A of FIG. 1.

Figure 3:
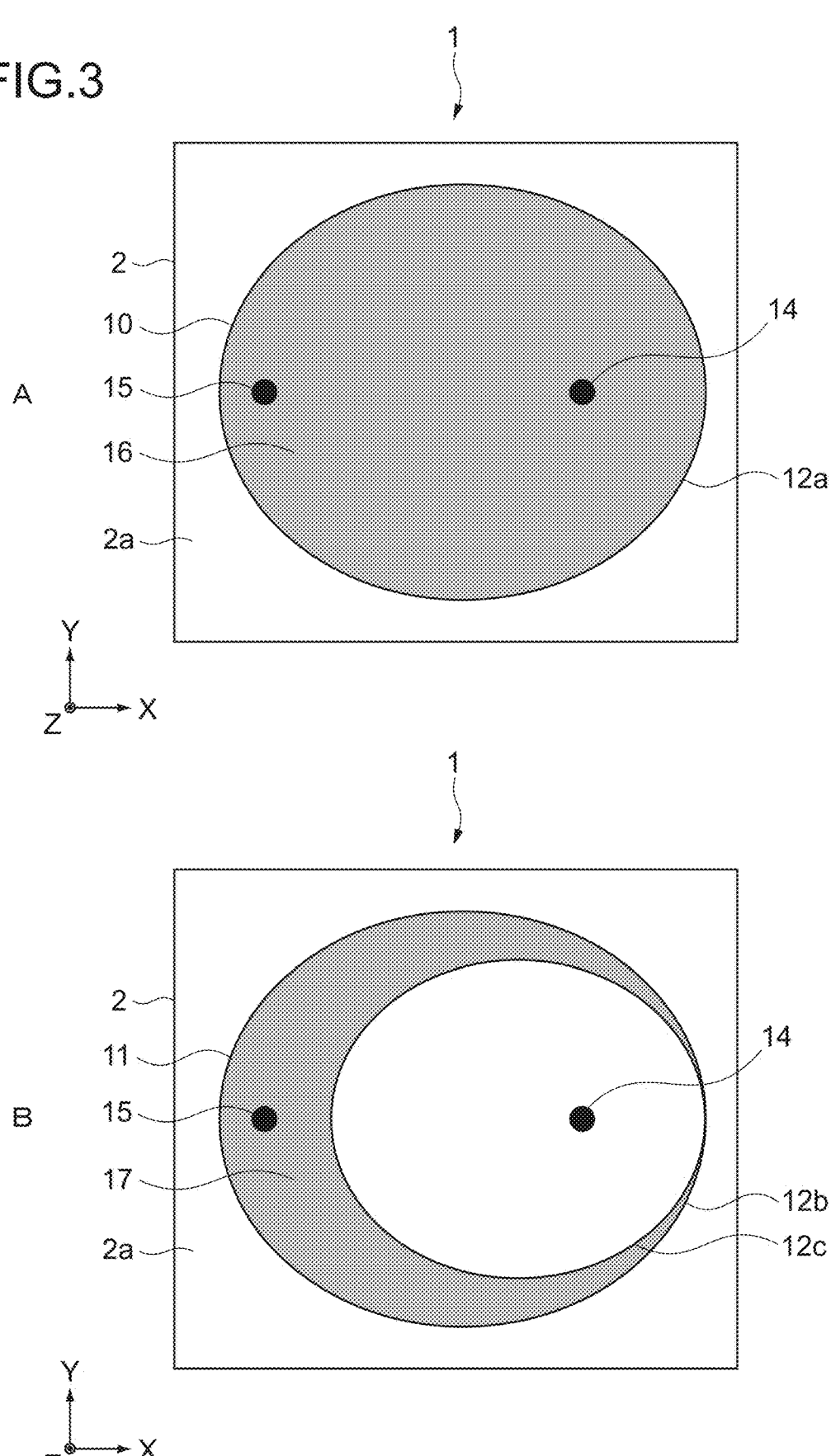
FIG. 3 is a top view when only a first deformable member or a second deformable member is arranged on a base.

A of FIG. 3 is a top view when only a first deformable member is arranged on a base.

B of FIG. 3 is a top view when only a second deformable member is arranged on the base.

Note that FIG. 2 schematically illustrates a controller and a fluid control mechanism that are included in the tactile sense providing apparatus. Further, illustrations of the controller and the fluid control mechanism are omitted in the figures except for FIG. 2.

In the following description, an X direction in each figure is referred to as a right-and-left direction, a Y direction in each figure is referred to as a depth direction, and a Z direction in each figure is referred to as an up-and-down direction for convenience of description.

A side of a positive direction on the X direction (a side toward which an arrow of the X direction is oriented) is referred to as a right side, and a side of a negative direction on the X direction that is opposite to the positive direction is referred to as a left side.

A side of a positive direction on the Y direction (a side toward which an arrow of the Y direction is oriented) is referred to as a back side, and a side of a negative direction on the Y direction that is opposite to the positive direction is referred to as a front side.

A side of a positive direction on the Z direction (a side toward which an arrow of the Z direction is oriented) is referred to as an upper side, and a side of a negative direction on the Z direction that is opposite to the positive direction is referred to as a lower side.

Of course, an orientation and the like of the tactile sense providing apparatus in use are not limited when the present technology is applied.

A tactile sense providing apparatus 1 can provide a specified tactile sense to a user who is in contact with the tactile sense providing apparatus 1.

Note that the provision of a tactile sense may also be referred to as tactile-sense feedback. Thus, the tactile sense providing apparatus 1 may also be referred to as a tactile-sense feedback apparatus.

The tactile sense providing apparatus 1 corresponds to an embodiment of a shape changeable apparatus according to the present technology. In other words, it can also be said that the tactile sense providing apparatus 1 is an example of a tactile sense providing apparatus to which the shape changeable apparatus according to the present technology is applied.

The tactile sense providing apparatus 1 may include a function of an input apparatus with which a user can input various operations. Moreover, an apparatus, a field, and the like to which the shape changeable apparatus according to the present technology can be applied are not limited.

As illustrated in FIGS. 1 to 3, the tactile sense providing apparatus 1 includes a base 2, a first deformable member 10, a second deformable member 11, an inflow control opening 4, a first opening 14, a second opening 15, a flow path 6, a fluid control mechanism 9, a pressure sensor 13, and a controller 7.

The entirety of the base 2 has a rectangular-plate shape, and the base 2 includes an upper surface 2a and a lower surface 2b.

The base 2 is a rigid body made of, for example, metal, or an elastic body made of, for example, silicon rubber.

A shape, a material, and the like of the base 2 are not limited, and the base 2 may be designed discretionarily.

The first deformable member 10 is a film member, and is connected to the base 2 such that a space S is formed between the first deformable member 10 and the base 2.

In the present embodiment, fluid flows into the space S to expand the space S, and this enables the first deformable member 10 to be expanded. The expanded first deformable member 10 has a hemispherical outer shape.

Further, as illustrated in A of FIG. 3, an outer peripheral portion 12a of the first deformable member 10 has an elliptic shape as viewed from the upper side.

The first deformable member 10 is connected to the upper surface 2a of the base 2 such that a major axis of the outer peripheral portion 12a extends in parallel with the X direction (the right-and-left direction) as viewed from the upper side, and such that a minor axis of the outer peripheral portion 12a extends in parallel with the Y direction (the depth direction) as viewed from the upper side.

Note that A of FIG. 3 illustrates the first deformable member 10 in gray in order to facilitate understanding of the illustration. B of FIG. 3 illustrates the second deformable member 11 in gray.

The first deformable member 10 is a member that can be deformed. In the present disclosure, the term "deformation" includes any type of deformation such as elongation and contraction, bending, expansion, and shrinkage.

A material and the like of the first deformable member 10 are not limited, and any deformable material such as polyethylene terephthalate (PET), a liquid crystal polymer, or elastomer including silicon and urethane, may be used.

Further, the tactile sense providing apparatus 1 may be made of an opaque material such that the inside of the tactile sense providing apparatus 1 is not visible. Of course, the first deformable member 10 may be made of a transparent material or a semitransparent material.

Moreover, a specific configuration of the deformation member 10 is not limited, and the deformation member 10 may be designed discretionarily.

In the present embodiment, the space S is formed by the first deformable member 10 and the base 2.

As illustrated in FIG. 2, the space S is a hemispherical space that is surrounded by the first deformable member 10 and the base 2.

Note that, in the present disclosure, a "space that is formed by A and B" refers to the entirety of a space that corresponds to a portion surrounded by two members that are A and B. Further, a "space that is formed by A, B, and C" refers to the entirety of a space that corresponds to a portion surrounded by three members that are A, B, and C.

Further, in the present embodiment, a front surface of the first deformable member 10 (a surface of the first deformable member 10 that faces the upper side) is a deformation surface 16.

The deformation surface 16 is a surface that faces a user who uses the tactile sense providing apparatus 1, and, for example, a pressing operation is input to the deformation surface 16 with a finger of the user to deform the deformation surface 16.

Thus, the deformation surface 16 serves as a contact-target surface that is a target with which the finger of the user comes into contact. Further, when the tactile sense providing apparatus 1 includes a function of an input apparatus, the deformation surface 16 serves as an input surface.

The second deformable member 11 is a film member, and is connected to the base 2 such that a space S2 is formed between the second deformable member 11 and the base 2.

As illustrated in FIG. 2, the second deformable member 11 is arranged inside of the space S formed by the first deformable member 10 and the base 2. In other words, in the present embodiment, the first deformable member 10 and the second deformable member 11 are each connected to the base 2 such that the second deformable member 11 is arranged inside of the space S formed by the first deformable member 10 and the base 2.

Thus, the space S2 is also a space that occupies a portion of the space S.

A space S1 obtained by excluding the space S2 from the space S formed by the first deformable member 10 and the base 2 is hereinafter referred to as a first space S1. The first space S1 is a space that is formed by the first deformable member 10, the second deformable member 11, and the base 2.

Further, the space S2 formed by the first deformable member 10 and the base 2 is hereinafter referred to as a second space S2.

The first deformable member 10 is a deformable member that is connected to the base 2 such that the first space S1 is formed between the first deformable member 10 and the base 2. Further, the second deformable member 11 is a deformable member that is connected to the base 2 such that the second space S2 is formed between the second deformable member 11 and the base 2.

It can also be said that the first space S1 and the second space S2 are two spaces obtained by partitioning, using the second deformable member 11, the space S surrounded by the first deformable member 10.

In the present embodiment, fluid flows into the second space S2 to expand the second space S2, and this enables the second deformable member 11 to be expanded.

Further, as illustrated in B of FIG. 3, the second deformable member 11 has a substantially U-shape as viewed from the upper side, and includes an outer peripheral portion 12b and an inner peripheral portion 12c.

The outer peripheral portion 12b of the second deformable member 11 has the same elliptic shape as the outer peripheral portion 12a of the first deformable member 10. Further, the outer peripheral portion 12b of the second deformable member 11 is formed to be in contact with at least a portion of the outer peripheral portion 12a of the first deformable member 10.

In the present embodiment, the outer peripheral portion 12b is arranged to be in contact with the outer peripheral portion 12a except for a region situated near a right end of the outer peripheral portion 12a. In other words, the first deformable member 10 and the second deformable member 11 are each connected to the base 2 such that a position of the outer peripheral portion 12b coincides with a position of the outer peripheral portion 12a.

The inner peripheral portion 12c of the second deformable member 11 also has an elliptic shape. The inner peripheral portion 12c is formed such that a major axis of the elliptic inner peripheral portion 12c and a major axis of the elliptic outer peripheral portion 12b overlap.

Thus, the outer peripheral portion 12a of the first deformable member 10, the outer peripheral portion 12b of the second deformable member 11, and the inner peripheral portion 12c of the second deformable member 11 are formed such that the respective major axes coincide.

It can also be said that, as viewed from above, the second deformable member 11 has a shape obtained by removing, from the first deformable member 10, an elliptic region that corresponds to the inner peripheral portion 12c of the second deformable member 11.

Note that, in the present embodiment, the second deformable member 11 is formed such that respective portions of the outer peripheral portion 12b and the inner peripheral portion 12c of the second deformable member 11 that each correspond to a right end of the first deformable member 10 are open (the outer peripheral portion 12b and the inner peripheral portion 12c of the second deformable member 11 are not closed annually). Without being limited thereto, the second deformable member 11 may be formed such that the outer peripheral portion 12b and the inner peripheral portion 12c are closed annually.

In this case, the second deformable member 11 has a ring shape. Further, the entirety of the outer peripheral portion 12b of the second deformable member 11 is in contact with the outer peripheral portion 12a of the first deformable member 10.

The second deformable member 11 is a member that can be deformed.

A specific configuration of the second deformable member 11 is not limited, and the second deformable member 11 may be designed discretionarily.

The first deformable member 10 and the second deformable member 11 may be made of the same material. Alternatively, the first deformable member 10 and the second deformable member 11 may be made of different materials.

Further, in the present embodiment, a front surface (a surface that faces the upper side) of the second deformable member 11 is a deformation surface 17.

The deformation surface 17 is a surface that faces a user who uses the tactile sense providing apparatus 1. The deformation surface 17 is situated further inward than the deformation surface 16. Thus, when, for example, a pressing operation is input to the deformation surface 16 with the finger of the user, the pressing operation may also be input indirectly to the deformation surface 17 through the deformation surface 16. The deformation surface 17 is deformed in such a case.

When the tactile sense providing apparatus 1 includes a function of an input apparatus, the deformation surface 17 serves as an input surface.

The space S, the first space S1, and the second space S2 serve as spaces that can maintain fluid.

The type of fluid maintained in the space S, the first space S1, and the second space S2 is not limited. For example, air is used as the fluid. This makes it possible to use the outside air, and thus to make a configuration of the tactile sense providing apparatus 1 simpler.

Of course, the present technology can be applied to any type of fluid such as other types of gases, and liquids such as water.

The inflow control opening 4 is an opening used to control the flow of fluid into each of the first space S1 and the second space S2.

The inflow control opening 4 is formed in the base 2. In the present embodiment, in the lower surface 2b of the base 2, the inflow control opening 4 is formed in the middle in the depth direction and further rightward than the middle in the right-and-left direction.

As illustrated in FIG. 2, the inflow control opening 4 communicates with the first space S1 through the first opening 14 and flow path 6 being formed in the base 2. Further, the inflow control opening 4 communicates with the second space S2 through the second opening 15 and flow path 6 being formed in the base 2. Furthermore, the fluid control mechanism 9 is connected to the inflow control opening 4.

Fluid flows into each of the first space S1 and the second space S2 through the inflow control opening 4 by the fluid control mechanism 9 being driven. As described above, the inflow control opening 4 serves as an opening used to control the flow of fluid into each of the first space S1 and the second space S2.

Of course, fluid maintained in each of the first space S1 and the second space S2 can be discharged through the inflow control opening 4.

The first opening 14 is formed in the base 2 to communicate with the first space S1.

Further, the first opening 14 is formed to be closed through the first deformable member 10 when a specified pressing operation is input to the first deformable member 10 and the second deformable member 11 using an operative body.

The second opening 15 is formed in the base 2 to communicate with the second space S2.

Further, the second opening 15 is formed not to be closed when the operative body inputs the specified pressing operation to the first deformable member 10 and the second deformable member 11.

The specified pressing operation is a pressing operation that is assumed in advance to be input by a user. The first opening 14 is formed to be closed when the assumed pressing operation is input, and the second opening 15 is formed not to be closed when the assumed pressing operation is input.

For example, the first opening 14 is formed at a position at which the first opening 14 is closed through the first deformable member 10 when a specified pressing operation is input. On the other hand, the second opening 15 is formed at a position at which the second opening 15 is not closed through the second deformable member 11. The above-described adjustment of positions at which openings are formed makes it possible to provide a configuration in which the opening is closed and a configuration in which the opening is not closed.

Without being limited thereto, a notch, a recess, a slit, or the like is formed to communicate with an opening such that fluid can enters the opening when, for example, the entirety of the opening is closed with, for example, a finger. Such a configuration makes it possible to provide a configuration in which the opening is not closed.

As described above, any configurations may be adopted as a configuration in which an opening is closed by use of a deformable member in response to a pressing operation being input and a configuration in which an opening is not closed in response to the pressing operation being input.

The first opening 14 and the second opening 15 each communicate with the inflow control opening 4 through the flow path 6.

In the present embodiment, the flow path 6 is formed in the base 2.

Specifically, as illustrated in FIG. 2, the first opening 14 and the inflow control opening 4 communicate with each other through a flow path that extends in parallel with the Z direction (the up-and-down direction). Further, the flow path extending in parallel with the Z direction branches halfway to form a flow path that extends in parallel with the Y direction (the right-and-left direction). The flow path extending in parallel with the Y direction is upwardly bent halfway to extend in parallel with the Z direction, and communicates with the second opening 15. All of the flow paths are formed as the flow path 6.

As described above, the Y-shaped branching flow path 6 is formed, where the inflow control opening 4, the first opening 14, and the second opening 15 correspond to respective ends of the flow path 6.

Fluid passes through the flow path 6 to flow into and out of the first space S1 and the second space S2.

For example, fluid flows into the inflow control opening 4 by the fluid control mechanism 9 being driven, and the flowing fluid passes through the flow path 6 to flow into the first space S1 and the second space S2.

Further, the fluid can be caused to flow out of the first space S1 and the second space S2 by the fluid control mechanism 9 being driven.

Specific configurations of the inflow control opening 4, the first opening 14, the second opening 15, and the flow path 6 are not limited. For example, diameters of the inflow control opening 4, the first opening 14, the second opening 15, and the flow path 6 are made larger, and this enables large volumes of fluid to flow into or out of the spaces in a short period of time.

Further, a plurality of inflow control openings 4 may be formed, or at least three openings may be formed in the upper surface 2a of the base 2. In this case, any configuration of the flow path 6 through which each of the inflow control openings 4 communicates with the openings, may be adopted.

The fluid control mechanism 9 is configured to communicate with the inflow control opening 4, and controls the flow of fluid into the inflow control opening 4.

The controller 7 controls driving of the fluid control mechanism 9. Specifically, for example, a volume, a speed, a timing, and the like of fluid flowing into the inflow control opening 4 are controlled as appropriate.

The flow of fluid into the inflow control opening 4 is controlled, as described above.

Further, in the present embodiment, the fluid control mechanism 9 controls the flow of fluid out of the inflow control opening 4.

The controller 7 controls driving of the fluid control mechanism 9. Specifically, for example, a volume, a speed, a timing, and the like of fluid flowing out of the inflow control opening 4 are controlled as appropriate.

The flow of fluid out of the inflow control opening 4 is controlled, as described above.

A specific configuration of the fluid control mechanism 9 is not limited, and the fluid control mechanism 9 may be designed discretionarily. For example, any actuator mechanism may be adopted to enable fluid to flow into and out of the inflow control opening 4.

For example, a device such as a pump including a vacuum pump, a compressor, a blower, a ventilator, or an impeller can be used.

Note that an inflow mechanism that enables the inflow of air, and an outflow mechanism that enables the outflow of air may be separately provided as the fluid control mechanism 9 to be connected to the inflow control opening 4.

Further, the number of fluid control mechanisms 9 is also not limited.

The pressure sensor 13 can detect pressure of fluid.

The pressure sensor 13 is arranged at a position at which the pressure of fluid flowing into the first space S1 can be detected. In the present embodiment, the pressure sensor 13 is arranged near the first opening 14 in the flow path 6, as illustrated in FIG. 2.

When the fluid control mechanism 9 is driven to cause fluid to flow into the first space S1, the flow of fluid is caused around the pressure sensor 13. Here, pressure applied by the fluid is measured by the pressure sensor 13.

A position at which the pressure sensor 13 is arranged is not limited, and pressure may be arranged at any position at which pressure applied by fluid that flows into the first space S1 can be detected. Further, the number of pressure sensors 13 arranged is also not limited.

The controller 7 controls operations of respective blocks of the tactile sense providing apparatus 1.

The controller 7 includes hardware, such as a CPU, a ROM, a RAM, and an HDD, that is necessary for a configuration of a computer. For example, processing related to a shape control method according to the present technology is performed by the CPU loading, into the RAM, a program according to the present technology that is recorded in, for example, the ROM in advance and executing the program.

For example, a PLD such as an FPGA, or a device such as an ASIC may be used as the controller 7. Further, any computer such as a personal computer (PC) may serve as the controller 7.

The program is installed on the tactile sense providing apparatus 1 through, for example, various recording media. Alternatively, the installation of the program may be performed via, for example, the Internet.

The type and the like of a recording medium that records therein a program are not limited, and any computer-readable recording medium may be used. For example, any non-transitory computer-readable recording medium may be used.

In the present embodiment, the controller 7 and the fluid control mechanism 9 serve as an embodiment of a fluid controller that is configured to communicate with the inflow control opening 4, the fluid controller controlling the flow of fluid into the inflow control opening 4.

Further, the controller 7 and the fluid control mechanism 9 also serve as an embodiment of a tactile sense providing section.

When, for example, an operative body is a finger of a user, the controller 7 and the fluid control mechanism 9 can provide a tactile sense to the finger of the user by changing shapes of the first deformable member 10 and the second deformable member 11. This will be described later.

[Pressing Operation]

A pressing operation input to the first deformable member 10 and the second deformable member 11 is described with reference to FIG. 4.

Figures 4, 5:
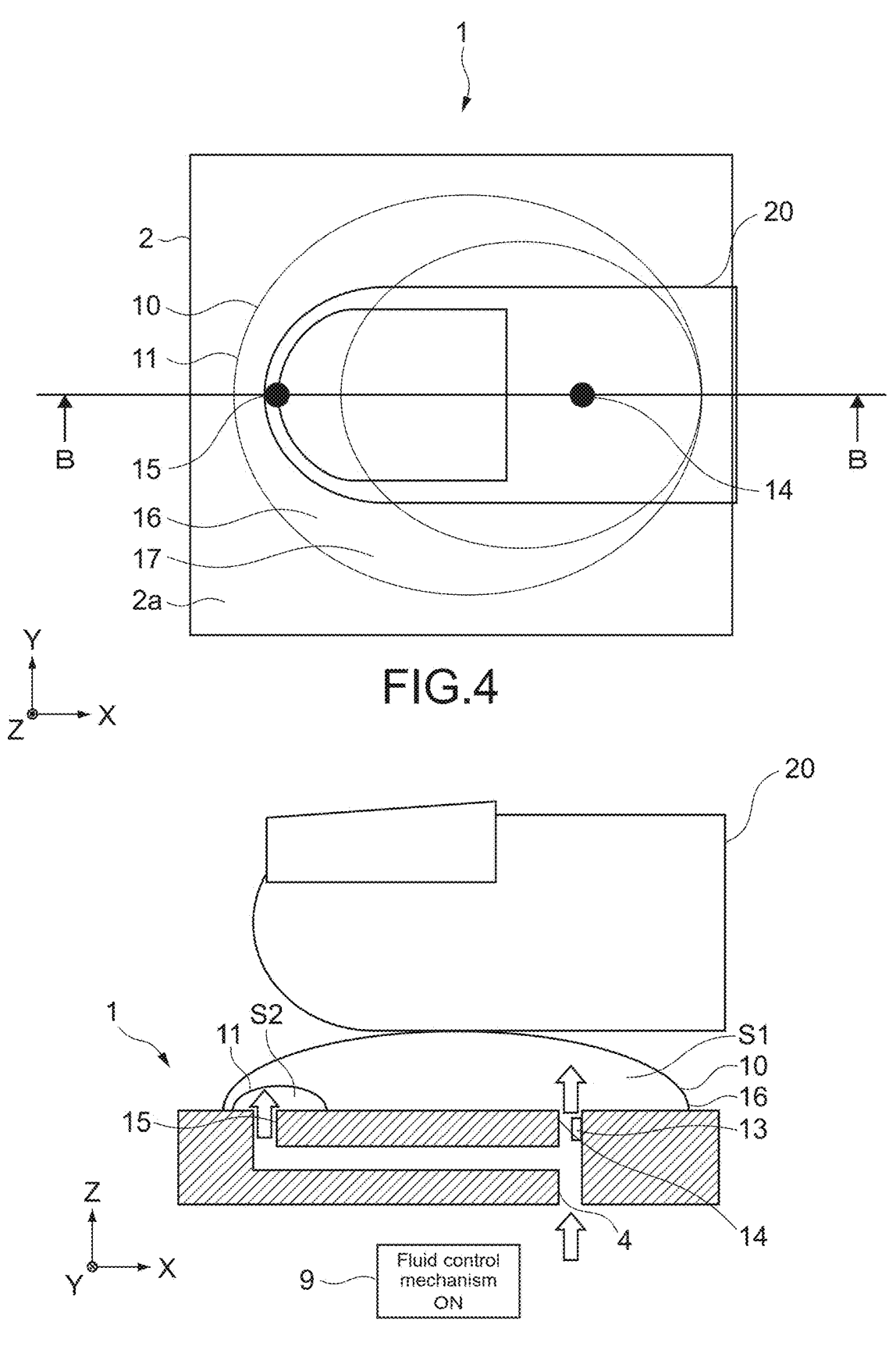
FIG. 4 is a top view of the tactile sense providing apparatus as viewed from above.
FIG. 5 schematically illustrates an example of an operation of the tactile sense providing apparatus.

FIG. 4 is a top view of the tactile sense providing apparatus 1 as viewed from above.

FIG. 4 schematically illustrates a finger 20 of a user.

It is assumed that a specified pressing operation is input to the first deformable member 10 and the second deformable member 11 using an operative body.

In the present embodiment, the finger 20 of the user is assumed to be the operative body.

Further, pushing performed with the finger 20 with respect to the first deformable member 10 and the second deformable member 11 is assumed to be input of the specified pressing operation.

Specifically, pushing performed with the finger 20 placed at a position illustrated in FIG. 4 is assumed.

The position of the finger 20 with which pushing is assumed to be performed is described.

As viewed from the upper side, the finger 20 is placed parallel to the X direction (the right-and-left direction), and a tip of the finger 20 is oriented to the left, as illustrated in FIG. 4.

Further, a central axis of the finger 20 coincides with major axes of the first deformable member 10 and the second deformable member 11.

Further, a position of the tip of the finger 20 generally coincides with a position of the second opening 15.

Pushing performed with the finger 20 placed at such a position in parallel with the up-and-down direction is assumed to be input of a specified pressing operation.

The user moves the finger 20 downward while maintaining the finger 20 at the position described above, and this results in pushing the first deformable member 10 and the second deformable member 11.

When, for example, the user moves the finger 20 downward in a state in which the first deformable member 10 and the second deformable member 11 are expanded, a pad of the finger 20 is brought into contact with the deformation surface 16 of the first deformable member 10. When the user further moves the finger 20 downward in this state, fluid maintained in the first space S1 is pushed out by the first deformable member 10 to flow out of the first opening 14.

This results in the first deformable member 10 being deformed to be deflated.

Further, the second deformable member 11 is arranged inside of the first deformable member 10. Thus, when the first deformable member 10 is deformed to be deflated, the first deformable member 10 is eventually brought into contact with the deformation surface 17 of the second deformable member 11.

Thus, the second deformable member 11 is pushed downward through the first deformable member 10, and fluid maintained in the second space S2 flows out of the second opening 15.

This results in the second deformable member 11 being deformed to be deflated.

The first deformable member 10 and the second deformable member 11 are eventually completely deflated to collapse.

The first deformable member 10 and the second deformable member 11 are pushed in the up-and-down direction with the finger 20 of the user, as described above.

Note that the first deformable member 10 and the second deformable member 20 may be pushed, with the finger 20 of the user being placed at an angle slightly offset from the up-and-down direction.

On the other hand, the first deformable member 10 and the second deformable member 20 are designed on the assumption that pushing performed in the up-and-down direction is input of a specified pressing operation. Thus, in the present embodiment, the first deformable member 10 and the second deformable member 20 are designed on the assumption that the up-and-down direction is the pressing direction.

It can also be said that the up-and-down direction is a primary direction of pressing performed in response to a specified pressing operation being input.

A position assumed to be a position at which pushing is performed with the finger 20 is not limited.

The orientation of the tip of the finger 20 and the position of the central axis of the finger 20 are also not limited.

Further, a pressing direction in which pressing is performed with the finger 20 is also not limited, and pressing performed from any direction may be assumed.

For example, pushing may be performed obliquely.

An operation assumed to be input of a specified pressing operation is not limited to pushing.

For example, an operation of tracing or pinching with the finger 20 may be assumed.

Moreover, the first deformable member 10 and the second deformable member 11 may be designed on the assumption that any operation that causes pressing to be performed with respect to the first deformable member 10 and the second deformable member 11 is input of a specified pressing operation.

Any object may be assumed to be an operative body used when a specified pressing operation is input.

Typically, an object with which a tactile sense can be felt is assumed to be the operative body. For example, the tactile sense providing apparatus 1 may be applied to facial equipment, and a body part other than the finger 20 may be assumed to be the operative body, such as the case in which a cheek of a user is assumed to be the operative body.

Further, a portion of a body of an animal, such as a dog, that is other than a human may be assumed to be the operative body.

When the tactile sense providing apparatus 1 serves as an input apparatus, an input device such as a touch pen may be assumed.

[Position of Opening]

The first opening 14 is formed to be closed through the first deformable member 10 when the first deformable member 10 and the second deformable member 11 are pushed with the finger 20.

The first opening 14 is closed through the first deformable member 10, and this enables the first opening 14 to be closed with certainty in response to pushing being performed.

Specifically, when the first deformable member 10 and the second deformable member 11 are pushed with the finger 20, the first deformable member 10 is deformed, and fluid maintained in the first space S1 flows out of the first opening 14. A portion of the first deformable member 10 is eventually brought into contact with the upper surface 2a of the base 2.

A position at which the first opening 14 is formed is determined such that the first opening 14 is closed through the first deformable member 10 at this point.

In the present embodiment, the first opening 14 is formed on the major axis of the outer peripheral portion 12a of the first deformable member 10, as viewed from the up-and-down direction. Further, the first opening 14 is formed at the same position as the inflow control opening 4. In other words, in the upper surface 2a, the first opening 14 is formed in the middle in the depth direction and further rightward than the middle in the right-and-left direction.

Further, the second opening 15 is formed not to be closed when the first deformable member 10 and the second deformable member 11 are pushed with the finger 20.

When the pushing is performed, the first deformable member 10 is deformed to be brought into contact with the second deformable member 11. The second deformable member 11 is deformed, and a portion of the second deformable member 11 is eventually brought into contact with the upper surface 2a of the base 2.

A position at which the second opening 15 is formed is determined such that the second opening 15 is not closed at this point.

In the present embodiment, the second opening 15 is formed on the major axis of the outer peripheral portion 12a of the first deformable member 10, as viewed from the up-and-down direction. Further, in the upper surface 2a, the second opening 15 is formed in the middle in the depth direction and further leftward than the middle in the right-and-left direction.

When another position is assumed to be the position at which pushing is performed with the finger 20, the position at which the first opening 14 is formed and the position at which the second opening 15 is formed are adjusted according to the other pressing position.

Further, when an operation other than the pushing performed with the finger 20 is assumed to be input of a specified pressing operation, or when an object other than the finger 20 is assumed to be an operative body, the position at which the first opening 14 is formed and the position at which the second opening 15 is formed are also adjusted according to the type of pressing operation or the type of operative body.

The configuration in which the second opening 15 is not closed can also be provided by, for example, a notch, a recess, or a slit being formed to communicate with the second opening 15.

Further, the configuration in which the first opening 14 is closed and the configuration in which the second opening 15 is not closed may be provided by the positions, materials, or shapes of the first deformable member 10 and the second deformable member 11 being adjusted.

Moreover, any configurations may be adopted as the configuration in which the first opening 14 is closed and the configuration in which the second opening 15 is not closed.

Note that a pressing operation other than the specified pressing operation may be input to the first deformable member 10 and the second deformable member 11.

In this case, there is a possibility that the first opening will not be closed in response to the other pressing operation being input. Further, the second opening may be closed depending on the input of the other pressing operation.

[Basic Operation]

A basic operation of the tactile sense providing apparatus 1 is described with reference to FIGS. 5 to 7.

Figure 6:
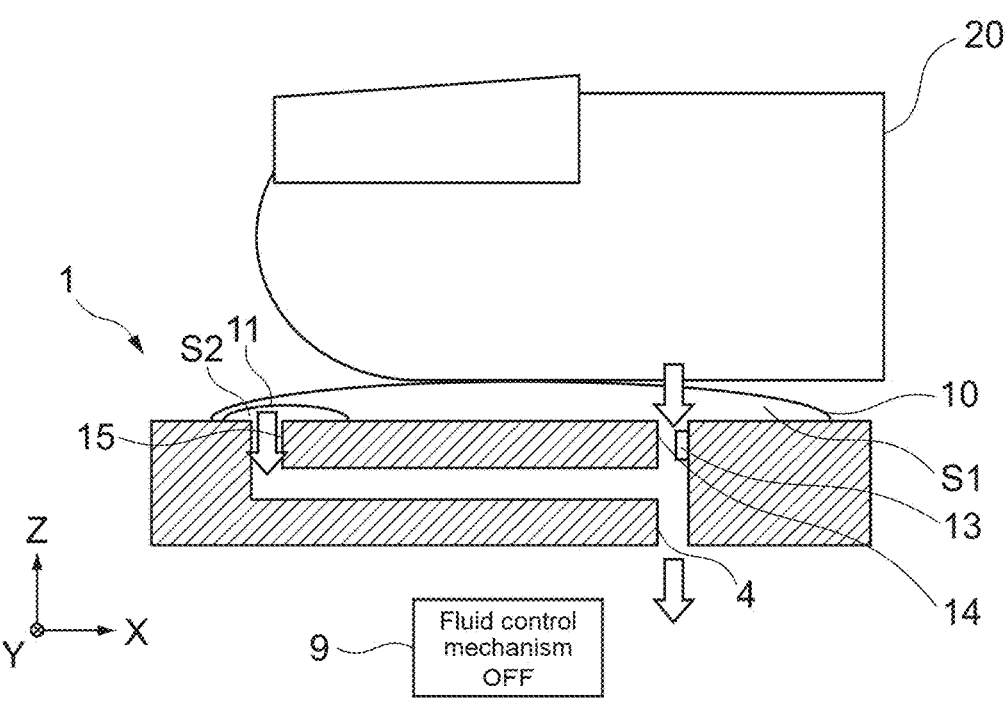
FIG. 6 schematically illustrates the example of the operation of the tactile sense providing apparatus.
Figure 7:
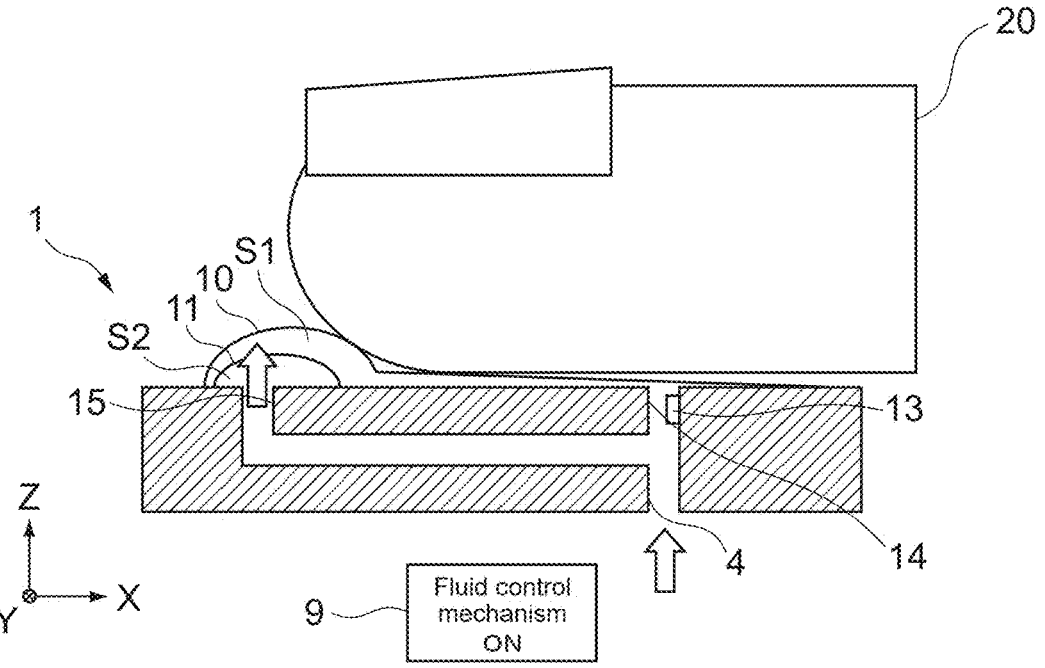
FIG. 7 schematically illustrates the example of the operation of the tactile sense providing apparatus.

FIGS. 5 to 7 schematically illustrate an example of an operation of the tactile sense providing apparatus 1. Note that each of FIGS. 5 to 7 is a cross-sectional view along the line B-B illustrated in FIG. 4.

FIGS. 5 to 7 each schematically illustrate the finger 20 of the user. Further, FIGS. 5 to 7 each schematically illustrate an arrow indicating a direction in which fluid flows in a corresponding state.

FIG. 5 illustrates a state in which fluid flows into the first space S1 and the second space S2 by the fluid control mechanism 9 being driven, and thus the first deformable member 10 and the second deformable member 11 are expanded.

Further, a portion of the pad of the finger 20 of the user is in contact with the deformation surface 16 of the first deformable member 10. Note that the first deformable member 10 is not pushed with the finger 20.

In this state, the first deformable member 10 and the second deformable member 11 are not further expanded, but the fluid control mechanism 9 is continuously driven to maintain a state in which fluid is continuously caused to flow into the first space S1 and the second space S2. Accordingly, the first deformable member 10 and the second deformable member 11 remain expanded.

FIG. 6 illustrates a state in which pushing is performed with the finger 20.

The fluid control mechanism 9 stops the flow of fluid into the inflow control opening 4 during shrinkage of the first space S1.

When pushing performed with the finger 20 is started, fluid maintained in the first space S1 flows out of the first space S1, and the first space S1 shrinks. During the shrinkage, driving of the fluid control mechanism 9 is stopped.

The shrinkage of the first space S1 can be determined on the basis of a result of detection of fluid pressure that is performed by the pressure sensor 13.

When fluid maintained in the first space S1 flows out of the first space S1, the fluid flows downward to be headed for the inflow control opening 4 from the first opening 14. Thus, fluid also flows downward near the pressure sensor 13. The pressure sensor 13 detects that fluid pressure is applied downward, and a magnitude of the fluid pressure.

When the pressure sensor 13 detects that the fluid pressure is applied downward, the controller 7 determines that the first space S1 has started shrinking, and stops driving of the fluid control mechanism 9.

Of course, a device other than the pressure sensor 13 may be used, and the shrinkage of the first space S1 may be determined on the basis of a result of detection performed by the device.

When, for example, the fluid control mechanism 9 is continuously driven while pushing is being performed with the finger 20, a force caused by the fluid control mechanism 9 causing fluid to flow into the first space S1 may be greater than a force caused by the first deformable member 10 pushing fluid out of the first space S1. In such a case, fluid does not flow out of the first space S1, and thus the first deformable member 10 is not deflated.

When driving of the fluid control mechanism 9 is stopped, the force with which fluid is caused to flow into the first space S1 is not caused, and thus the outflow of fluid is not prevented. This enables the first deformable member 10 to be smoothly deformed to be deflated.

Note that driving of the fluid control mechanism 9 may be controlled such that a force of the inflow of fluid is made weaker during shrinkage of the first space S1, without stopping the inflow of the fluid.

In this case, a magnitude of a force of the fluid outflow when pushing is performed is assumed, and a volume, a speed, and the like of the fluid inflow caused by the fluid control mechanism 9 to be performed is adjusted such that the fluid inflow is performed with a force weaker than the assumed force.

Moreover, an operation of the fluid control mechanism 9 during shrinkage of the first space S1 is not limited.

When the first deformable member 10 is deformed to be deflated due to pushing being performed, the first deformable member 10 is brought into contact with the deformation surface 17 of the second deformable member 11, and the second deformable member 11 is pressed through the first deformable member 10.

Accordingly, the second deformable member 11 is also deformed to be deflated. Note that driving of the fluid control mechanism 9 is also stopped during this period of time, and thus the outflow of fluid maintained in the second space S2 is not prevented.

When the pushing is continuously performed, the first deformable member 10 and the second deformable member 11 are eventually completely deflated to collapse.

Here, the first opening 14 is closed through the first deformable member 10. On the other hand, the second opening 15 is not closed.

When the first opening 14 is closed, fluid does not flow out of the first space S1, and thus fluid does not flow near the pressure sensor 13. In other words, fluid pressure detected by the pressure sensor 13 is zero.

When the fluid pressure detected by the pressure sensor 13 is zero, the controller 7 detects that the first opening 14 is closed.

Note that the "fluid pressure is zero" means that the fluid pressure is equal to atmospheric pressure.

Note that there is a possibility that, when the first opening 14 is closed, fluid will also flow slightly near the pressure sensor 13 and fluid pressure detected by the pressure sensor 13 will not be exactly zero.

In order to also detect the closing of the first opening 14 in such a case, the controller 7 may detect the closing of the first opening 14 at a timing at which fluid pressure detected by the pressure sensor 13 exhibits a low value (a value close to zero).

Further, fluid also does not flow near the pressure sensor 13 when, for example, the first deformable member 10 and the second deformable member are expanded and pushing is not performed (the state illustrated in FIG. 5). In other words, fluid pressure detected by the pressure sensor 13 is zero.

However, the fluid control mechanism 9 is driven in this state. On the other hand, the fluid control mechanism 9 is not driven when the first opening 14 is closed.

Thus, a state of the tactile sense providing apparatus 1 can be determined by a detected fluid pressure and whether the fluid control mechanism 9 is driven being used in combination, such as "the state illustrated in FIG. 5 corresponds to the case in which the fluid pressure detected by the pressure sensor 13 is zero and the fluid control mechanism 9 is driven", and "a state in which the first opening 14 is closed corresponds to the case in which the fluid pressure is zero and the fluid control mechanism 9 is not driven".

In the present embodiment, the controller 7 and the pressure sensor 13 serve as a detector that detects that the first opening 14 is closed.

In the present embodiment, the controller 7 detects closing of the first opening 14 and shrinkage of the first space S1 on the basis of a result of detection performed by the pressure sensor 13. This makes it possible to accurately detect the closing of the first opening 14 and the shrinkage of the first space S1.

Of course, the closing of the first opening 14 and the like may be performed on the basis of a result of detection performed by a device other than the pressure sensor 13. For example, a distance sensor may be used.

Further, a plurality of devices such as the pressure sensor 13 and a distance sensor may be included in the detector.

In other words, the detection may be performed on the basis of a result of detection performed by a plurality of devices.

When the first opening 14 is closed, the fluid control mechanism 9 starts causing fluid to flow into the inflow control opening 4.

When the controller 7 acquires a result of detection (fluid pressure is zero) performed by the pressure sensor 13, the controller 7 starts driving the fluid control mechanism 9. This results in fluid flowing into the inflow control opening 4.

When the fluid flows into the inflow control opening 4, the fluid intends to flow into the first space S1 through the first opening 14. However, the first opening 14 is closed through the first deformable member 10. This prevents the fluid from flowing into the first space S1. Thus, the first deformable member 10 keeps on being pressed with the finger 20 in a collapsing state.

On the other hand, fluid flows into the second space S2 through the second opening 15. This results in the second space S2 being expanded, and thus in the second deformable member 11 being expanded.

FIG. 7 illustrates a state in which the first deformable member 10 is pressed in a collapsing state and the second deformable member 11 is completely expanded. Also in this state, the fluid control mechanism 9 is continuously driven to maintain a state in which fluid is continuously caused to flow into the second space S2. Accordingly, the second deformable member 11 remains expanded.

In the present embodiment, the flow of fluid into the inflow control opening 4 is controlled by the fluid control mechanism 9. This makes it possible to accurately change the shapes of the first deformable member 10 and the second deformable member 11.

Further, in the present embodiment, when the first opening 14 is not closed, switching between a state in which the inflow of fluid is caused by the fluid control mechanism 9 to be performed and a state in which the inflow of the fluid is stopped by the fluid control mechanism 9, is performed according to whether pushing is performed. Further, when the first opening 14 is closed, the inflow of fluid is caused by the fluid control mechanism 9 to be performed.

Thus, it can be said that the fluid control mechanism 9 controls the flow of fluid into the inflow control opening 4 according to whether the first opening 14 is closed.

This makes it possible to accurately change the shape of the second deformable member 11 when, for example, the first opening 14 is closed.

Details of control performed by the fluid control mechanism 9 on the fluid inflow according to whether the first opening 14 is closed, are not limited.

The fluid inflow caused by the fluid control mechanism 9 to be performed may be stopped when, for example, the first opening 14 is closed. Appropriate details of control may be adopted according to the configuration of the tactile sense providing apparatus 1.

Further, in the present embodiment, the controller 7 acquires a result (such as fluid pressure) of detection performed by the pressure sensor 13, and controls the fluid inflow caused by the fluid control mechanism 9 to be performed.

Thus, it can be said that the fluid control mechanism 9 controls the flow of fluid into the inflow control opening 4 on the basis of the result of detection performed by the pressure sensor 13.

Details of control performed by the fluid control mechanism 9 on the fluid inflow on the basis of a result of detection performed by the pressure sensor 13, are not limited.

For example, control such as changing, according to a magnitude of detected pressure, a volume or a speed of the fluid inflow caused by the fluid control mechanism 9 to be performed, can also be performed. Appropriate details of control may be adopted according to the configuration of the tactile sense providing apparatus 1.

[Provision of Tactile Sense]

The fluid control mechanism 9 provides a tactile sense to the finger 20 of the user by changing the shapes of the first deformable member 10 and the second deformable member 11.

The type of tactile sense provided to a user is described.

In the present embodiment, the finger 20 of the user is brought into contact with the first deformable member 10. Further, the first deformable member 10 and the second deformable member 11 are pressed with the finger 20.

At this point, the user can feel the shapes of the first deformable member 10 and the second deformable member 11 in the form of a tactile sense.

For example, when the finger 20 is brought into contact with the first deformable member 10 and pressing is not performed (the state illustrated in FIG. 5), the first deformable member 10 is in contact with a narrow range around the center of the pad of the finger 20.

This state enables the user to feel pressure in a narrow range around the center of the pad of the finger 20.

When pressing is performed with the finger 20 (the state illustrated in FIG. 6), the area of contact of the first deformable member 10 with the pad of the finger 20 is gradually increased. The first deformable member 10 is eventually in contact with a wide range of the pad of the finger 20.

Further, the first deformable member 10 exerts a pressing reaction against the finger 20.

This state enables the user to feel pressure in a wide range of the pad of the finger 20.

When the first deformable member 10 is pressed with the finger 20 in a collapsing state and the second deformable member 11 is expanded (the state illustrated in FIG. 7), a portion of the first deformable member 10 is pressed by the second deformable member 11 to be expanded at the same time. A peripheral edge of the finger 20 is subjected to pressure applied by the expanded first deformable member 10.

Specifically, a portion of the finger 20 that overlaps the second deformable member 11, as illustrated in FIG. 4, is roughly subjected to pressure. In other words, a portion near a fingertip on the peripheral edge of the finger 20 as viewed from above is subjected to pressure.

As described above, first, the user feels pressure in a narrow range of the pad of the finger 20, and a range in which the user feels pressure is gradually made wider. Then, the user feels pressure on the peripheral edge of the fingertip.

The fluid control mechanism 9 provides such a tactile sense to the user.

Of course, the type of tactile sense provided to the finger 20 of the user is not limited.

For example, the adjustment of, for example, the shapes and the positions of the first deformable member 10 and the second deformable member 11 makes it possible to provide various tactile senses to the user.

First Embodiment

The embodiments of the tactile sense providing apparatus 1 according to the present technology are described in more detail with reference to FIGS. 8 to 14.

Figure 8:
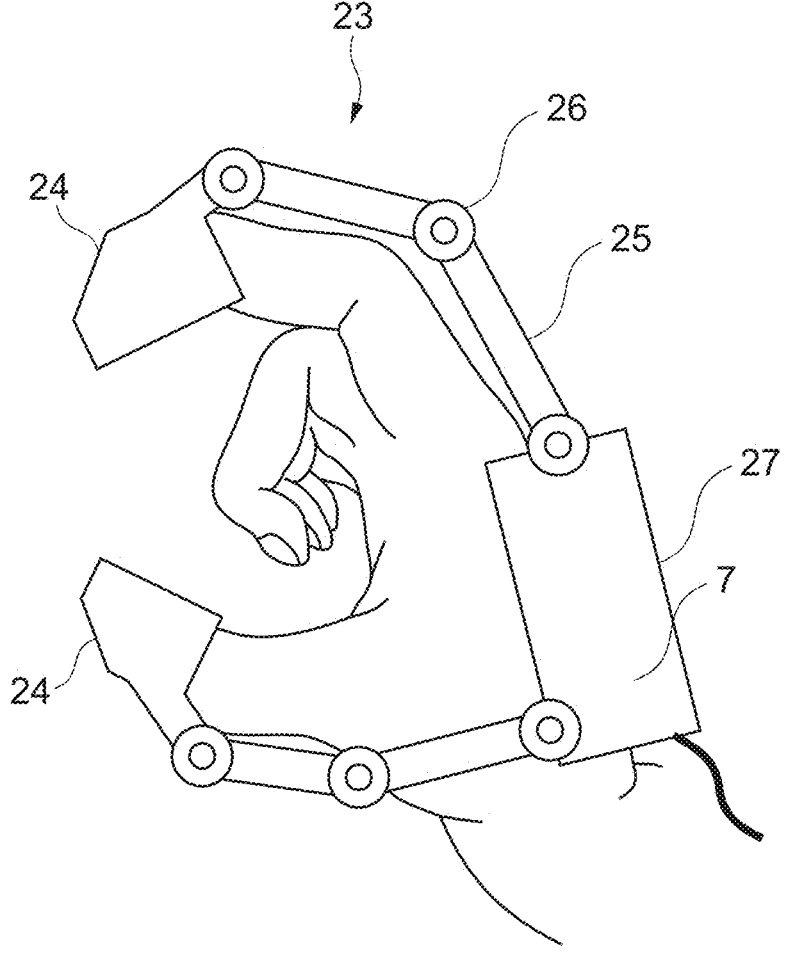
FIG. 8 schematically illustrates an example of a configuration of a linkage mechanism that is included in the tactile sense providing apparatus.

FIG. 8 schematically illustrates an example of a configuration of a linkage mechanism that is included in the tactile sense providing apparatus 1.

Figure 9:
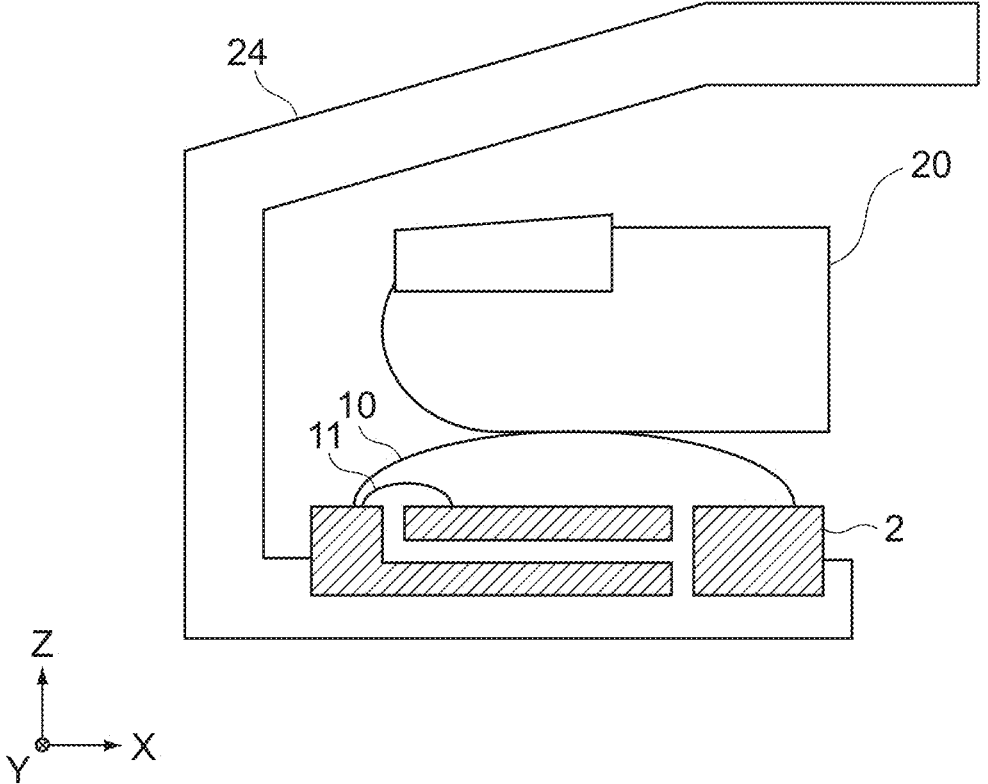
FIG. 9 schematically illustrates a state in which an attachment portion that is included in the linkage mechanism is worn on a finger.

FIG. 9 schematically illustrates a state in which an attachment portion that is included in the linkage mechanism is worn on the finger.

[Linkage Mechanism]

In the present embodiment, the tactile sense providing apparatus 1 includes a linkage mechanism 23.

FIG. 8 illustrates the linkage mechanism 23 worn on the finger 20 of the user.

The linkage mechanism 23 includes an attachment portion 24, a plurality of links 25, a plurality of joints 26, and a base 27.

The attachment portion 24 is a member that is worn on the finger 20 of the user. An opening is formed in the attachment portion 24, and the attachment portion 24 is worn on the finger 20 by the finger 20 being inserted into the opening.

A specific configuration such as a shape of the attachment portion 24 is not limited.

Note that, in the present embodiment, the attachment portions 24 are respectively worn on an index finger and a thumb of the user. Without being limited thereto, the attachment portions 24 may be worn on any finger other than the index finger and the thumb.

The link 25 is a rod-shaped member.

The joint 26 is a member that rotatably connects the attachment portion 24 and the link 25 or rotatably connects the links 25.

When the joints 26 are driven, the attachment portion 24 and link 25 being connected to each other by the joint 26 are rotated about the joint 26, and the links 25 being connected to each other by the joint 26 are rotated about the joint 26.

The base 27 is a member that holds the attachment portion 24, the respective links 25, and the respective joints 26. In the present embodiment, two joints 26 are connected to the base 27. Further, with each connected joint 26 being a start point, the link 25 and the joint 26 are alternately connected, and the attachment portion 24 is connected on the tip.

The base 27 includes the controller 7 illustrated in FIG. 2. Of course, the controller 7 may be provided to a portion other than the base 27.

As described above, an attachable linkage mechanism 23 that is worn on a hand of the user includes the attachment portion 24, a plurality of links 25, a plurality of joints 26, and the base 27.

Further, it can also be said that the tactile sense providing apparatus 1 is configured to be worn on the finger 20 of the user.

A specific configuration of the linkage mechanism 23 is not limited, and any configuration may be adopted.

In the present embodiment, the controller 7 controls driving of the linkage mechanism 23.

Specifically, the controller 7 controls driving of each joint 26. This results in the attachment portion 24 and the links 25 being rotated about the respective joints 26.

This makes it possible to change relative positions of two attachment portions 24, and thus to perform movement such as moving the index finger and the thumb such that the index finger and the thumb are situated away from each other and moving the index finger and the thumb such that the index finger and the thumb are situated close to each other.

How driving of the linkage mechanism 23 is controlled is not limited.

FIG. 9 schematically illustrates a state in which the attachment portion 24 is worn on the finger 20.

Note that, in FIG. 9, the finger 20 on which the attachment portion 24 is worn is an index finger.

As illustrated in FIG. 9, the base 2, the first deformable member 10, and the second deformable member 11 are placed in the attachment portion 24.

Note that an illustration of the pressure sensor 13 arranged in the flow path 6 is omitted in FIG. 9 and the figures subsequent to FIG. 9.

In the present embodiment, the linkage mechanism 23 moves the base 2 relative to the finger 20 of the user to cause the first deformable member 10 and the second deformable member 11 to be pushed with the finger 20.

Specifically, driving of the linkage mechanism 23 is controlled such that a force is upwardly applied to the attachment portion 24 in a state in which the finger 20 is in contact with the first deformable member 10, as illustrated in, for example, FIG. 9.

Consequently, a force is upwardly applied to the base 2 from the attachment portion 24. Further, a force is upwardly applied to the finger 20 from the first deformable member 10.

Thus, the first deformable member 10 is subjected to reaction from the finger 20 to be pushed due to the reaction. Accordingly, pushing is performed with the finger 20.

In this case, the first deformable member is deformed to be deflated. Thus, the base 2 is upwardly moved relative to the finger 20.

Further, the linkage mechanism 23 stops the movement of the base 2 relative to the finger 20 when the first opening 14 is closed.

When the first opening 14 is closed through the first deformable member 10, a position of the base 2 relative to the finger 20 is not changed by the linkage mechanism 23 being driven. Thus, it can be said that the movement of the base 2 relative to the finger 20 is stopped.

As described above, the linkage mechanism 23 moves the base 2 relative to the finger 20 without the user moving the finger 20. This enables pushing to be performed with the finger 20.

Of course, details of control performed on driving of the linkage mechanism 23 in order to perform pushing are not limited.

In the present embodiment, the controller 7 and the linkage mechanism 23 serve as an embodiment of a drive section that moves the base 2 relative to an operative body to cause a specified pressing operation to be input using the operative body.

[Example of Applying Linkage Mechanism]

Typically, the present technology is used to provide a tactile sense to a user who is experiencing a virtual reality (VR) space.

For example, an immersive head-mounted display (HMD) is worn on a head of the user, and the linkage mechanism 23 is worn on a hand of the user. The user experiences a VR space by viewing a video provided by the HMD.

When, for example, the user comes into contact with a virtual object in the VR space, the controller 7 acquires information regarding the contact. The controller 7 controls driving of the linkage mechanism 23 on the basis of the acquired information regarding the contact. Consequently, the linkage mechanism 23 is driven and pushing is performed with the finger 20.

When the pushing is performed, a tactile sense (a sensation of pressure applied by the first deformable member 10) is provided to the finger 20.

The finger 20 is actually not in contact with the object. However, this enables the user to feel as if the user is in touch with the object.

Further, the present technology may be applied in order to provide a tactile sense to a user who is experiencing an augmented reality (AR) space.

In this case, a transmissive head-mounted display (HMD) is worn on a head of the user, and the linkage mechanism 23 is worn on a hand of the user. When the user comes into contact with a virtual object or a real object in the AR space, the linkage mechanism 23 starts operating, and a tactile sense is provided to the finger 20.

Of course, the present technology is not limited to being applied to those fields.

The configuration of the tactile sense providing apparatus 1 may be adjusted as appropriate in order to provide a tactile sense that causes a user to feel as if the user is in touch with an object.

Specifically, the shapes and the like of the first deformable member 10 and the second deformable member 11 are adjusted on the basis of the type of virtual object or real object assumed to be a contact target.

When, for example, a user is assumed to come into contact with a hard object such as a ball, the first deformable member 10 may be made of a hard material, and a tactile sense that causes the user to feel as if the user is in touch with a hard object may be provided to the user. Conversely, when the user is assumed to come into contact with a soft object such as a sponge, the first deformable member 10 may be made of a soft material.

Further, how a user comes into contact with an object may be assumed, and the configuration of the tactile sense providing apparatus 1 may be adjusted.

The shapes and the like of the first deformable member 10 and the second deformable member 11 may be adjusted according to the way of contact such as holding an object with an entire hand, pinching an object with a fingertip, and pushing with the finger 20.

Moreover, any method may be used to determine the configuration of the tactile sense providing apparatus 1 in order to provide a user with a tactile sense that causes the user to feel as if the user is in touch with an object.

[Example of Operations of Fluid Control Mechanism and Linkage Mechanism]

An example of operations of the fluid control mechanism 9 and the linkage mechanism 23 is described with reference to FIGS. 10 to 14.

Figure 10:
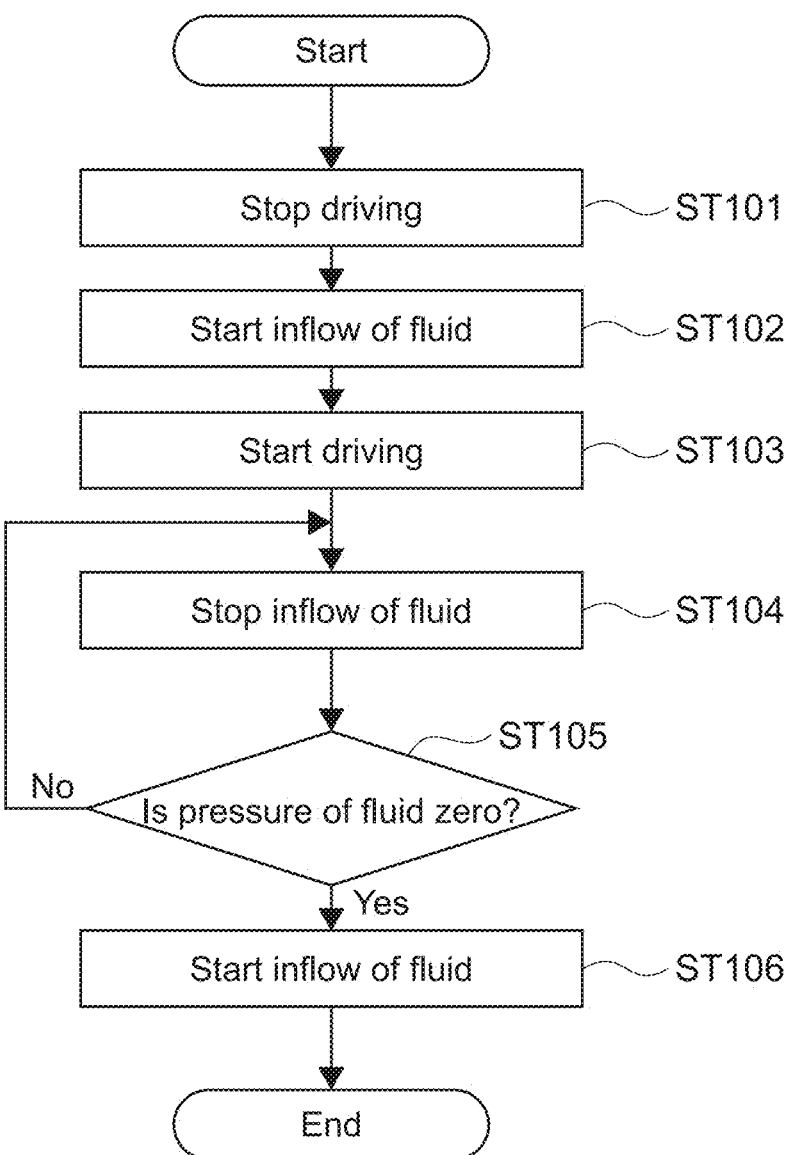
FIG. 10 is a flowchart illustrating an example of operations of a fluid control mechanism and a linkage mechanism.

FIG. 10 is a flowchart illustrating the example of the operations of the fluid control mechanism 9 and the linkage mechanism 23.

FIGS. 11 to 14 each schematically illustrate the example of the operations of the fluid control mechanism 9 and the linkage mechanism 23.

FIGS. 11 to 14 each schematically illustrate, using arrows, a direction in which fluid flows in a corresponding state, and a direction in which a force is applied to the attachment portion 24 due to the operation of the linkage mechanism 23 in the corresponding state.

FIG. 10 is a flowchart illustrating the example of the operations of the fluid control mechanism 9 and the linkage mechanism 23.

A series of operations in the flowchart is started when, for example, a user comes into contact with a virtual object or a real object.

Driving of the linkage mechanism 23 is stopped (Step 101).

Note that the fluid inflow caused by the fluid control mechanism 9 to be performed is also stopped. In Step 101, the first deformable member 10 and the second deformable member 11 are deflated and are not in contact with the finger 20, as illustrated in A of FIG. 11.

Driving of fluid control mechanism 9 is started and fluid flows into the inflow control opening 4 (Step 102).

Figure 12:
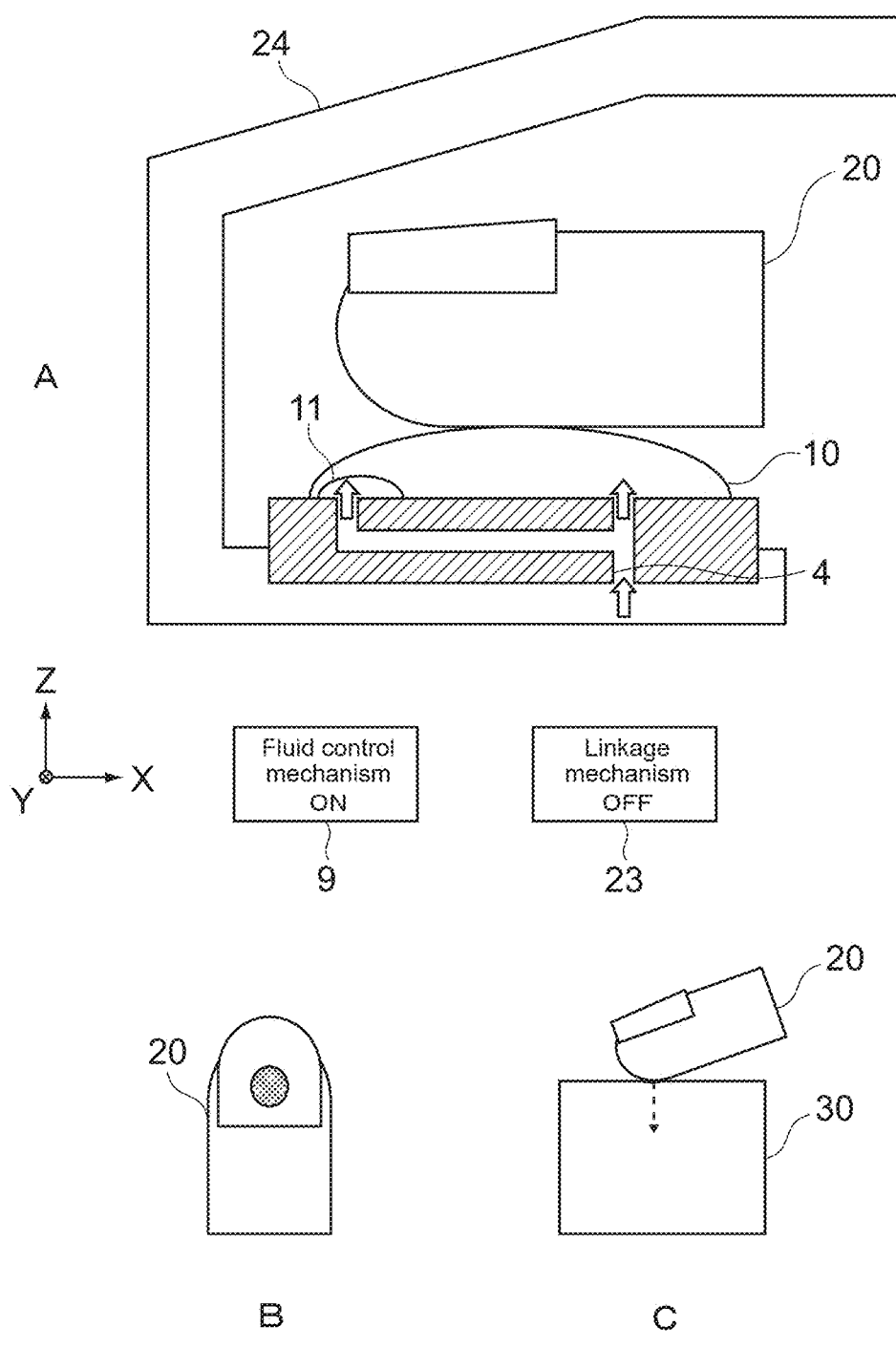
FIG. 12 schematically illustrates the example of the operations of the fluid control mechanism and the linkage mechanism.

When the fluid flows into the inflow control opening 4, the first deformable member 10 and the second deformable member 11 are expanded and brought into contact with the finger 20, as illustrated in A of FIG. 12.

Driving of the linkage mechanism 23 is started (Step 103).

Further, the fluid inflow caused by the fluid control mechanism 9 to be performed is stopped (Step 104).

Figure 13:
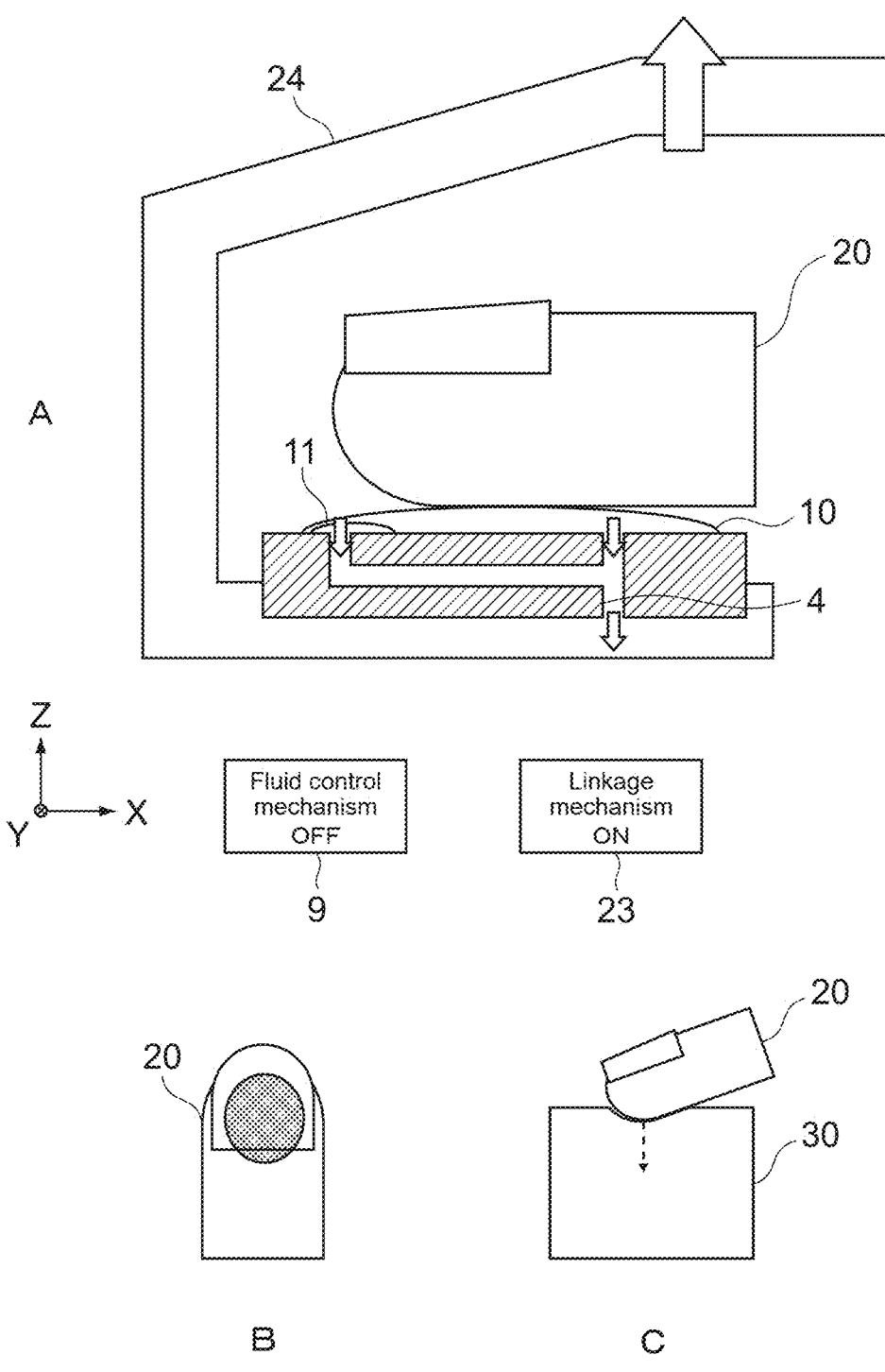
FIG. 13 schematically illustrates the example of the operations of the fluid control mechanism and the linkage mechanism.

Consequently, pushing is performed with the finger 20, and the first deformable member 10 and the second deformable member 11 are deformed to be deflated, as illustrated in A of FIG. 13.

The controller 7 determines whether fluid pressure is zero (Step 105). For example, a result of detection performed by the pressure sensor 13 is acquired at a specified frame rate, and the controller 7 performs the determination.

When the fluid pressure is not zero (No in Step 105), the fluid inflow remains stopped (Step 104).

When the fluid pressure is zero (Yes in Step 105), the first deformable member 10 and the second deformable member 11 are in a collapsing state, and the first opening 14 is closed. The inflow of fluid is started in this state (Step 106), and the second deformable member 11 is expanded, as illustrated in A of FIG. 14.

Note that the linkage mechanism 23 is also continuously driven in this state. Thus, the first deformable member 10 is continuously pressed with the finger 20, and the first opening 14 remains closed.

Such a series of processes is performed to perform pushing with the finger 20 and to provide a tactile sense to a user.

Of course, the application of the present technology is not limited to the flowchart illustrated in FIG. 10.

[Provision of Tactile Sense]

In the present embodiment, a series of operations illustrated in the flowchart in FIG. 10 is performed to provide a user with a tactile sense that causes the user to feel as if the finger 20 is sinking into an object.

In other words, a somewhat soft object that is deformed by being pushed is assumed to be an object (a virtual object or a real object) with which the finger 20 is to be brought into contact.

Details of a specific tactile sense provided to a user are described with reference to FIGS. 11 to 14.

Figure 11:
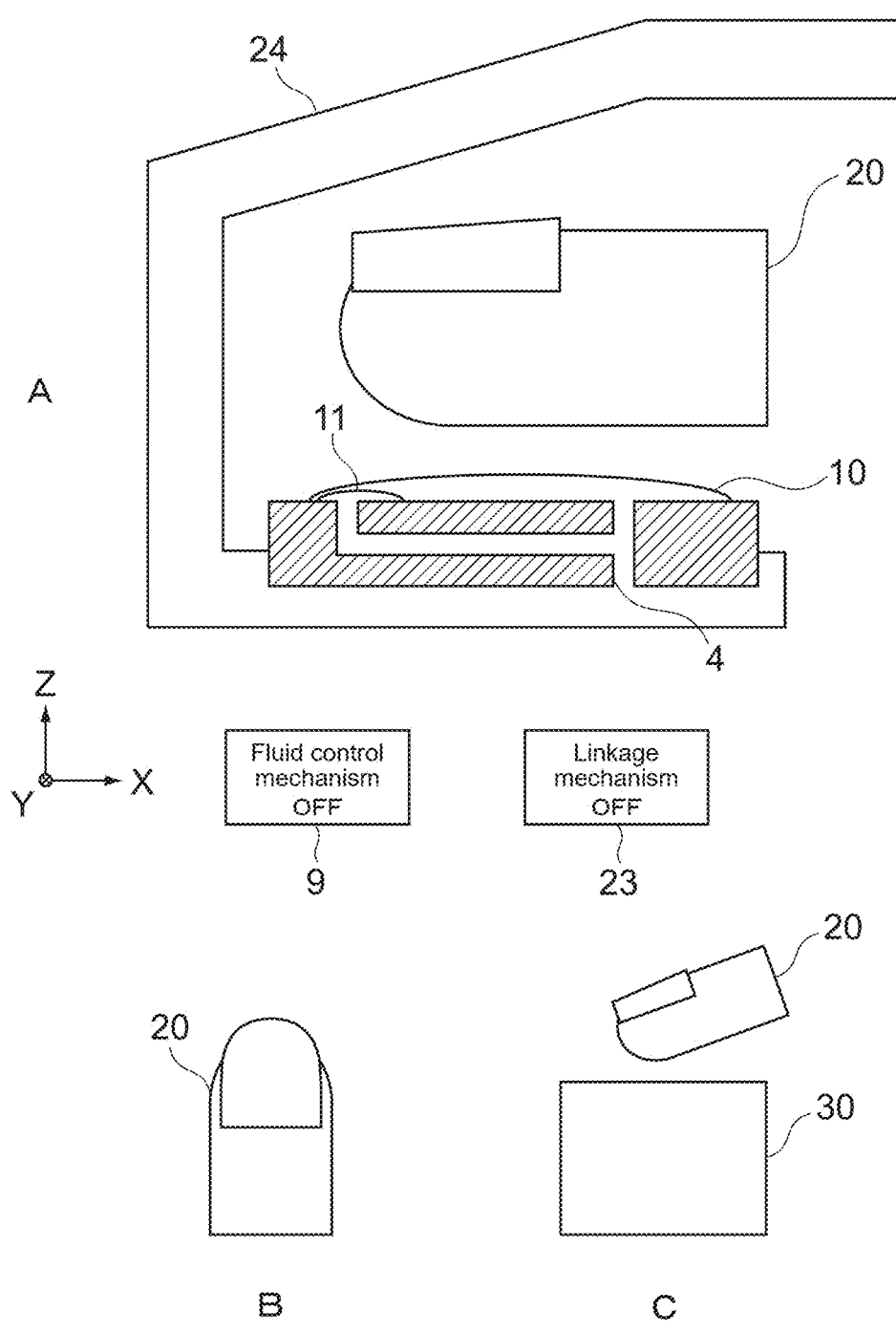
FIG. 11 schematically illustrates the example of the operations of the fluid control mechanism and the linkage mechanism.
Figure 14:
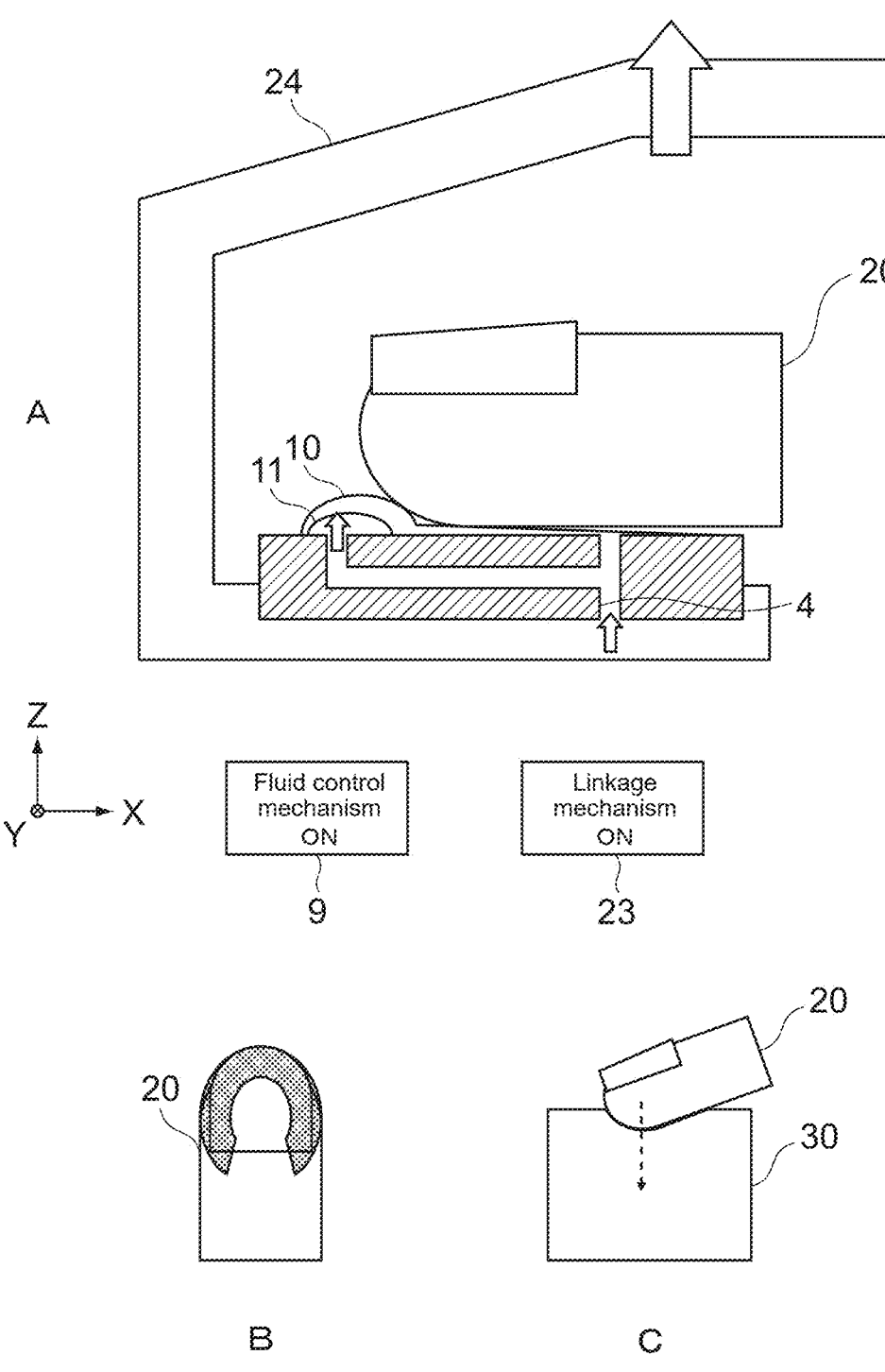
FIG. 14 schematically illustrates the example of the operations of the fluid control mechanism and the linkage mechanism.

A pressure range, on the finger 20 of a user, that is subjected to pressure is hatched in each of B of FIG. 11, B of FIG. 12, B of FIG. 13, and B of FIG. 14.

Further, C of FIG. 11, C of FIG. 12, C of FIG. 13, and C of FIG. 14 schematically illustrate a state in which the finger 20 is sinking into an object 30.

B of FIG. 11 illustrates the pressure range on the finger 20 in a state illustrated in A of FIG. 11.

C of FIG. 11 illustrates a state when the finger 20 sinks into the object 30, the state corresponding to the state illustrated in A of FIG. 11.

In the state illustrated in A of FIG. 11, the finger 20 is not in contact with the first deformable member 10.

In other words, there is no pressure range on the finger 20, as illustrated in B of FIG. 11.

Further, the state illustrated in A of FIG. 11 corresponds to a state in which the finger 20 is still not in contact with the object 30, as illustrated in C of FIG. 11.

In A of FIG. 12, the finger 20 is in contact with the first deformable member 10.

In this state, a narrow range of the pad of the finger 20 is subjected to pressure, as illustrated in B of FIG. 12.

This state corresponds to a state in which the pad of the finger 20 has slightly sunk into the object 30, as illustrated in C of FIG. 12.

In A of FIG. 13, the first deformable member 10 is pushed with the finger 20.

In this state, a wide range of the pad of the finger 20 is subjected to pressure, as illustrated in B of FIG. 13.

This state corresponds to a state in which the pad of the finger 20 has sunk into the object 30 deeper than in the state illustrated in C of FIG. 12, as illustrated in C of FIG. 13.

In A of FIG. 14, the second deformable member 11 is expanded.

In this state, the peripheral edge of the finger 20 is subjected to pressure, as illustrated in B of FIG. 14.

This state corresponds to a state in which the pad of the finger 20 has sunk into the object 30 deeper than in the state illustrated in C of FIG. 13, as illustrated in C of FIG. 14.

When the finger 20 sinks into the object 30, the user perceives, in the form of a tactile sense, reaction to which the finger 20 is subjected from the object 30, and the area of contact of the finger 20 with the object 30. The user perceives a change in reaction and in the area of contact to feel as if the finger 20 is sinking into the object 30.

In the present embodiment, reaction to which the finger 20 is subjected from the first deformable member 10 is changed in order of A of FIG. 11, A of FIG. 12, and A of FIG. 13. Further, the area of contact of the finger 20 with the object 30 is increased in order of B of FIG. 11, B of FIG. 12, and B of FIG. 13.

In other words, a state change illustrated in FIGS. 11 to 13 reproduces a sense that the finger 20 is sinking into the object 30.

Further, in particular, the peripheral edge of the finger 20 is subjected to high pressure when the finger 20 sinks into the object 30 much deeper. In other words, when the peripheral edge of the finger 20 is subjected to high pressure, this enables the user to feel as if the finger 20 is sinking into the object 30 much deeper.

In a state illustrated in FIG. 14, the peripheral edge of the finger 20 is subjected to pressure, and such a feeling is reproduced.

As described above, the series of operations illustrated in the flowchart in FIG. 10 is performed to provide a user with a tactile sense that causes the user to feel as if the finger 20 is sinking into an object.

Of course, the type of tactile sense provided to a user is not limited. Details of the operations of the fluid control mechanism 9 and the linkage mechanism 23 may be determined as appropriate such that a desired tactile sense is provided.

As described above, in the tactile sense providing apparatus 1 according to the present embodiment, the first deformable member 10 and the second deformable member 11 are connected to the base 2. Further, the first opening 14 and the second opening 15 are formed in the base 2 and each communicate with the inflow control opening 4 through the flow path 6. When a specified pressing operation is input to the two deformable members 10 and 11, the first opening 14 is closed, and the second opening 15 is not closed. Thus, when the specified pressing operation is input, the first space S1 is not expanded, and the second space S2 is expanded.

This results in there being no need for, for example, a mechanism that controls deformations of the two deformable members 10 and 11 separately, and this makes it possible to make the apparatus smaller in size.

Devices that provide a tactile sense in addition to a visual sense and an auditory sense have been developed with developments of VR markets.

A large number of apparatuses that are intended for fingers and ordinarily used to grasp, hold, or operate an object have been proposed. Various methods and feelings are provided, and, for example, providing a force using a linkage mechanism, providing a pressure sensation or a texture sensation using an electric stimulus, oscillation, or a pin-array structure, and providing pressure using fluid and a deformable film have been proposed.

When different stimuli of a plurality of stimuli are provided to a finger, a method including dividing a stimulus-target region into regions and stimulating the regions separately, is used.

For example, a method including separately controlling pins of a plurality of pins or deformable films of a plurality of deformable films is used, where the plurality of pins or the plurality of deformable films is placed in order to provide a stimulus to a finger pad. However, there is a need for a plurality of drive sources and a control switching mechanism, and there is a need to perform control. This results in a large-scale control apparatus and in increasing a weight of an attachment portion.

The use of the present technology makes it possible to provide a plurality of kinds of deformation using a single drive source (a single structure). In other words, there is no need for, for example, a mechanism used to separately control two kinds of deformation of the two deformable members 10 and 11. This makes it possible to make the tactile sense providing apparatus 1 smaller in size and to make the mechanism simpler.

Second Embodiment

The tactile sense providing apparatus 1 of a second embodiment according to the present technology is described with reference to FIGS. 15 to 21.

In the following description, descriptions of a configuration and an operation that are similar to those of the tactile sense providing apparatus 1 described in the embodiment above are omitted or simplified.

Figure 15:
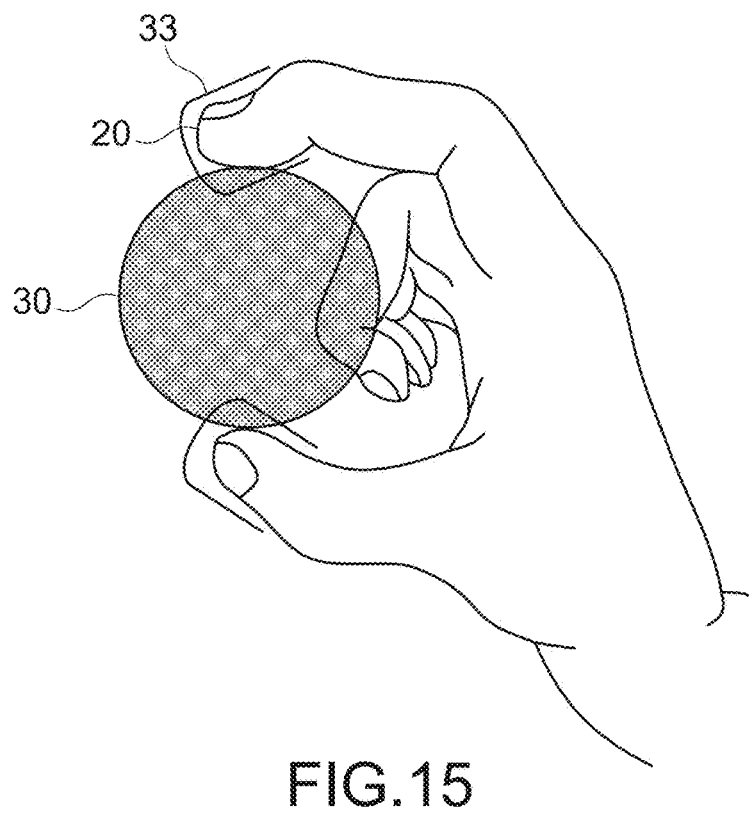
FIG. 15 schematically illustrates a state in which an object is held using a glove that is included in the tactile sense providing apparatus.

FIG. 15 schematically illustrates a state in which an object is held using a glove that is included in the tactile sense providing apparatus 1.

Figure 16:
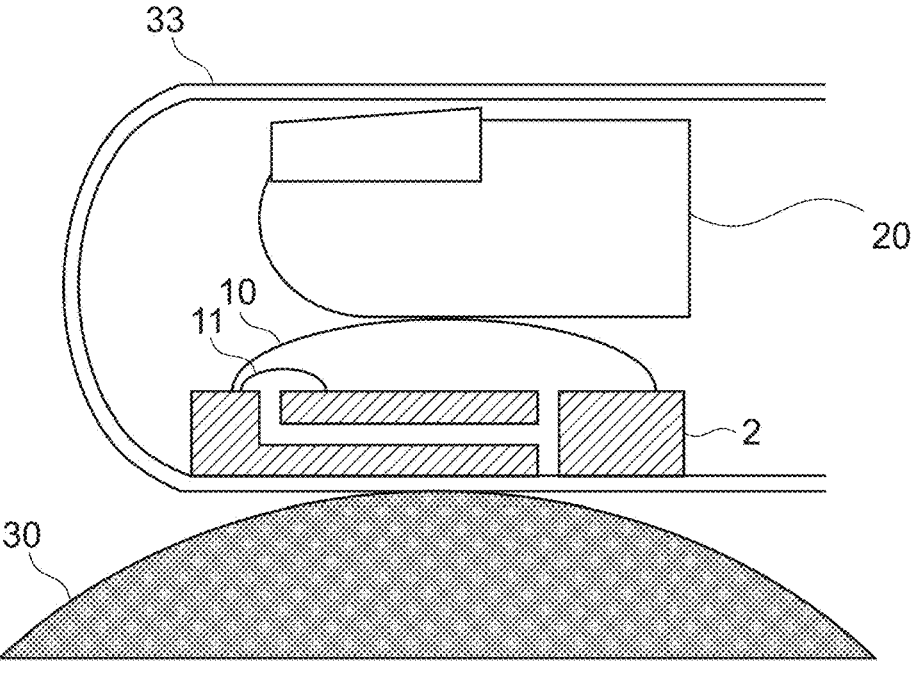
FIG. 16 schematically illustrates a state in which the glove is worn on a finger.
Figure 16:
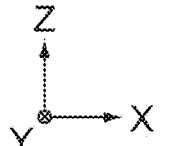

FIG. 16 schematically illustrates a state in which the glove is worn on the finger 20.

[Glove]

In the present embodiment, the tactile sense providing apparatus 1 includes a glove 33.

FIG. 15 illustrates the glove 33 worn on the finger 20 of the user.

Note that FIG. 15 only schematically illustrates portions of the glove 33 that are respectively worn on fingertips. Actually, the glove 33 is worn on the entirety of a hand of the user.

Further, a spherical object 30 is held using the glove 33.

FIG. 16 schematically illustrates a state in which the glove 33 is worn on the finger 20.

Note that the finger 20 on which the glove 33 is worn in FIG. 16 is an index finger.

As illustrated in FIG. 16, the base 2, the first deformable member 10, and the second deformable member 11 are placed in the glove 33.

Further, a portion that is included in an outer surface of the glove 33 and situated directly below the base 2 is in contact with the object 30.

A specific configuration of the glove 33 is not limited, and any configuration may be adopted.

In the present embodiment, the tactile sense providing apparatus 1 can also be worn on the finger 20 of the user.

In the present embodiment, when the spherical object 30 is held with the user's finger 20 on which the tactile sense providing apparatus 1 is worn, the first deformable member 10 and the second deformable member 11 are pushed with the finger 20 of the user.

Specifically, the object 30 is grasped using the glove 33 to hold the object 30, as illustrated in, for example, FIG. 15. In this case, the object 30 is taken between the user's index finger and the user's thumb using the glove 33.

Here, force is upwardly applied to a lower portion of the object 30 by the thumb.

Further, force is downwardly applied to an upper portion of the object 30 by the index finger. As illustrated in FIG. 16, the base 2, the first deformable member 10, and the second deformable member 11 are taken between the finger 20 (the index finger) and the object 30. Thus, the first deformable member 10 and the second deformable member 11 are pressed with the finger 20.

As described above, the first deformable member 10 and the second deformable member 11 are pushed using force of taking the first deformable member 10 and the second deformable member 11 between the finger 20 and the object 30.

In the first embodiment, pushing is performed by the linkage mechanism 23 being driven. In the present embodiment, the glove 33 does not include an actively driven mechanism. In this regard, the first embodiment and the present embodiment have different configurations.

[Example of Applying Glove]

The present technology is applied when the user who is wearing the glove 33 holds a real object 30.

For example, when the user who is experiencing an AR space holds the real object 30 in the AR space using the glove 33, pushing is performed, and a tactile sense is provided to the finger 20.

The finger 20 is not directly in contact with the real object 30. However, when a tactile sense is provided to the finger 20, this enables the user to experience in feeling as if the finger 20 is sinking into the real object 30.

Accordingly, even when, for example, a rigid real object 30 is held, a different feeling that causes a user to feel as if the user is holding a soft object 30 can be provided to the user.

Of course, the field to which the present technology is applied is not limited.

As in the first embodiment, the configuration of the tactile sense providing apparatus 1 may be adjusted as appropriate in order to provide a desired tactile sense.

Any method may be used to determine the configuration of the tactile sense providing apparatus 1 in order to provide a desired tactile sense to a user.

[Example of Operation of Fluid Control Mechanism]

An example of the operation of the fluid control mechanism 9 is described with reference to FIGS. 17 to 21.

Figure 17:
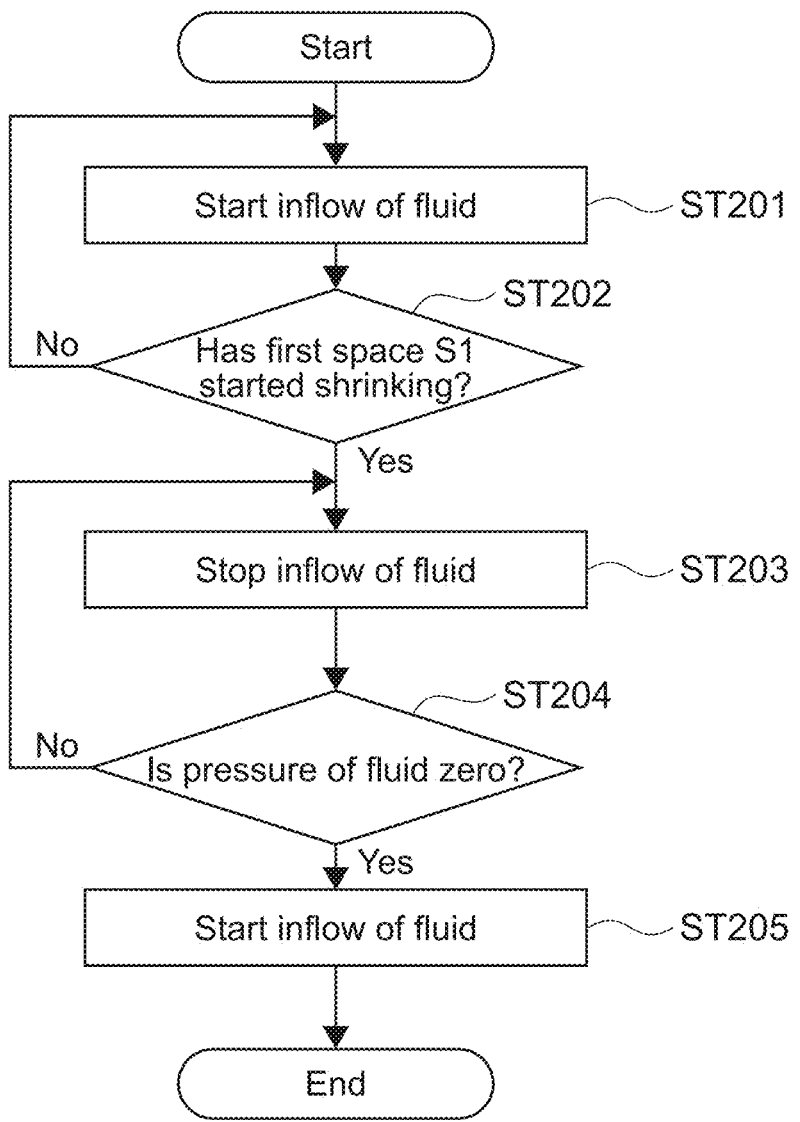
FIG. 17 is a flowchart illustrating an example of the operation of the fluid control mechanism.

FIG. 17 is a flowchart illustrating the example of the operation of the fluid control mechanism 9.

FIGS. 18 to 21 each schematically illustrate the example of the operation of the fluid control mechanism 9.

FIGS. 18 to 21 each schematically illustrate, using arrows, a direction in which fluid flows in a corresponding state.

A series of operations in the flowchart in FIG. 17 is started when, for example, a user comes into contact with a real object.

Figure 19:
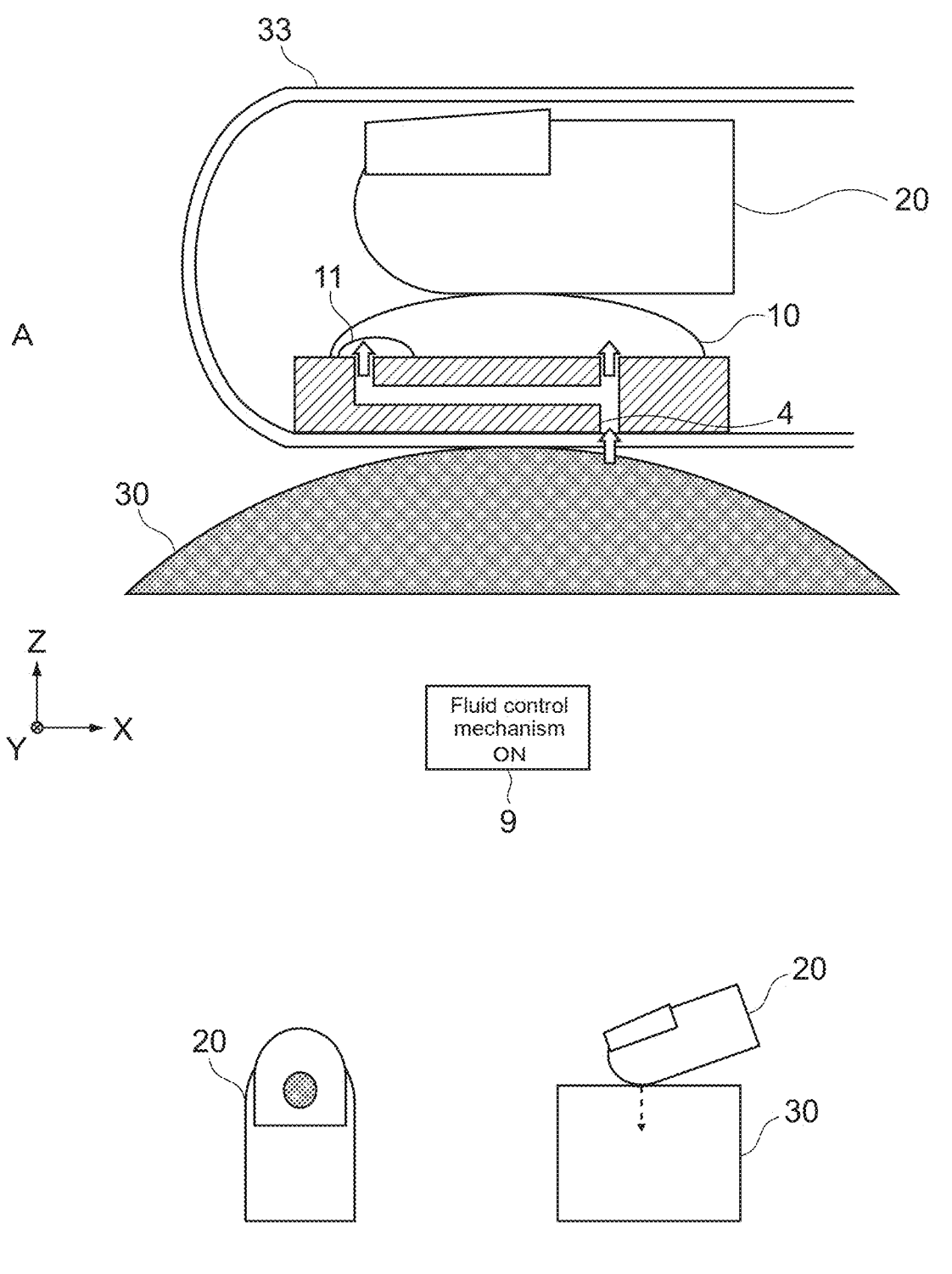
FIG. 19 schematically illustrates the example of the operation of the fluid control mechanism.

Just after the real object 30 is held by a user using the glove 33 (before the series of operations in the flowchart is started), the tactile sense providing apparatus 1 is in a state in which the first deformable member 10 and the second deformable member 11 are not expanded and the finger 20 is out of contact with the first deformable member 10, as illustrated in A of FIG. 19.

Driving of the fluid control mechanism 9 is started, and fluid flows into the inflow control opening 4 (Step 201).

When the fluid flows into the inflow control opening 4, the first deformable member 10 and the second deformable member 11 are expanded, and the first deformable member 10 is in contact with the finger 20, as illustrated in A of FIG. 19.

The controller 7 determines whether the first space S1 has started shrinking (Step 202).

For example, when the pressure sensor 13 detects that fluid pressure is applied downward, the controller 7 determines that the first space S1 has started shrinking.

For example, a result of detection performed by the pressure sensor 13 is acquired at a specified frame rate, and the controller 7 performs the determination.

When the first space S1 has not started shrinking (No in Step 202), the fluid keeps on flowing into the inflow control opening 4 (Step 201). Consequently, the first deformable member 10 and the second deformable member 11 remain expanded.

When the first space S1 has not started shrinking (Yes in Step 202), inflow of the fluid that is caused by the fluid control mechanism 9 to be performed is stopped (Step 203).

Figure 20:
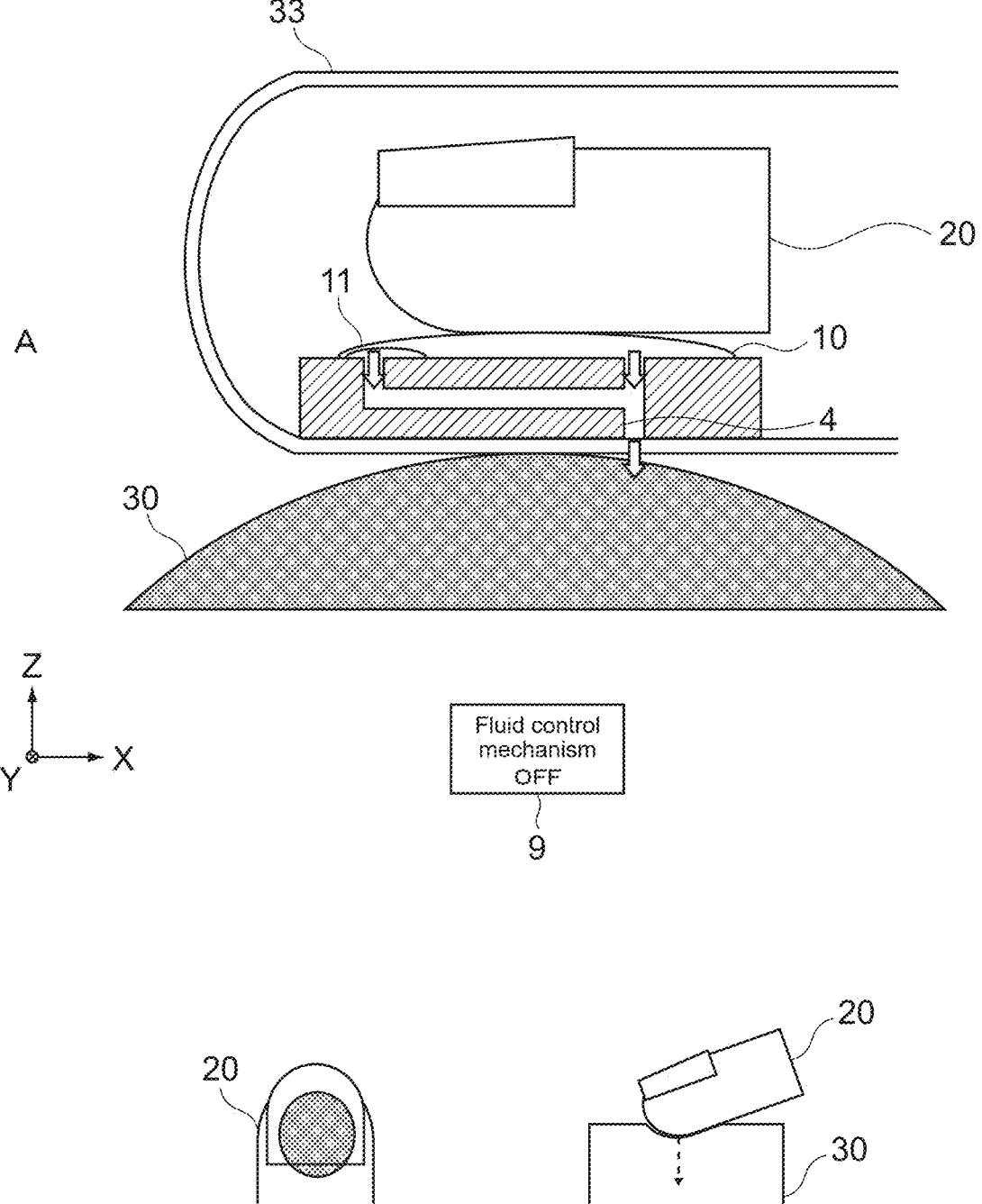
FIG. 20 schematically illustrates the example of the operation of the fluid control mechanism.

Consequently, the first deformable member 10 and the second deformable member 11 are pushed, and the first deformable member 10 and the second deformable member 11 are deformed to be deflated, as illustrated in A of FIG. 20.

The controller 7 determines whether fluid pressure is zero (Step 204).

When the fluid pressure is not zero (No in Step 204), the inflow of fluid remains stopped (Step 203).

When the fluid pressure is zero (Yes in Step 204), the first deformable member 10 and the second deformable member 11 are deflated, and the first opening 14 is closed. The inflow of fluid is started in this state (Step 205), and the second deformable member 11 is expanded, as illustrated in A of FIG. 21.

Note that the first deformable member 10 is continuously pressed with the finger 20 and the first opening 14 remains closed.

Such a series of processes is performed to perform pushing with the finger 20 and to provide a tactile sense to a user.

Of course, the application of the present technology is not limited to the flowchart illustrated in FIG. 10.

[Provision of Tactile Sense]

In the present embodiment, a series of operations illustrated in the flowchart in FIG. 17 is performed to provide a user with a tactile sense that causes the user to feel as if the finger 20 is sinking into the object 30.

Figure 18:
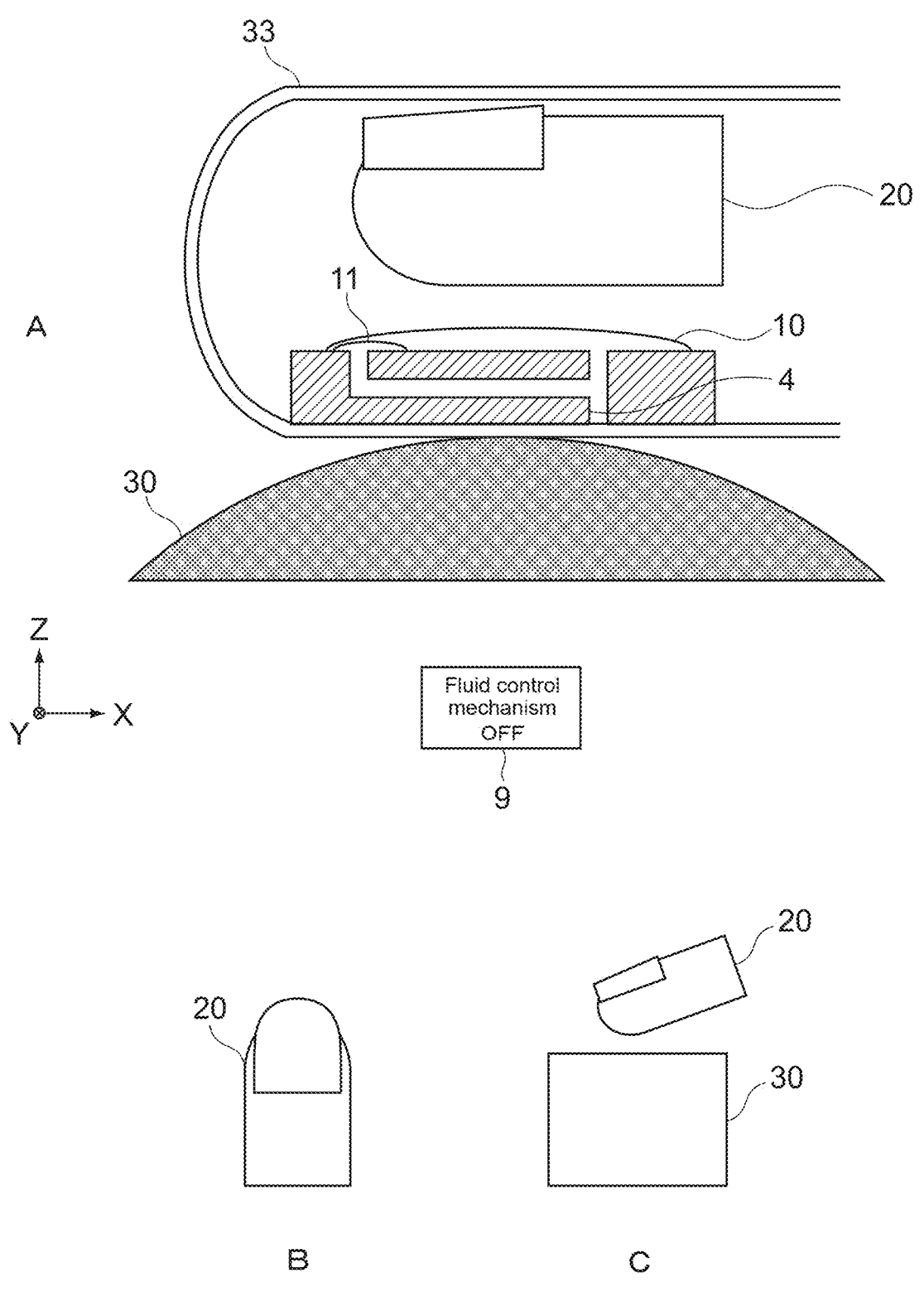
FIG. 18 schematically illustrates the example of the operation of the fluid control mechanism.
Figure 21:
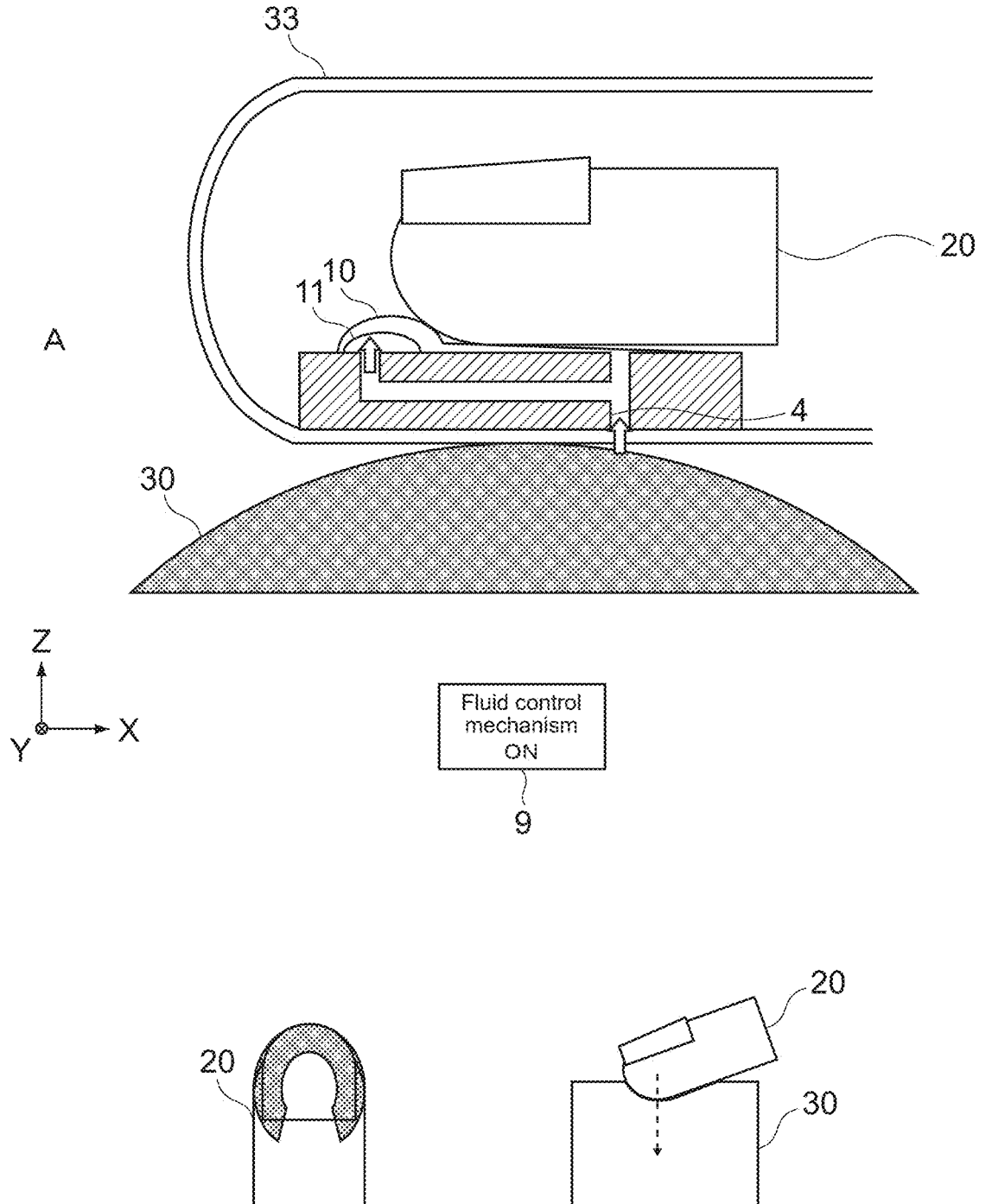
FIG. 21 schematically illustrates the example of the operation of the fluid control mechanism.

Specifically, a pressure range on the finger 20 is changed, as illustrated in B of FIG. 18, B of FIG. 19, B of FIG. 20, and B of FIG. 21, and a feeling that causes a user to feel as if the finger 20 is sinking into the object 30 is provided to the user, as illustrated in C of FIG. 18, C of FIG. 19, C of FIG. 20, and C of FIG. 21.

The pressure range on the finger 20, and a provided tactile sense are similar to those of the first embodiment. Thus, descriptions thereof are omitted.

In the present embodiment, a tactile sense is provided to a user without there being no need for an actively driven mechanism such as the linkage mechanism 23. This makes it possible to make the tactile sense providing apparatus 1 smaller in size and to make various mechanisms simpler.

Other Embodiments

The present technology is not limited to the embodiments described above, and can achieve various other embodiments.

[Installation Type]

The tactile sense providing apparatus 1 can also be used by being installed at a specified location.

For example, the tactile sense providing apparatus 1 is installed on a table to be used as a button. A tactile sense that causes a user who has pushed the tactile sense providing apparatus 1 to feel as if the user is crashing something soft.

In this case, the user feels as if the user presses a soft button.

Specifically, the tactile sense providing apparatus 1 is installed at a specified location, and a drive section moves the base 2 toward the finger 20 of the user.

Figure 22:
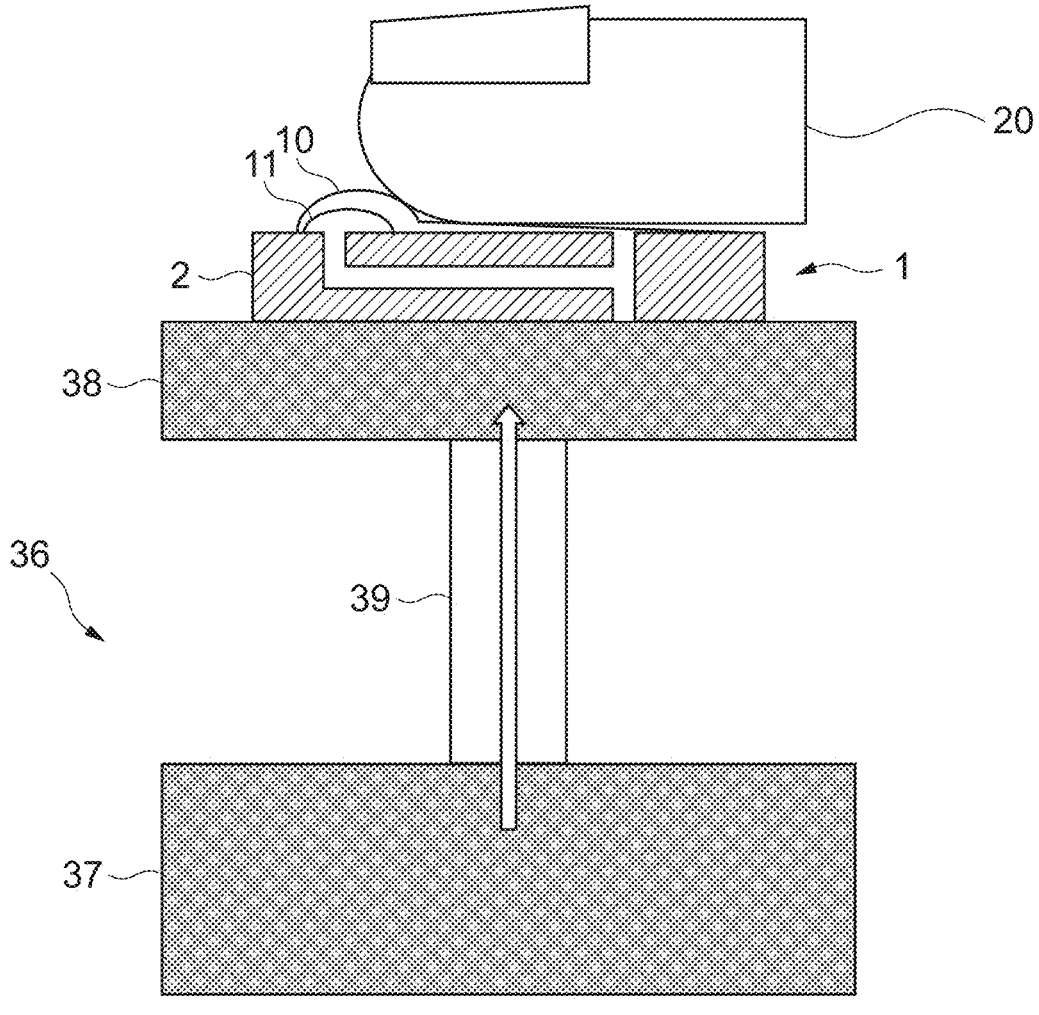
FIG. 22 is a schematic diagram used to describe an installation-target object.
Figure 22:
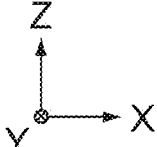

FIG. 22 is a schematic diagram used to describe an installation-target object.

FIG. 22 illustrates a state in which the base 2 is installed on an installation-target object 36.

The type of installation-target object 36 is not limited, and any object such as a table, a floor, or a wall surface on which the base 2 can be installed may be adopted.

In other words, the tactile sense providing apparatus 1 is installed on the installation-target object 36 corresponding to a specified location.

In the present embodiment, the installation-target object 36 includes a base 37, an installation portion 38, and a drive section 39, as illustrated in FIG. 22.

The base 37 is a member that holds the installation portion 38 and the drive section 39. A shape of the base 37 is not limited.

The installation portion 38 is a member on which the base 2 of the tactile sense providing apparatus 1 is installed. In the present embodiment, the installation portion 38 has a plate shape, and the base 2 is installed on an upper surface of the installation portion 38.

The drive section 39 connects the base 37 and the installation portion 38.

For example, the drive section 39 is a rod-shaped member that extends in parallel with the up-and-down direction, and is connected to an upper surface of the base 37 and to a lower surface of the installation portion 38.

The installation portion 38 can be moved relative to the base 37 by the drive section 39 being driven. Specifically, for example, the drive section 39 gets elongated, and this results in the installation portion 38 being moved upward to be lifted relative to the base 37.

A configuration of the installation-target object 36 is not limited, and any configuration may be adopted.

In the present embodiment, when the finger 20 of the user is brought into contact with the first deformable member 10, the installation portion 38 is moved upward by the drive section 39 being driven. In other words, the base 2 is moved toward the finger 20 of the user.

Consequently, the first deformable member 10 and the second deformable member 11 are pressed with the finger 20, and a tactile sense is provided to the user.

This makes it possible to apply the present technology to various user interfaces such as a button and a switch.

Further, the adjustment of the configuration of the tactile sense providing apparatus 1 makes it possible to provide a user with various tactile senses such as a tactile sense obtained upon pressing a soft button, and a tactile sense obtained upon pressing a hard button.

[Material of Deformable Member]

Any materials may be adopted as materials of the first deformable member 10 and the second deformable member 11.

For example, at least a portion of at least one of the first deformable member 10 or the second deformable member 11 is an elastic body.

For example, all of the first deformable member 10 and all of the second deformable member 11 are elastic bodies in the tactile sense providing apparatus 1 of the first embodiment. Consequently, the first deformable member 10 and the second deformable member 11 can be deformed.

This makes it possible to provide, to the finger 20 of the user, a soft tactile feel to an elastic body.

Of course, only one of the first deformable member 10 and the second deformable member 11 may be an elastic body. Further, not all of but only a portion of the first deformable member 10 or the second deformable member 11 may be an elastic body.

Further, at least one of a portion of at least one of the first deformable member 10 or the second deformable member 11 may be a rigid body 40.

Figure 23:
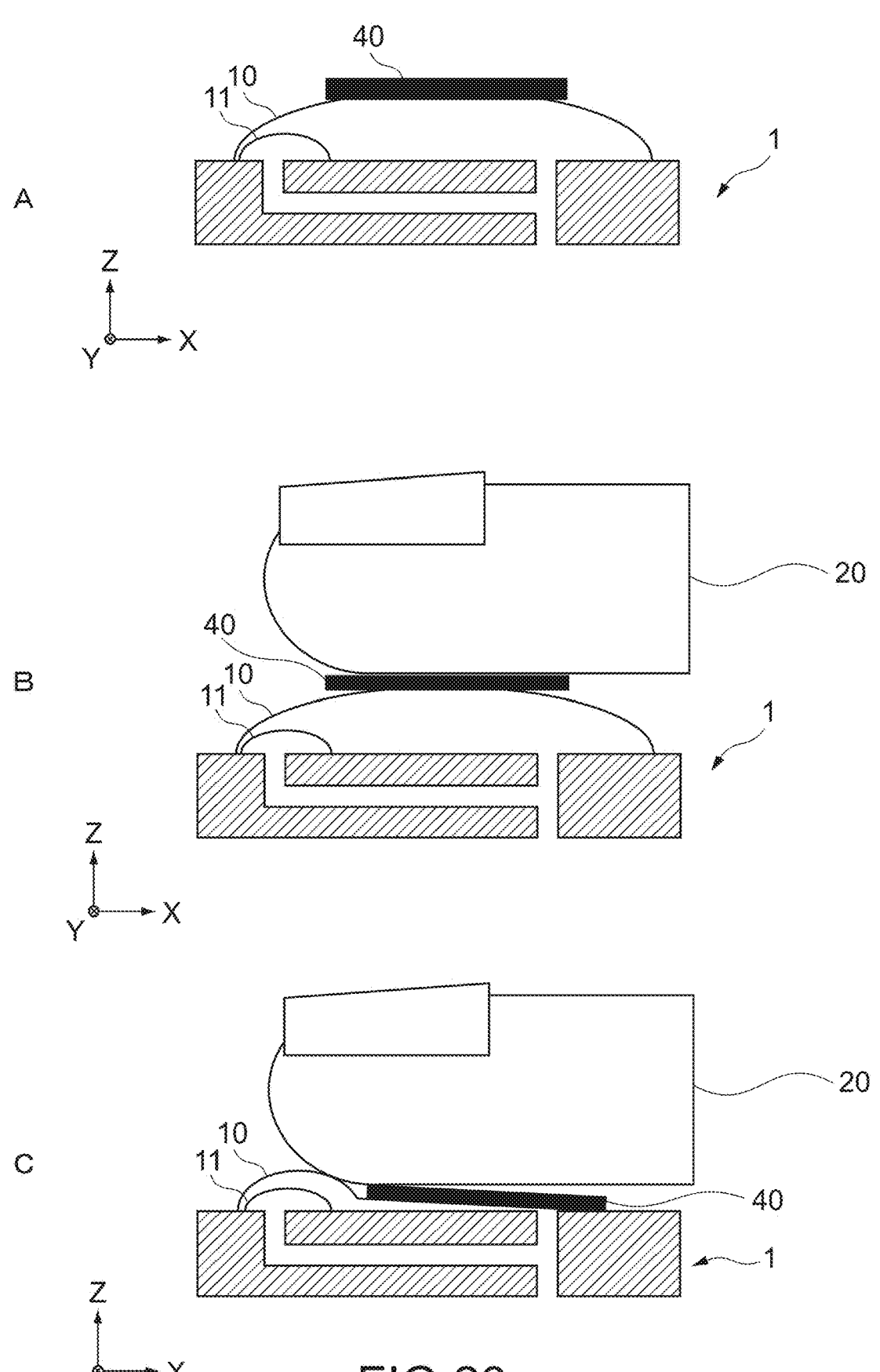
FIG. 23 schematically illustrates another example of configurations of the first deformable member and the second deformable member.

FIG. 23 schematically illustrates another example of the configurations of the first deformable member 10 and the second deformable member 11.

As illustrated in A of FIG. 23, a portion situated around the middle in right-and-left direction of the first deformable member 10 is the rigid body 40. Note that another portion of the first deformable member 10 is an elastic body.

When pushing is performed with the finger 20 of the user, first the rigid body 40 is brought into contact with the entirety of the pad of the finger 20, as illustrated in B of FIG. 23.

Further, when the first opening 14 is closed by pushing being performed and the second deformable member 11 is expanded, the elastic body is brought into contact with the tip of the finger 20, as illustrated in C of FIG. 23.

This makes it possible to provide a tactile sense to the finger 20 of the user, such as providing a soft tactile feel to an elastic body after providing a hard tactile feel to the rigid body 40.

Of course, only one of the first deformable member 10 or the second deformable member 11 may be the rigid body 40. Further, not all of but only a portion of the first deformable member 10 or the second deformable member 11 may be the rigid body 40.

[Shape and Arrangement of Deformable Member]

Any shapes may be adopted as the shapes of the first deformable member 10 and the second deformable member 11. Further, positions at which the first deformable member 10 and the second deformable member 11 are arranged are also not limited.

Figure 24:
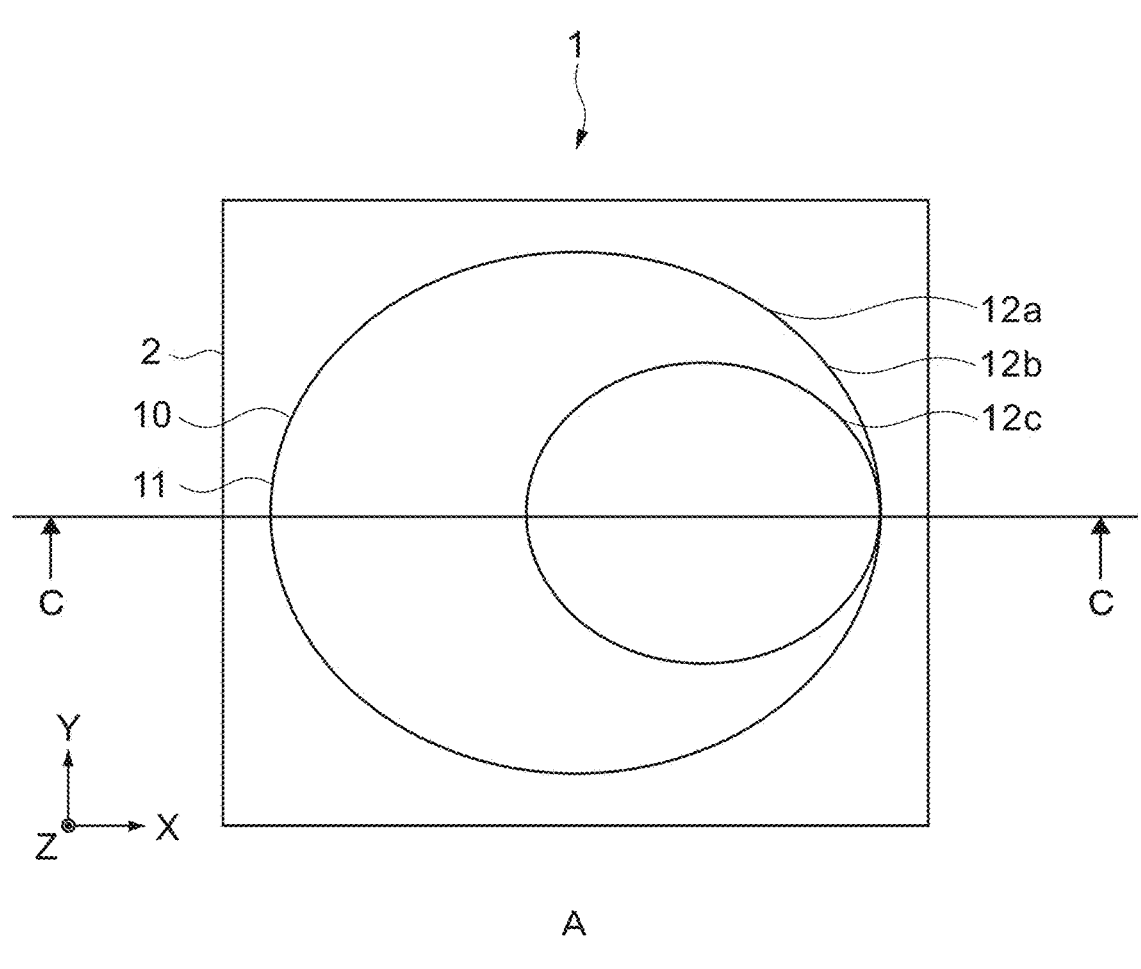
FIG. 24 schematically illustrates a variation of the configurations of the first deformable member and the second deformable member.
Figure 24:
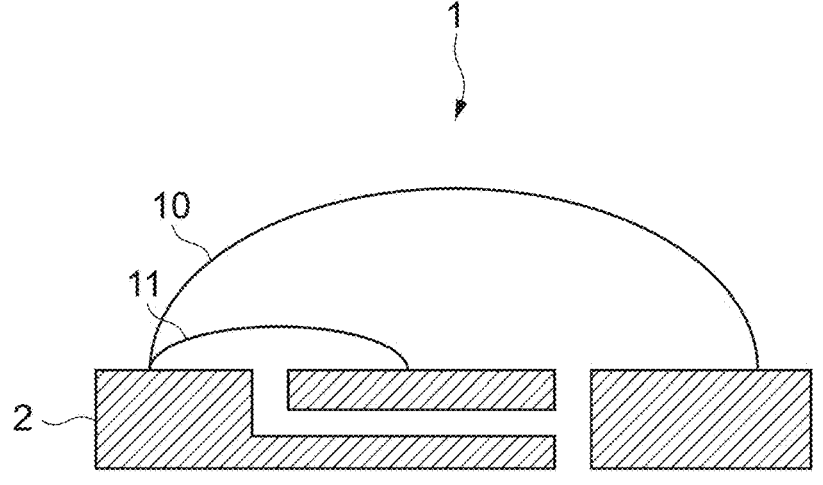
Figure 24:
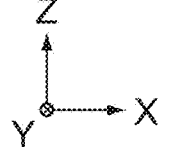

FIG. 24 schematically illustrates a variation of the configurations of the first deformable member 10 and the second deformable member 11.

A of FIG. 24 is a top view of the tactile sense providing apparatus 1 as viewed from the upper side.

B of FIG. 24 is a cross-sectional view along the line C-C of A of FIG. 24.

In the example illustrated in FIG. 24, the outer peripheral portion 12b of the second deformable member 11 is in contact with at least a portion of the outer peripheral portion 12a of the first deformable member 10.

The configurations of the first deformable member 10 and the second deformable member 11 in the example illustrated in FIG. 24 are substantially similar to the configurations of the first embodiment.

In other words, the second deformable member 11 is configured such that respective portions of the outer peripheral portion 12b and the inner peripheral portion 12c of the second deformable member 11 that each correspond to the right end of the outer peripheral portion 12a are open (the outer peripheral portion 12b and the inner peripheral portion 12c of the second deformable member 11 are not closed annually).

Thus, the outer peripheral portion 12b of the second deformable member 11 is in contact with the outer peripheral portion 12a of the first deformable member 10 except for the right end of the outer peripheral portion 12a. As described above, a portion of the outer peripheral portion 12b is in contact with the outer peripheral portion 12a.

Of course, the configurations of the first deformable member 10 and the second deformable member 11 are not limited thereto.

For example, the first deformable member 10 and the second deformable member 11 may each have a shape of a polygon, and only one side of the polygon of the first deformable member 10 and one side of the polygon of the second deformable member 11 may be in contact with each other.

Figure 25:
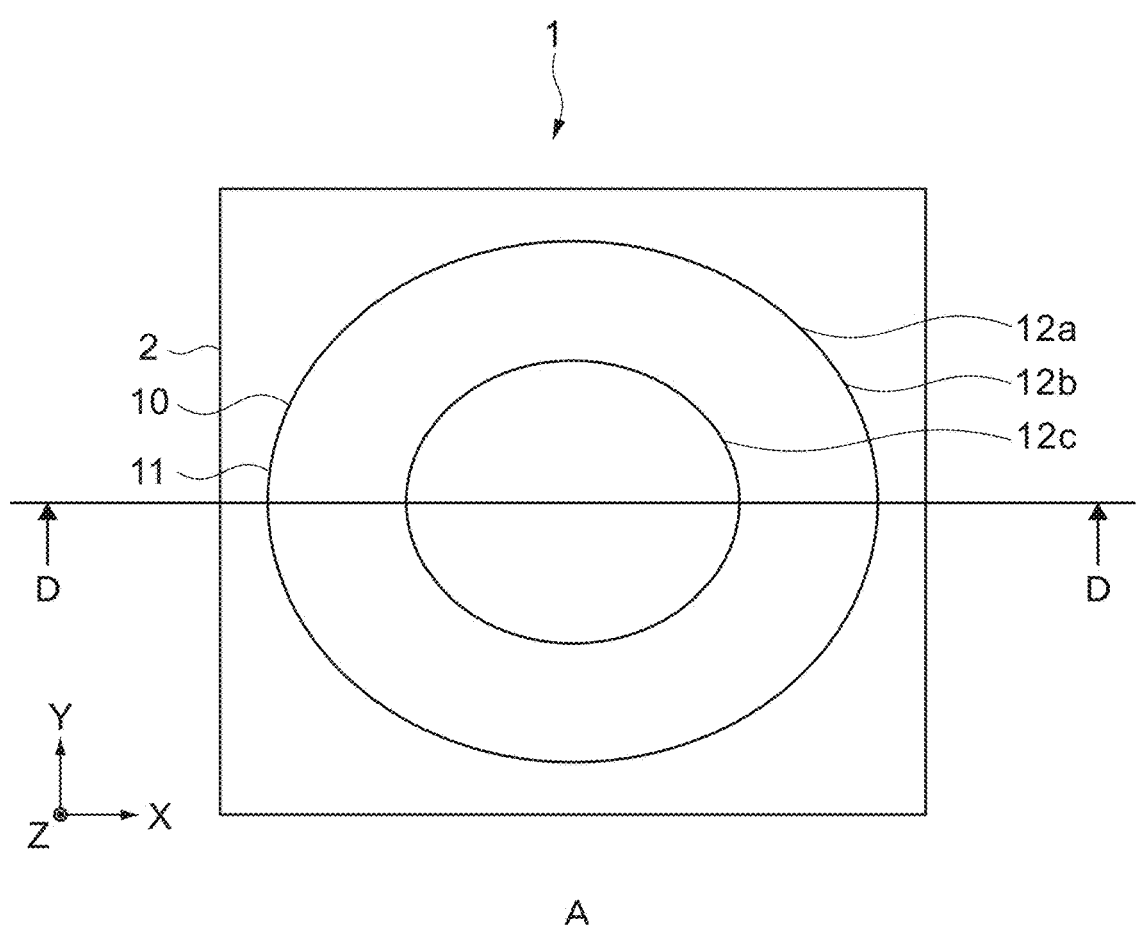
FIG. 25 schematically illustrates a variation of the configurations of the first deformable member and the second deformable member.
Figure 25:
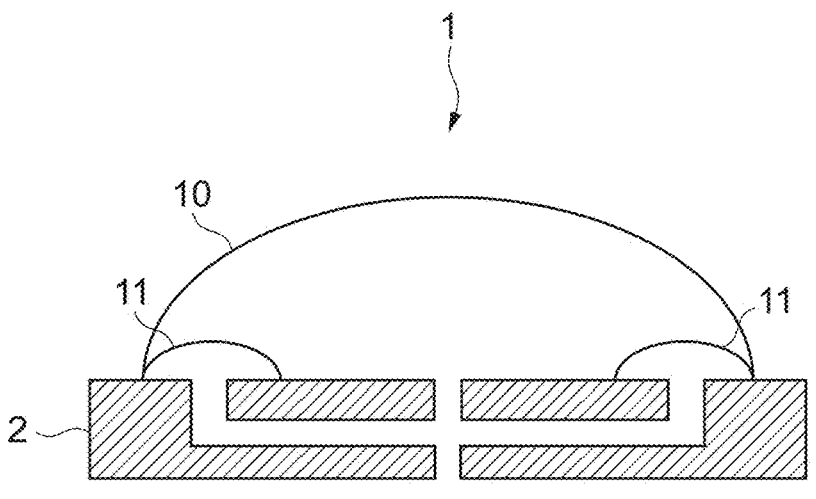
Figure 25:
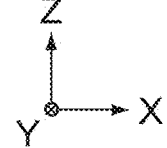

FIG. 25 schematically illustrates a variation of the configurations of the first deformable member 10 and the second deformable member 11.

A of FIG. 25 is a top view of the tactile sense providing apparatus 1 as viewed from the upper side.

B of FIG. 25 is a cross-sectional view along the line D-D of A of FIG. 25.

In the example illustrated in FIG. 25, the entirety of the outer peripheral portion 12b of the second deformable member 11 is in contact with the outer peripheral portion 12a of the first deformable member 10.

In the example illustrated in FIG. 25, the second deformable member 11 is arranged inside of the hemispherical first deformable member 10.

The second deformable member 11 is configured such that the outer peripheral portion 12b and the inner peripheral portion 12c are each closed annually. In other words, the second deformable member 11 has a ring shape.

Further, the entirety of the outer peripheral portion 12b of the second deformable member 11 is in contact with the outer peripheral portion 12a of the first deformable member 10.

The second deformable member 11 has a ring shape. Thus, the pressure range on the finger 20 has a ring shape when the second deformable member 11 is expanded.

This makes it possible to provide a tactile sense that is different from the tactile sense in the example illustrated in, for example, FIG. 24.

Of course, the configurations of the first deformable member 10 and the second deformable member 11 are not limited thereto.

For example, the first deformable member 10 and the second deformable member 11 may each have a shape of a polygon, and all of (sides of the polygon of) the first deformable member 10 and all of (corresponding sides of the polygon of) the second deformable member 11 may be in contact with each other.

Figure 26:
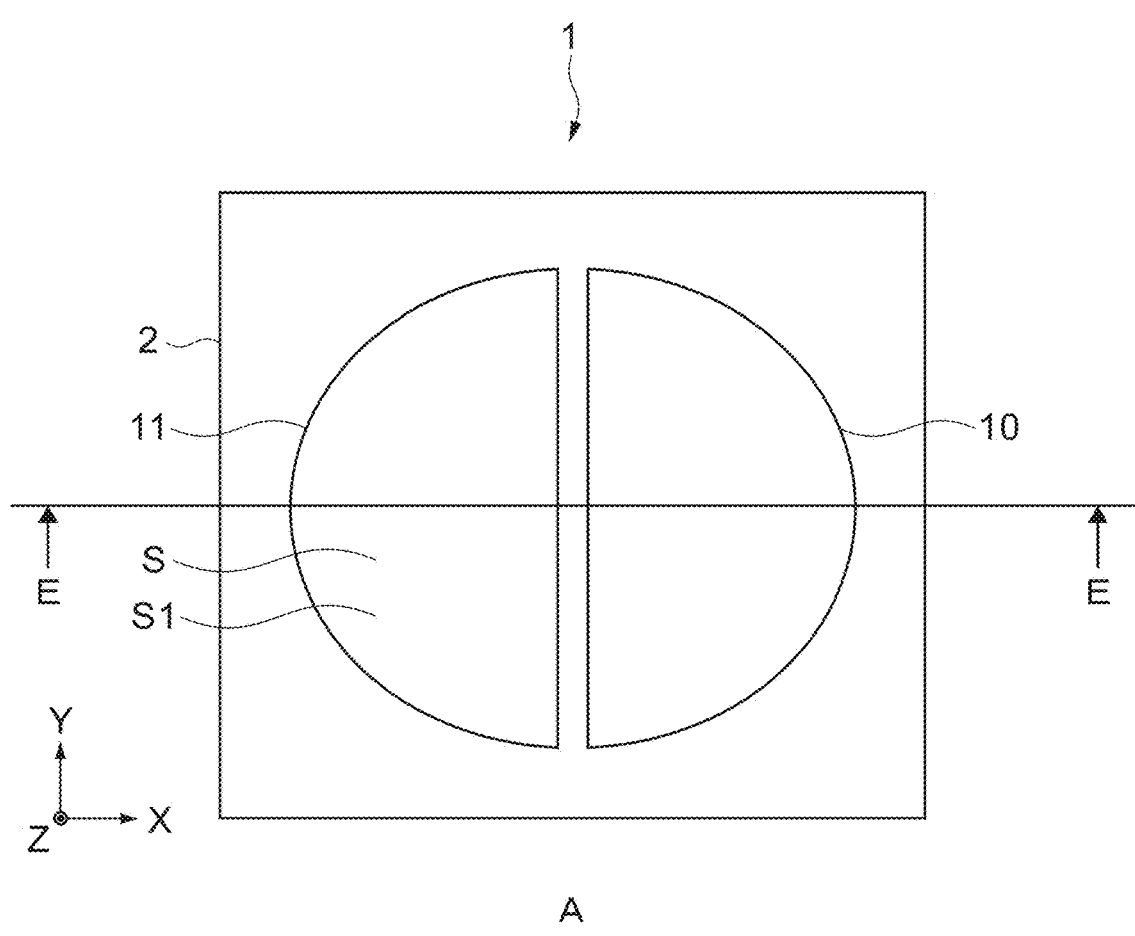
FIG. 26 schematically illustrates a variation of the configurations of the first deformable member and the second deformable member.
Figure 26:
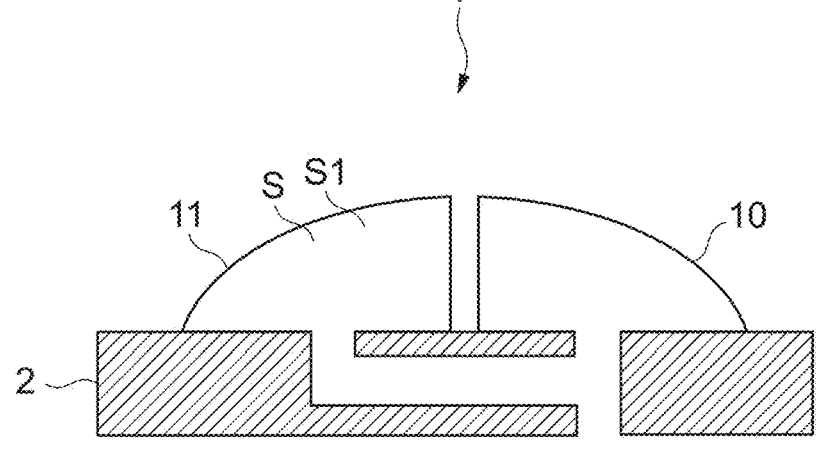
Figure 26:
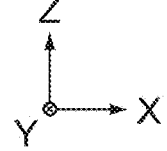

FIG. 26 schematically illustrates a variation of the configurations of the first deformable member 10 and the second deformable member 11.

A of FIG. 26 is a top view of the tactile sense providing apparatus 1 as viewed from the upper side.

B of FIG. 26 is a cross-sectional view along the line E-E of A of FIG. 26.

In the example illustrated in FIG. 26, the first deformable member 10 and the second deformable member 11 are each connected to the base 2 such that the second deformable member 11 is arranged outside of the space S formed by the first deformable member 10 and the base 2, where the first space S1 is the space S formed by the first deformable member 10 and the base 2, and the second space S2 is a space formed by the second deformable member 11 and the base 2.

Specifically, the first deformable member 10 and the second deformable member 11 each have a shape that corresponds to one of two into which a hemisphere has been equally divided. In other words, the first deformable member 10 and the second deformable member 11 each have a shape that corresponds to one of four into which a sphere has been equally divided at a longitude line situated in the middle and at a latitude line situated in the middle.

As illustrated in FIG. 26, the first deformable member 10 and the second deformable member 11 are arranged on the base 2 such that flat surfaces of the first deformable member 10 and the second deformable member 11 that respectively correspond to cross sections obtained by cutting a sphere face each other.

The space S formed by the first deformable member 10 and the base 2 is a space that is situated on the left in each of A of FIG. 26 and B of FIG. 26 and has a shape that corresponds to one of two into which a hemisphere has been equally divided. Further, the second deformable member 11 is arranged outside of the space S.

Further, the first space S1 being the same space as the space S is formed, and the second space S2 being a space formed by the second deformable member 11 and the base 2 is formed.

In other words, the first deformable member 10 and the second deformable member 11 are separately arranged such that the first deformable member 10 and the second deformable member 11 are respectively not situated inside of their counterparts.

In this example, a tactile sense that causes a user to feel as if the finger 20 is in contact with a spherical surface divided into two can be provided to the finger 20 when the first deformable member 10 and the second deformable member 11 are pushed.

Further, a tactile sense that causes a user to feel as if, for example, only a fingertip is in contact with the spherical surface can be provided to the fingertip when the first deformable member 10 is completely deflated and the second deformable member 11 is expanded.

Figure 27:
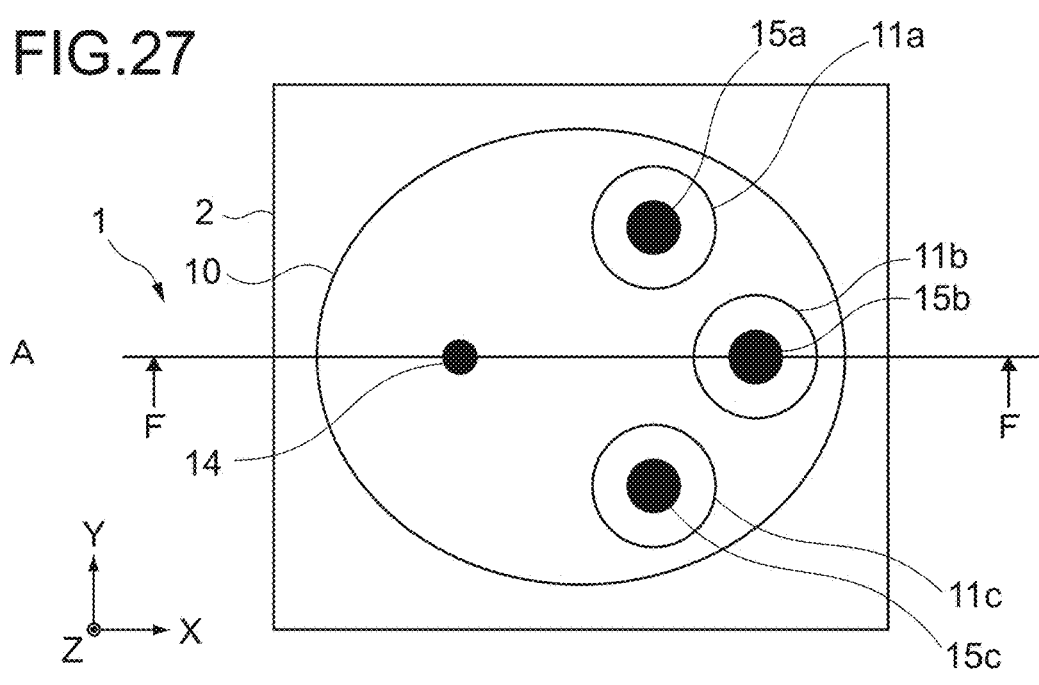
FIG. 27 schematically illustrates a variation of the configurations of the first deformable member and the second deformable member.
Figure 27:
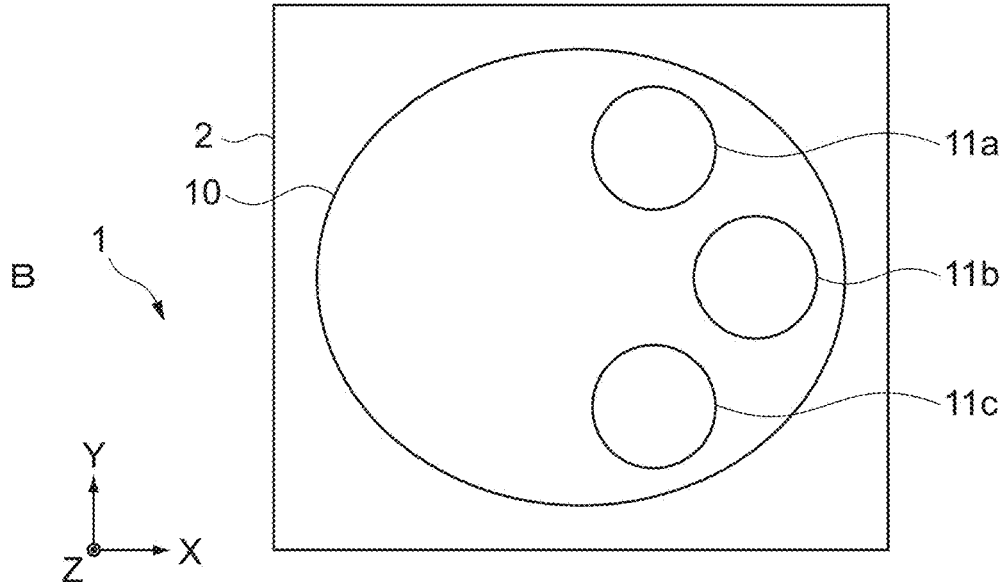
Figure 27:
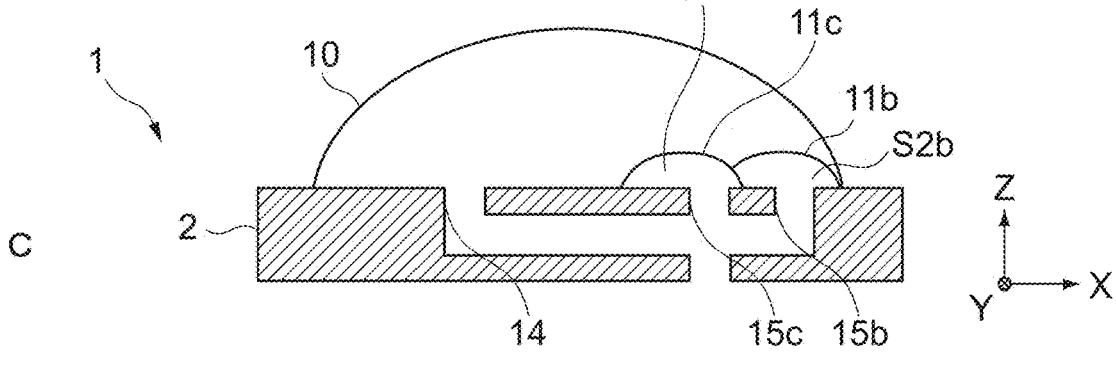

FIG. 27 schematically illustrates a variation of the configurations of the first deformable member 10 and the second deformable member 11.

A of FIG. 27 is a top view of the tactile sense providing apparatus 1 as viewed from the upper side.

B of FIG. 27 is a top view only schematically illustrating the base 2, the first deformable member 10, and the second deformable member 11.

C of FIG. 27 is a cross-sectional view along the line F-F of A of FIG. 27.

In the example illustrated in FIG. 27, the tactile sense providing apparatus 1 further includes a plurality of second deformable members 11 and a plurality of second openings 15, where second openings 15 of the plurality of second openings 15 respectively communicate with second spaces S2 of a plurality of second spaces S2 that are respectively formed by second deformable members 11 of the plurality of second deformable members 11.

As illustrated in FIG. 27, three hemispherical second deformable members 11a to 11c are arranged inside of the hemispherical first deformable member 10.

On the base 2, the second deformable member 11*a* is arranged behind the middle in the depth direction and further rightward than the middle in the right-and-left direction.

The second deformable member 11*c* is arranged axisymmetrically with the second deformable member 11*a* over the major axis of an elliptic shape of the first deformable member 10.

On the base 2, the second deformable member 11*b* is formed in the middle in the depth direction and further rightward in the right-and-left direction than the second deformable member 11*a* and the second deformable member 11*c*.

Further, the second opening 15*a* is formed at a position on the base 2 that corresponds to the center of the second deformable member 11*a* as viewed from the upper side. Likewise, the second openings 15*b* and 15*c* are formed.

Further, a second space S2*a* is formed by the second deformable member 11*a* and the base 2. Likewise, second spaces S2*b* and S2*c* are formed.

As described above, the first deformable member 10 and the three hemispherical second deformable members 11*a* to 11*c* are arranged.

Consequently, a tactile sense that causes a user to feel as if the finger 20 is in contact with a plurality of expanded very small films can be provided to the finger 20 when the second deformable members 11*a* to 11*c* are expanded.

Of course, the number of second deformable members 11 arranged on the base 2 is not limited. For example, the arrangement of a large number of second deformable members 11 makes it possible to provide a user with a tactile sense that causes the user to feel as if the user is in touch with smaller grains.

Figure 28:
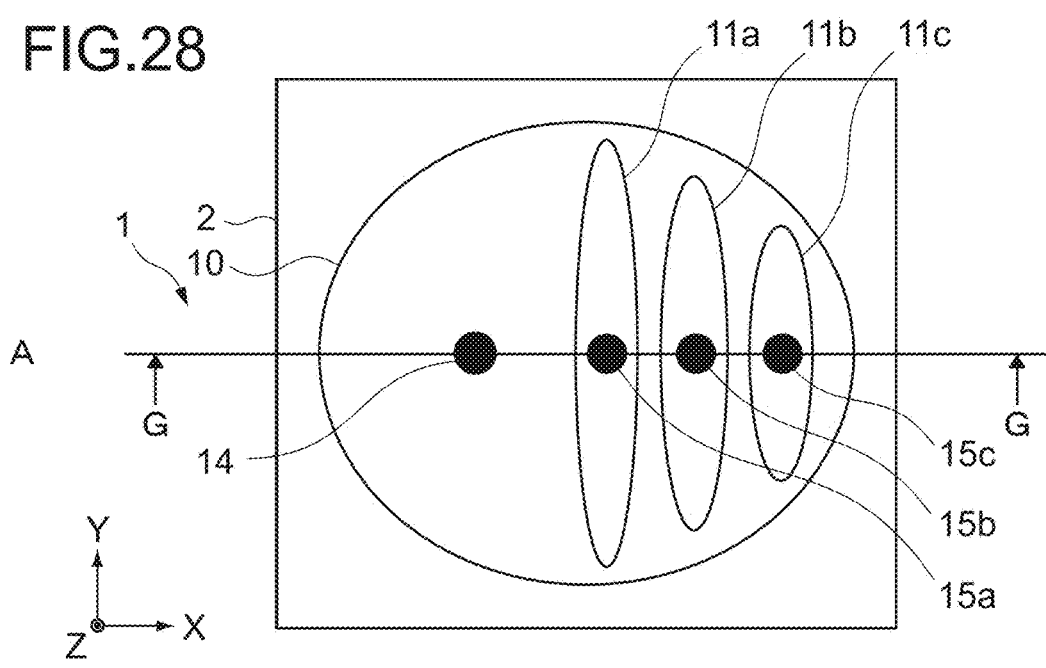
FIG. 28 schematically illustrates a variation of the configurations of the first deformable member and the second deformable member.
Figure 28:
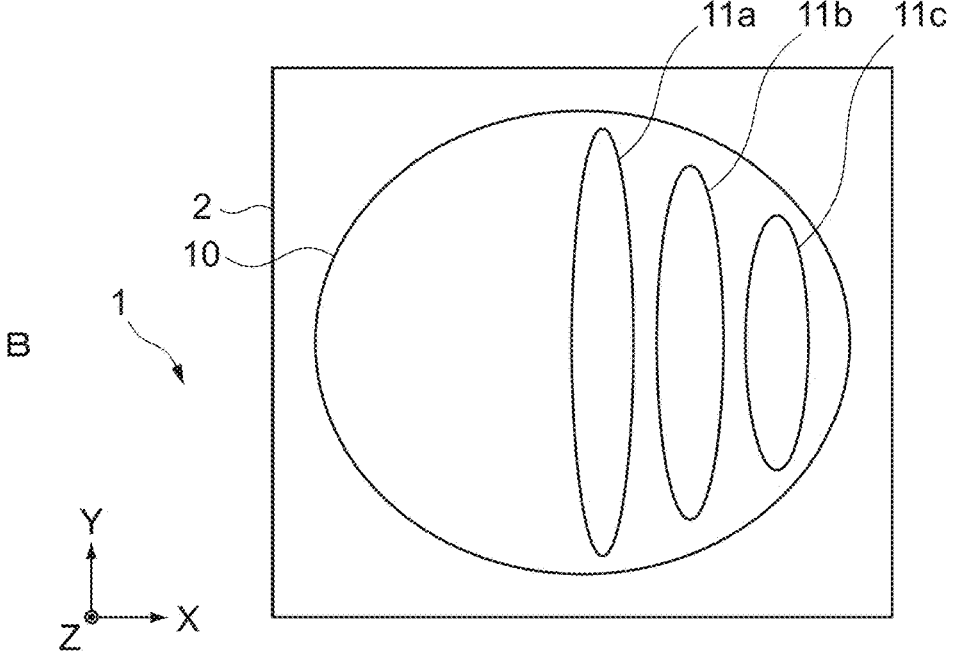
Figure 28:
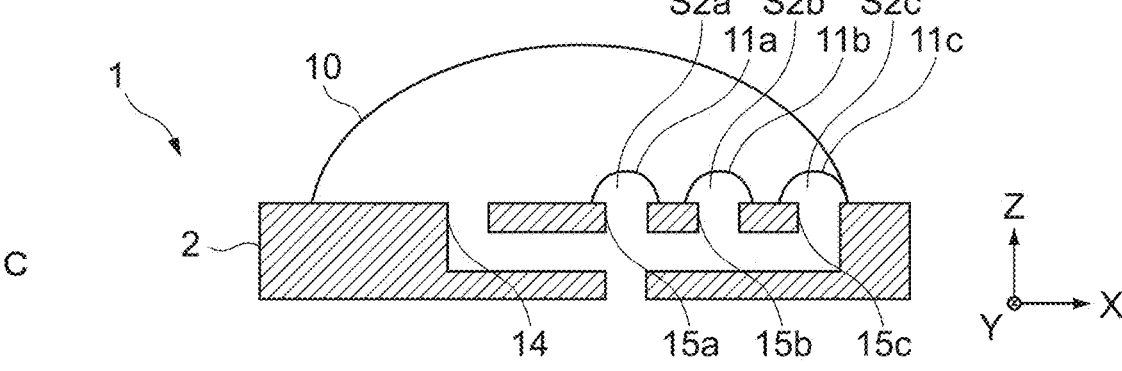

FIG. 28 schematically illustrates a variation of the configurations of the first deformable member 10 and the second deformable member 11.

A of FIG. 28 is a top view of the tactile sense providing apparatus 1 as viewed from the upper side.

B of FIG. 28 is a top view only schematically illustrating the base 2, the first deformable member 10, and the second deformable member 11.

C of FIG. 28 is a cross-sectional view along the line G-G of A of FIG. 28.

FIG. 28 illustrates a configuration example when the second deformable members 11*a* to 11*c* are arranged that is different from that illustrated in FIG. 27.

As illustrated in FIG. 28, three second deformable members 11*a* to 11*c* are arranged inside of the hemispherical first deformable member 10.

Each of the second deformable members 11*a* to 11*c* has an elliptic shape having a major axis in the depth direction and a minor axis in the right-and-left direction, as viewed from above. Further, the major axis of each elliptic shape is longer in order of the second deformable members 11*a*, 11*b*, and 11*c*.

On the base 2, the second deformable member 11*a* is arranged in the middle in the depth direction and further rightward than the middle in the right-and-left direction.

On the base 2, the second deformable member 11*b* is arranged in the middle in the depth direction and further rightward than the second deformable member 11*a*.

On the base 2, the second deformable member 11*c* is arranged in the middle in the depth direction and further rightward than the second deformable member 11*b*.

Further, the second opening 15*a* is formed at a position on the base 2 that corresponds to the center of the second deformable member 11*a* as viewed from the upper side. Likewise, the second openings 15*b* and 15*c* are formed.

Further, the second space S2*a* is formed by the second deformable member 11*a* and the base 2. Likewise, the second spaces S2*b* and S2*c* are formed.

As described above, the first deformable member 10 and the three second deformable members 11*a* to 11*c* are arranged.

Consequently, a tactile sense that causes a user to feel as if the finger 20 is in contact with a plurality of expanded elongated elliptic films can be provided to the finger 20 when the second deformable members 11*a* to 11*c* are expanded.

[Slit]

A slit may be formed to communicate with the second opening 15.

Figure 29:
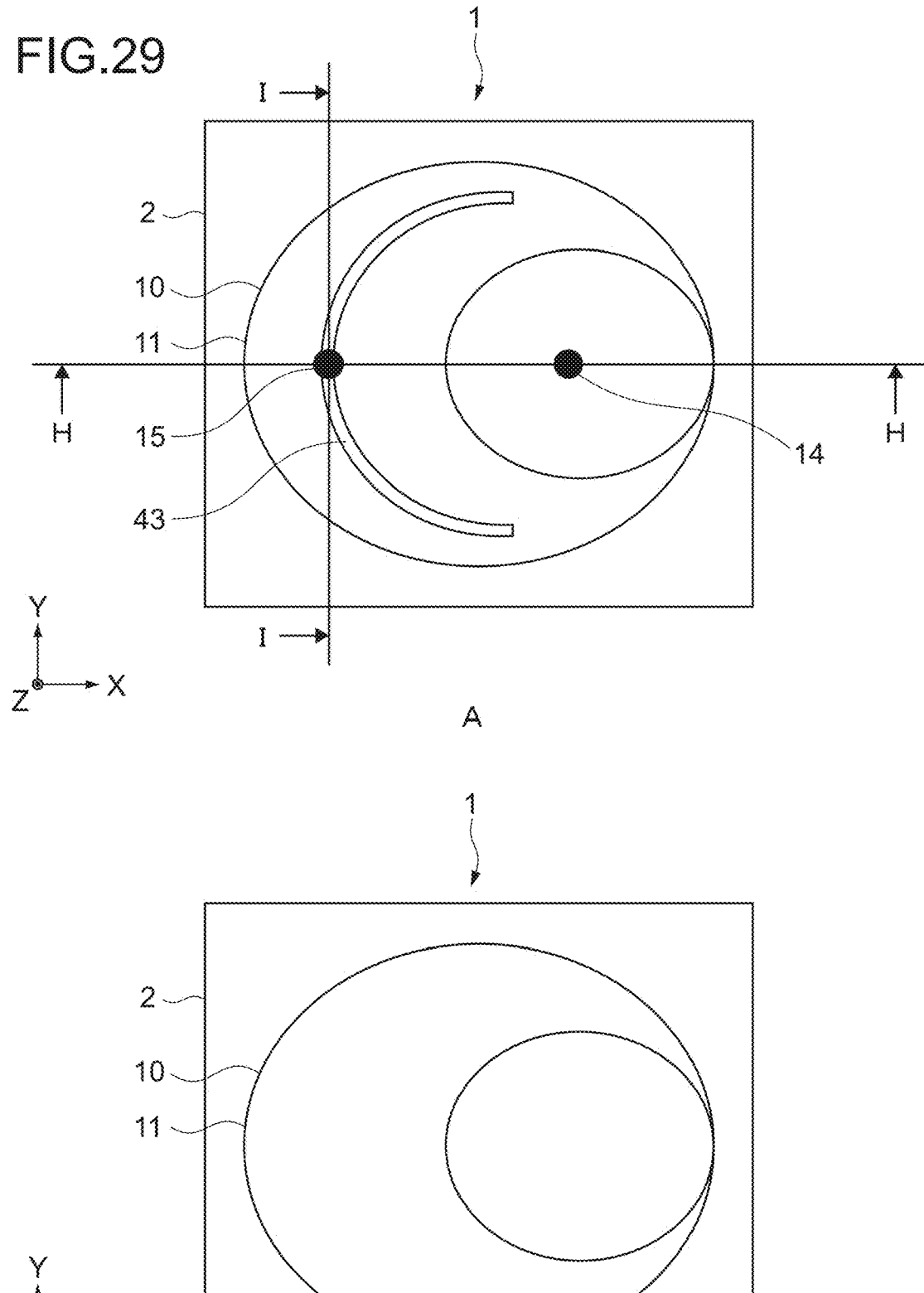
FIG. 29 is a schematic diagram used to describe a slit.
Figure 30:
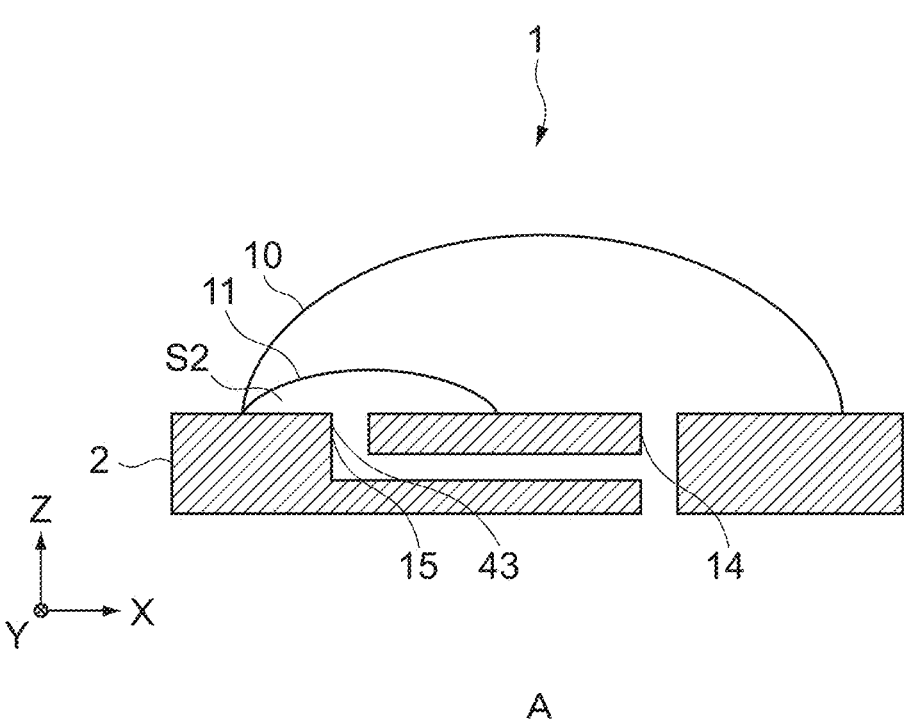
FIG. 30 is a schematic diagram used to describe the slit.
Figure 30:
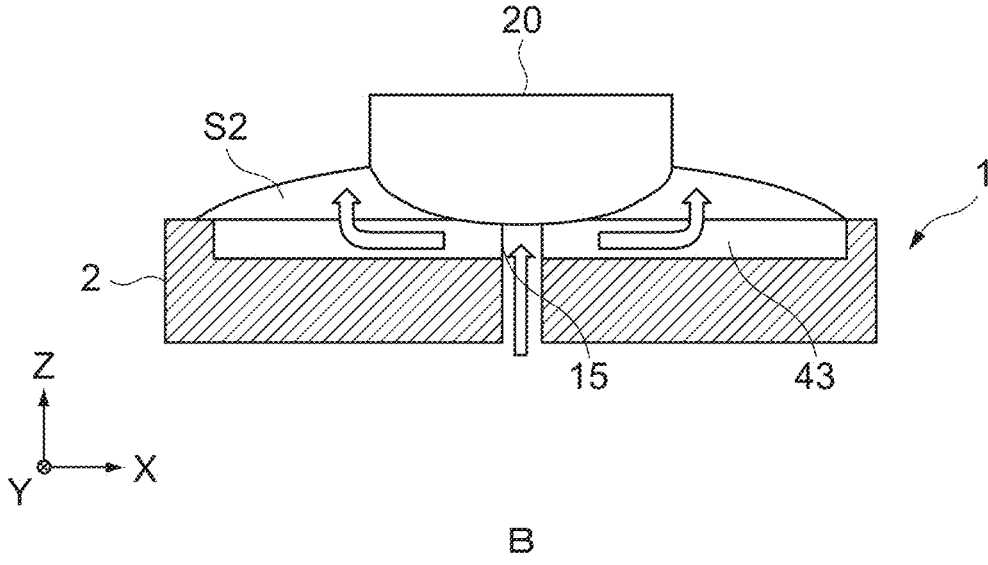

FIGS. 29 and 30 are schematic diagrams used to describe a slit.

A of FIG. 29 is a top view of the tactile sense providing apparatus 1 as viewed from the upper side.

B of FIG. 29 is a top view only schematically illustrating the base 2, the first deformable member 10, and the second deformable member 11.

A of FIG. 30 is a cross-sectional view along the line H-H of A of FIG. 29.

B of FIG. 30 is a cross-sectional view along the line I-I of A of FIG. 29.

B of FIG. 30 schematically illustrates, using arrows, the flow of fluid when an upper portion of the second opening 15 is covered with the second deformable member 11.

In the example illustrated in FIGS. 29 and 30, the tactile sense providing apparatus 1 includes a slit 43 that is formed in the base 2 such that the second space S2 and the second opening 15 communicate with each other and that enables fluid to flow into the second space S2 through the second opening 15 when the first deformable member 10 and the second deformable member 11 are pushed with the finger 20 of the user.

As illustrated in A of FIG. 29, the slit 43 is arranged in the base 2.

The slit 43 is a recess having a U-shape, as viewed from the upper side, and is arranged symmetrically with respect to the major axis of an elliptic shape of the first deformable member 10. Further, the slit 43 is arranged such that an apex of the slit 43 (an apex of the U) overlaps the second opening 15.

Of course, a specific configuration such as a shape and arrangement of the slit 43 is not limited.

The slit 43 corresponds to an embodiment of a recess according to the present technology, the recess being formed in the base 2 such that the second space S2 and the second opening 15 communicate with each other, the recess enabling fluid to flow into the second space S2 through the second opening 15 when a specified pressing operation is input.

As illustrated in B of FIG. 30, the slit 43 communicates with the second space S2 and with the second opening 15.

Even when pushing is performed with the finger 20 and the upper portion of the second opening 15 is covered with the second deformable member 11, fluid can slip by on the side of the second opening 15 to pass through the slit 43, and flow into the second space S2.

The provision of the slit 43 makes it possible to easily obtain a configuration in which the second opening 15 is not closed regardless of the position of the second opening 15.

In other words, there is no restriction on a position at which the second opening is formed. This makes it possible to obtain the tactile sense providing apparatus 1 having an unrestricted configuration.

[Protrusion]

A protrusion may be connected to the first deformable member 10.

Figure 31:
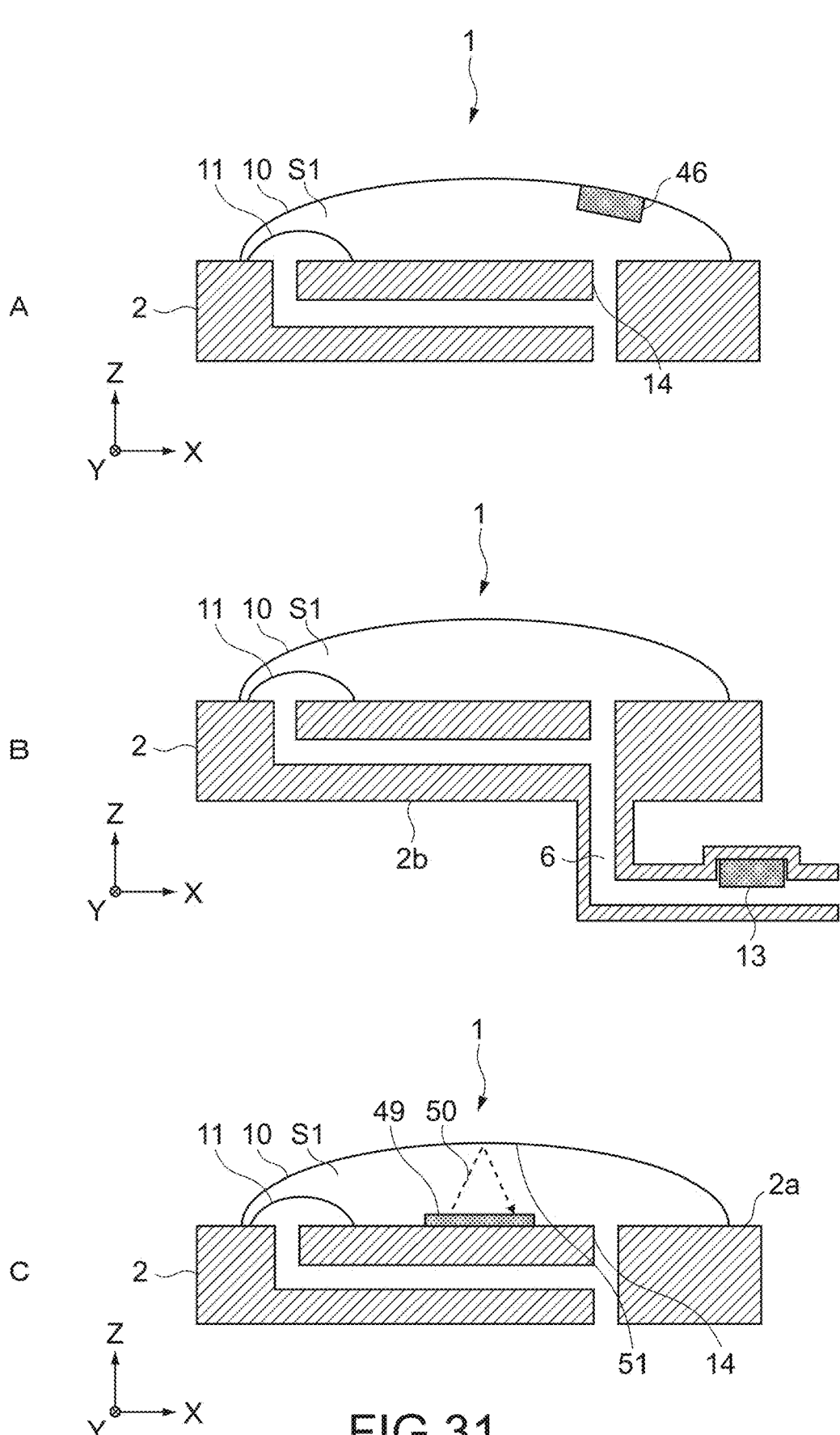
FIG. 31 is a schematic diagram used to describe a protrusion, a variation of a configuration of a pressure sensor, and a distance sensor.

A of FIG. 31 is a schematic diagram used to describe a protrusion.

In the example illustrated in A of FIG. 31, the first deformable member 10 includes a protrusion 46 that is arranged on a side of the first space S1, the protrusion 46 closing the first opening 14 when the first deformable member 10 and the second deformable member 11 are pushed with the finger 20 of the user.

In the present embodiment, the protrusion 46 has a rectangular-parallelepiped shape, as illustrated in A of FIG. 31.

Further, the protrusion 46 is made of, for example, a rigid material.

The protrusion 46 is arranged inside of the first deformable member 10. In other words, the protrusion 46 is arranged on the side of the first space S1.

Further, the protrusion 46 is formed at a position at which, when the first deformable member 10 is completely deflated (collapses), the protrusion 46 is in contact with the first opening 14 to close the first opening 14. Specifically, the protrusion 46 is arranged at, for example, a position directly above the first opening 14.

Of course, a specific configuration such as a shape, a material, and arrangement of the protrusion 46 is not limited.

The provision of the protrusion 46 makes it possible to close the first opening 14 with certainty.

[Pressure Sensor]

A position, on the base 2, at which the pressure sensor 13 is arranged is not limited. The pressure sensor 13 may be arranged at any position at which pressure of fluid flowing into the first space S1 is detectable.

B of FIG. 31 schematically illustrates a variation of a configuration of the pressure sensor 13.

In the example illustrated in B of FIG. 31, an extension of the flow path 6 is formed to be provided to the lower surface 2b of the base 2, and the pressure sensor 13 is arranged in the extension of the flow path 6.

The pressure of fluid flowing into the first space S1 is detected by arranging the pressure sensor 13 at such a position.

Further, the pressure of fluid flowing into the first space S1 can also be detected when, for example, the pressure sensor 13 is arranged inside of the space S1.

[Distance Sensor]

The tactile sense providing apparatus 1 may include a distance sensor.

C of FIG. 31 is a schematic diagram used to describe a distance sensor.

A distance sensor 49 is arranged inside of the first space S1, and can detect a distance between the base 2 and the first deformable member 10.

In the example illustrated in C of FIG. 31, the distance sensor 49 is arranged in the middle in the right-and-left direction on the upper surface 2a of the base 2.

The distance sensor 49 emits a signal 50 to the first deformable member 10. For example, the signal 50 such as an infrared signal is emitted by the distance sensor 49. The emitted signal 50 is reflected off an inner surface (a surface on the inside) 51 of the first deformable member 10 to be received by the distance sensor 49.

The distance between the base 2 and the first deformable member 10 is detected on the basis of a time difference between the time at which the signal 50 is emitted and the time at which the signal 50 is received.

Of course, a specific configuration such as a position at which the distance sensor 49 is arranged, and the type of signal 50 emitted is not limited.

When, for example, the first deformable member 10 is completely deflated, the distance between the base 2 and the first deformable member 10 is very small.

Thus, when the distance detected by the distance sensor 49 is very small, it may be determined that the first opening 14 is closed by the first deformable member 10.

In this case, the distance sensor 49 serves as a detector that detects closing of the first opening 14.

Further, when, for example, the distance detected by the distance sensor 49 is gradually made smaller, it may be determined that the first deformable member 10 is deformed to be deflated.

The shape control method according to the present technology may be executed and the tactile sense providing apparatus and the shape changeable apparatus according to the present technology may be implemented by a certain computer included in a tactile sense providing apparatus or a shape changeable apparatus and another computer working cooperatively, the other computer being capable of communicating with the certain computer through, for example, a network.

For example, a portion or the entirety of the "fluid controller" may be included in the other computer being capable of communicating with the certain computer through, for example, a network. In this case, the "fluid controller" may include a communication function. Of course, another functional block that includes a communication function may be implemented, and may be capable of working cooperatively with the "fluid controller".

For example, a result of detection performed by the detector of the tactile sense providing apparatus or the shape changeable apparatus is transmitted to the other computer being capable of communicating with the certain computer through, for example, a network. On the basis of the detection result, the inflow of fluid is controlled by the "fluid controller" implemented in the other computer.

The "shape control method" according to the present technology may be performed in such a configuration. Further, such a configuration may be called a "shape changeable system" according to the present technology. Of course, the same applies to a component other than the "fluid controller".

For example, the control of the inflow of fluid, the detection of fluid pressure, the driving of a base, and the like described above may be executed by a single computer, or the respective processes may be executed by different computers. Further, the execution of the respective processes by a specified computer includes causing another computer to execute a portion of or all of the processes and acquiring a result of it.

In other words, the shape control method and the program according to the present technology can also be applied to a configuration of cloud computing in which a single function is shared and cooperatively processed by a plurality of apparatuses through a network.

The tactile sense providing apparatus, the shape changeable apparatus, the respective flowcharts, and the like described with reference to the respective figures are merely embodiments, and any modifications may be made thereto without departing from the spirit of the present technology. In other words, for example, any other configurations or algorithms for purpose of practicing the present technology may be adopted.

When wording such as "substantially" is used in the present disclosure, such wording is merely used to facilitate the understanding of the description, and whether the wording such as "substantially" is used has no particular significance.

In other words, in the present disclosure, expressions, such as "center", "middle", "uniform", "equal", "same", "orthogonal", "parallel", "symmetric", "extend", "in an axial direction", "in a right-and-left direction", "in an up-and-down direction", "in a depth direction", "columnar", "cylindrical", "ring-shaped", "annular", "plate-shaped", "spherical", "hemispherical", "elliptic", "U-shaped", "polygonal", and "rectangular-parallelepiped shape" that define, for example, a shape, a size, a positional relationship, and a state respectively include, in concept, expressions such as "substantially the center/substantial center", "substantially the middle/substantially middle", "substantially uniform", "substantially equal", "substantially the same", "substantially orthogonal", "substantially parallel", "substantially symmetric", "substantially extend", "substantially in an axial direction", "substantially in a right-and-left direction", "substantially in an up-and-down direction", "substantially in a depth direction", "substantially columnar", "substantially cylindrical", "substantially ring-shaped", "substantially annular", "substantially plate-shaped", "substantially spherical", "substantially hemispherical", "substantially elliptic", "substantially U-shaped", "substantially polygonal", and "substantial rectangular-parallelepiped shape".

For example, the expressions such as "center", "middle", "uniform", "equal", "same", "orthogonal", "parallel", "symmetric", "extend", "in an axial direction", "in a right-and-left direction", "in an up-and-down direction", "in a depth direction", "columnar", "cylindrical", "ring-shaped", "annular", "plate-shaped", "spherical", "hemispherical", "elliptic", "U-shaped", "polygonal", and "rectangular-parallelepiped shape" also respectively include states within specified ranges (such as a range of +/−10%), with expressions such as "exactly the center/exact center", "exactly the middle/exactly middle", "exactly uniform", "exactly equal", "exactly the same", "completely orthogonal", "completely parallel", "completely symmetric", "completely extend", "exactly in an axial direction", "exactly in a right-and-left direction", "exactly in an up-and-down direction", "exactly in a depth direction", "perfectly columnar", "perfectly cylindrical", "perfectly ring-shaped", "perfectly annular", "perfectly plate-shaped", "perfectly spherical", "perfectly hemispherical", "fully elliptic", "perfectly U-shaped", "fully polygonal", and "perfect rectangular-parallelepiped shape" being respectively used as references.

Thus, an expression that does not include the wording such as "substantially" can also include, in concept, a possible expression including the wording such as "substantially". Conversely, a state expressed using the expression including the wording such as "substantially" may include a state of "exactly/exact", "completely", "fully", or "perfect/perfectly".

In the present disclosure, an expression using "-er than" such as "being larger than A" and "being smaller than A" comprehensively includes, in concept, an expression that includes "being equal to A" and an expression that does not include "being equal to A". For example, "being larger than A" is not limited to the expression that does not include "being equal to A", and also includes "being equal to or greater than A". Further, "being smaller than A" is not limited to "being less than A", and also includes "being equal to or less than A".

When the present technology is carried out, it is sufficient if a specific setting or the like is adopted as appropriate from expressions included in "being larger than A" and expressions included in "being smaller than A", in order to provide the effects described above.

At least two of the features of the present technology described above can also be combined. In other words, the various features described in the respective embodiments may be combined discretionarily regardless of the embodiments. Further, the various effects described above are not limitative but are merely illustrative, and other effects may be provided.

Note that the present technology may also take the following configurations.

(1) A shape changeable apparatus, including:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base;

an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body;

a second opening that is formed in the base to communicate with the second space, the second opening being formed not to be closed when the specified pressing operation is input; and a flow path through which the first opening and the second opening each communicate with the inflow control opening.

(2) The shape changeable apparatus according to (1), in which the first opening is closed through the first deformable member when the specified pressing operation is input.

(3) The shape changeable apparatus according to (1) or (2), in which the first deformable member and the second deformable member are each connected to the base such that the second deformable member is arranged inside of a space that is formed by the first deformable member and the base, the first space is a space obtained by excluding the second space from the space formed by the first deformable member and the base, and the second space is a space that that is formed by the second deformable member and the base.

(4) The shape changeable apparatus according to (1) or (2), in which the first deformable member and the second deformable member are each connected to the base such that the second deformable member is arranged outside of a space that is formed by the first deformable member and the base, the first space is the space formed by the first deformable member and the base, and the second space is a space that is formed by the second deformable member and the base.

(5) The shape changeable apparatus according to any one of (1) to (4), further including a fluid controller that is configured to communicate with the inflow control opening, the fluid controller controlling flow of the fluid into the inflow control opening.

(6) The shape changeable apparatus according to (5), in which the fluid controller controls the flow of the fluid into the inflow control opening according to whether the first opening is closed.

(7) The shape changeable apparatus according to (6), in which the fluid controller stops the flow of the fluid into the inflow control opening during shrinkage of the first space, and the fluid controller starts the flow of the fluid into the inflow control opening when the first opening is closed.

(8) The shape changeable apparatus according to any one of (5) to (7), further including a detector that detects that the first opening is closed, in which the fluid controller controls the flow of the fluid into the inflow control opening on the basis of a result of the detection performed by the detector.

(9) The shape changeable apparatus according to (8), in which the detector includes a pressure sensor that is capable of detecting pressure of the fluid, the detector being arranged at a position at which the pressure of the fluid flowing into the first space is detectable.

(10) The shape changeable apparatus according to any one of (1) to (9), further including a drive section that moves the base relative to the operative body to cause the specified pressing operation to be input using the operative body.

(11) The shape changeable apparatus according to (10), in which the drive section stops the movement of the base relative to the operative body when the first opening is closed.

(12) The shape changeable apparatus according to any one of (5) to (11), in which the operative body is a finger of a user, and the fluid controller provides a tactile sense to the finger of the user by changing shapes of the first deformable member and the second deformable member.

(13) The shape changeable apparatus according to any one of (1) to (12), in which the operative body is a finger of a user, and the shape changeable apparatus is configured to be worn on the finger of the user.

(14) The shape changeable apparatus according to (13), in which the specified pressing operation is input using the finger of the user when an object is held with the finger of the user, the shape changeable apparatus being worn on the finger of the user.

(15) The shape changeable apparatus according to any one of (10) to (12), in which the operative body is a finger of a user, the shape changeable apparatus is installed at a specified location, and the drive section moves the base toward the finger of the user.

(16) The shape changeable apparatus according to any one of (1) to (15), in which an outer peripheral portion of the second deformable member is in contact with at least a portion of an outer peripheral portion of the first deformable member.

(17) The shape changeable apparatus according to (16), in which the entirety of the outer peripheral portion of the second deformable member is in contact with the outer peripheral portion of the first deformable member.

(18) The shape changeable apparatus according to any one of (1) to (17), further including:

a plurality of the second deformable members; and a plurality of the second openings respectively communicating with the second spaces of a plurality of the second spaces respectively formed by the second deformable members of the plurality of the second deformable members.

(19) A shape control method, including:

causing fluid to flow into a flow path controlling opening to expand a first space and a second space, the first space being formed between a base and a first deformable member that is capable of being deformed, the second space being formed between the base and a second deformable member that is capable of being deformed, the flow path controlling opening communicating with each of a first opening and a second opening, the first opening being formed to communicate with the first space, the second opening being formed to communicate with the second space;

when a specified pressing operation is input to the first deformable member and the second deformable member using an operative body, stopping the flow of the fluid into the inflow control opening during shrinkage of the first space; and when the first opening formed to be closed upon the input of the specified pressing operation is closed, starting the flow of the fluid into the inflow control opening to expand the second space through the second opening formed not to be closed upon the input of the specified pressing operation.

(20) A tactile sense providing apparatus, including:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base;

an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body;

a second opening that is formed in the base to communicate with the second space, the second opening being formed not to be closed when the specified pressing operation is input;

a flow path through which the first opening and the second opening each communicate with the inflow control opening; and a tactile sense providing section that is capable of providing a tactile sense to the operative body by changing shapes of the first deformable member and the second deformable member.

(21) The shape changeable apparatus according to any one of (1) to (18), further including a recess that is formed in the base such that the second space and the second opening communicate with each other, the recess enabling fluid to flow into the second space through the second opening when the specified pressing operation is input.

(22) The shape changeable apparatus according to any one of (1) to (18) or (21), in which the first deformable member includes a protrusion that is arranged on a side of the first space, the protrusion closing the first opening when the specified pressing operation is input.

(23) The shape changeable apparatus according to (8), in which the detector includes a distance sensor that is arranged inside of the first space, the distance sensor being capable of detecting a distance between the base and the first deformable member.

(24) The shape changeable apparatus according to any one of (1) to (18) or any one of (21) to (23), in which at least a portion of at least one of the first deformable member or the second deformable member is an elastic body.

(25) The shape changeable apparatus according to any one of (1) to (18) or any one of (21) to (24), in which at least a portion of at least one of the first deformable member or the second deformable member is a rigid body.

REFERENCE SIGNS LIST

S space
S1 first space
S2 second space
1 tactile sense providing apparatus
2 base
4 inflow control opening
6 flow path
7 controller
9 fluid control mechanism
10 first deformable member
11 second deformable member
12a outer peripheral portion of first deformable member
12b outer peripheral portion of second deformable member
13 pressure sensor
14 first opening
15 second opening
20 finger
23 linkage mechanism
30 object
33 glove
36 installation-target object
37 drive section
40 rigid body
43 slit
46 protrusion
49 distance sensor

The invention claimed is:

1. A shape changeable apparatus, comprising:
a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base;

an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body;

a second opening that is formed in the base to communicate with the second space, the second opening being formed not to be closed when the specified pressing operation is input; and a flow path through which the first opening and the second opening each communicate with the inflow control opening, wherein the first deformable member and the second deformable member are each connected to the base such that the second deformable member is arranged inside of a space that is formed by the first deformable member and the base, the first space is a space obtained by excluding the second space from the space formed by the first deformable member and the base, and the second space is a space that that is formed by the second deformable member and the base.

2. The shape changeable apparatus according to claim 1, wherein the first opening is closed through the first deformable member when the specified pressing operation is input.

3. The shape changeable apparatus according to claim 1, further comprising a fluid controller that is configured to communicate with the inflow control opening, the fluid controller controlling flow of the fluid into the inflow control opening.

4. The shape changeable apparatus according to claim 3, wherein the fluid controller controls the flow of the fluid into the inflow control opening according to whether the first opening is closed.

5. The shape changeable apparatus according to claim 3, wherein the operative body is a finger of a user, and the fluid controller provides a tactile sense to the finger of the user by changing shapes of the first deformable member and the second deformable member.

6. The shape changeable apparatus according to claim 1, wherein the operative body is a finger of a user, and the shape changeable apparatus is configured to be worn on the finger of the user.

7. A tactile sense providing apparatus, comprising:

the shape changeable apparatus according to claim 1; and a tactile sense providing section that is capable of providing a tactile sense to the operative body by changing shapes of the first deformable member and the second deformable member.

8. A shape changeable apparatus, comprising:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base;

an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body, a second opening that is formed in the base to communicate with the second space, the second opening being formed not to be closed when the specified pressing operation is input; and a flow path through which the first opening and the second opening each communicate with the inflow control opening, wherein the first deformable member and the second deformable member are each connected to the base such that the second deformable member is arranged outside of a space that is formed by the first deformable member and the base, the first space is the space formed by the first deformable member and the base, and the second space is a space that is formed by the second deformable member and the base.

9. A tactile sense providing apparatus, comprising:

the shape changeable apparatus according to claim 8; and a tactile sense providing section that is capable of providing a tactile sense to the operative body by changing shapes of the first deformable member and the second deformable member.

10. A shape changeable apparatus, comprising:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base;

an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body;

a second opening that is formed in the base to communicate with the second space, the second opening being formed not to be closed when the specified pressing operation is input;

a flow path through which the first opening and the second opening each communicate with the inflow control opening; and a fluid controller that is configured to communicate with the inflow control opening, the fluid controller controlling flow of the fluid into the inflow control opening, wherein the fluid controller controls the flow of the fluid into the inflow control opening according to whether the first opening is closed, the fluid controller stops the flow of the fluid into the inflow control opening during shrinkage of the first space, and the fluid controller starts the flow of the fluid into the inflow control opening when the first opening is closed.

11. A tactile sense providing apparatus, comprising:

the shape changeable apparatus according to claim 10; and a tactile sense providing section that is capable of providing a tactile sense to the operative body by changing shapes of the first deformable member and the second deformable member.

12. A shape changeable apparatus, comprising:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base;

an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body;

a second opening that is formed in the base to communicate with the second space, the second opening being formed not to be closed when the specified pressing operation is input;

a flow path through which the first opening and the second opening each communicate with the inflow control opening:

a fluid controller that is configured to communicate with the inflow control opening, the fluid controller controlling flow of the fluid into the inflow control opening; and a detector that detects that the first opening is closed, wherein the fluid controller controls the flow of the fluid into the inflow control opening on a basis of a result of the detection performed by the detector, and the fluid controller controls the flow of the fluid into the inflow control opening according to whether the first opening is closed.

13. The shape changeable apparatus according to claim 12, wherein the detector includes a pressure sensor that is capable of detecting pressure of the fluid, the detector being arranged at a position at which the pressure of the fluid flowing into the first space is detectable.

14. A tactile sense providing apparatus, comprising:

the shape changeable apparatus according to claim 12; and a tactile sense providing section that is capable of providing a tactile sense to the operative body by changing shapes of the first deformable member and the second deformable member.

15. A shape changeable apparatus, comprising:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base, an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body;

a second opening that is formed in the base to communicate with the second space, the second opening being formed not to be closed when the specified pressing operation is input;

a flow path through which the first opening and the second opening each communicate with the inflow control opening; and a drive section that moves the base relative to the operative body to cause the specified pressing operation to be input using the operative body.

16. The shape changeable apparatus according to claim 15, wherein the drive section stops the movement of the base relative to the operative body when the first opening is closed.

17. The shape changeable apparatus according to claim 15, wherein the operative body is a finger of a user, the shape changeable apparatus is installed at a specified location, and the drive section moves the base toward the finger of the user.

18. A tactile sense providing apparatus, comprising:

the shape changeable apparatus according to claim 15; and a tactile sense providing section that is capable of providing a tactile sense to the operative body by changing shapes of the first deformable member and the second deformable member.

19. A shape changeable apparatus, comprising:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base, an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body;

a second opening that is formed in the base to communicate with the second space, the second opening being formed not to be closed when the specified pressing operation is input; and a flow path through which the first opening and the second opening each communicate with the inflow control opening, wherein the operative body is a finger of a user, the shape changeable apparatus is configured to be worn on the finger of the user, and the specified pressing operation is input using the finger of the user when an object is held with the finger of the user, the shape changeable apparatus being worn on the finger of the user.

20. A tactile sense providing apparatus, comprising:

the shape changeable apparatus according to claim 19; and a tactile sense providing section that is capable of providing a tactile sense to the operative body by changing shapes of the first deformable member and the second deformable member.

21. A shape changeable apparatus, comprising:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base;

an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body, a second opening that is formed in the base to communicate with the second space, the second opening being formed not to be closed when the specified pressing operation is input; and a flow path through which the first opening and the second opening each communicate with the inflow control opening, wherein an outer peripheral portion of the second deformable member is in contact with at least a portion of an outer peripheral portion of the first deformable member.

22. The shape changeable apparatus according to claim 21, wherein the entirety of the outer peripheral portion of the second deformable member is in contact with the outer peripheral portion of the first deformable member.

23. A tactile sense providing apparatus, comprising:

the shape changeable apparatus according to claim 21; and a tactile sense providing section that is capable of providing a tactile sense to the operative body by changing shapes of the first deformable member and the second deformable member.

24. A shape changeable apparatus, comprising:

a base;

a first deformable member that is capable of being deformed, the first deformable member being connected to the base such that a first space is formed between the first deformable member and the base;

a second deformable member that is capable of being deformed, the second deformable member being connected to the base such that a second space is formed between the second deformable member and the base;

an inflow control opening that is formed in the base, the inflow control opening being used to control flow of fluid into each of the first space and the second space;

a first opening that is formed in the base to communicate with the first space, the first opening being formed to be closed when a specified pressing operation is input to the first deformable member and the second deformable member using an operative body;

a second opening that is formed in the base to communicate with the second space, the second opening being formed not to be closed when the specified pressing operation is input;

a flow path through which the first opening and the second opening each communicate with the inflow control opening:

a plurality of the second deformable members; and a plurality of the second openings respectively communicating with the second spaces of a plurality of the second spaces respectively formed by the second deformable members of the plurality of the second deformable members.

25. A tactile sense providing apparatus, comprising:

the shape changeable apparatus according to claim 24; and a tactile sense providing section that is capable of providing a tactile sense to the operative body by changing shapes of the first deformable member and the second deformable member.

\* \* \* \* \*